(12) United States Patent
Tsuchida

(10) Patent No.: US 6,704,453 B2
(45) Date of Patent: *Mar. 9, 2004

(54) METHOD AND APPARATUS FOR PROCESSING IMAGE AND STORING MEDIUM

(75) Inventor: Shinji Tsuchida, Zama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,667

(22) Filed: Mar. 29, 1999

(65) Prior Publication Data

US 2003/0039397 A1 Feb. 27, 2003

(30) Foreign Application Priority Data

Mar. 31, 1998 (JP) .......................................... 10-085933

(51) Int. Cl.$^7$ ................................................. G06K 9/36
(52) U.S. Cl. ........................ 382/236; 358/1.15; 358/468
(58) Field of Search ................................. 358/444, 442, 358/468, 443, 296, 403, 439, 1.15–1.17; 395/114, 115, 116, 275, 325; 364/238.1, 240.7, 282.2; 348/220, 231, 552, 14.01, 220.1, 231.1; 382/236

(56) References Cited

U.S. PATENT DOCUMENTS

| 4,769,719 A | * | 9/1988 | Endo ........................ 358/296 |
| 5,021,889 A | * | 6/1991 | Yamamoto .................. 358/407 |
| 5,206,743 A | * | 4/1993 | Hochman et al. ........... 358/440 |
| 5,550,646 A | * | 8/1996 | Hassan et al. ........... 348/14.14 |
| 5,640,195 A | * | 6/1997 | Chida ....................... 348/14.01 |
| 5,640,202 A | * | 6/1997 | Kondo et al. ............... 348/233 |
| 5,727,136 A | * | 3/1998 | Kubota ....................... 358/442 |
| 5,742,329 A | * | 4/1998 | Masunaga et al. ........ 348/14.07 |
| 5,767,894 A | * | 6/1998 | Fuller et al. .................. 725/82 |
| 5,818,512 A | * | 10/1998 | Fuller ........................... 725/82 |
| 5,838,314 A | * | 11/1998 | Neel et al. ...................... 725/8 |
| 5,930,004 A | * | 7/1999 | Imai et al. ................... 358/442 |
| 5,974,223 A | * | 10/1999 | Uchide ........................ 386/109 |
| 6,111,605 A | * | 8/2000 | Suzuki ........................ 348/220 |
| 6,141,492 A | * | 10/2000 | Hori ............................ 386/112 |
| 6,163,347 A | * | 12/2000 | Fajardo ....................... 348/625 |
| 6,233,428 B1 | * | 5/2001 | Fryer .......................... 434/308 |
| 6,266,082 B1 | * | 7/2001 | Yonezawa et al. .......... 348/159 |
| 6,278,478 B1 | * | 8/2001 | Ferriere ..................... 348/14.1 |
| 6,278,691 B1 | * | 8/2001 | Ohyama et al. ......... 348/14.11 |
| 6,297,856 B1 | * | 10/2001 | Makamura et al. ......... 348/705 |
| 6,477,437 B1 | * | 11/2002 | Hirota ........................ 700/95 |
| 6,587,870 B2 | * | 7/2003 | Takagi et al. ............... 709/204 |

\* cited by examiner

*Primary Examiner*—Bhavesh M. Mehta
*Assistant Examiner*—Sheela Chawan
(74) *Attorney, Agent, or Firm*—Fitzpatrick, Cella, Harper & Scinto

(57) ABSTRACT

An object of the present invention is to surely store a desired image having a desired length regardless of capacity of a memory capable of storing a newly inputted image.

To this end, in the present invention, in response to recording instruction, by sending a photo-taken moving image to another apparatus connected through a communication circuit and by storing the moving image in a memory means of the another apparatus, an apparatus for photo-taking the moving image does not require large memory capacity, so that a large amount data such as the moving image can be stored positively.

9 Claims, 44 Drawing Sheets

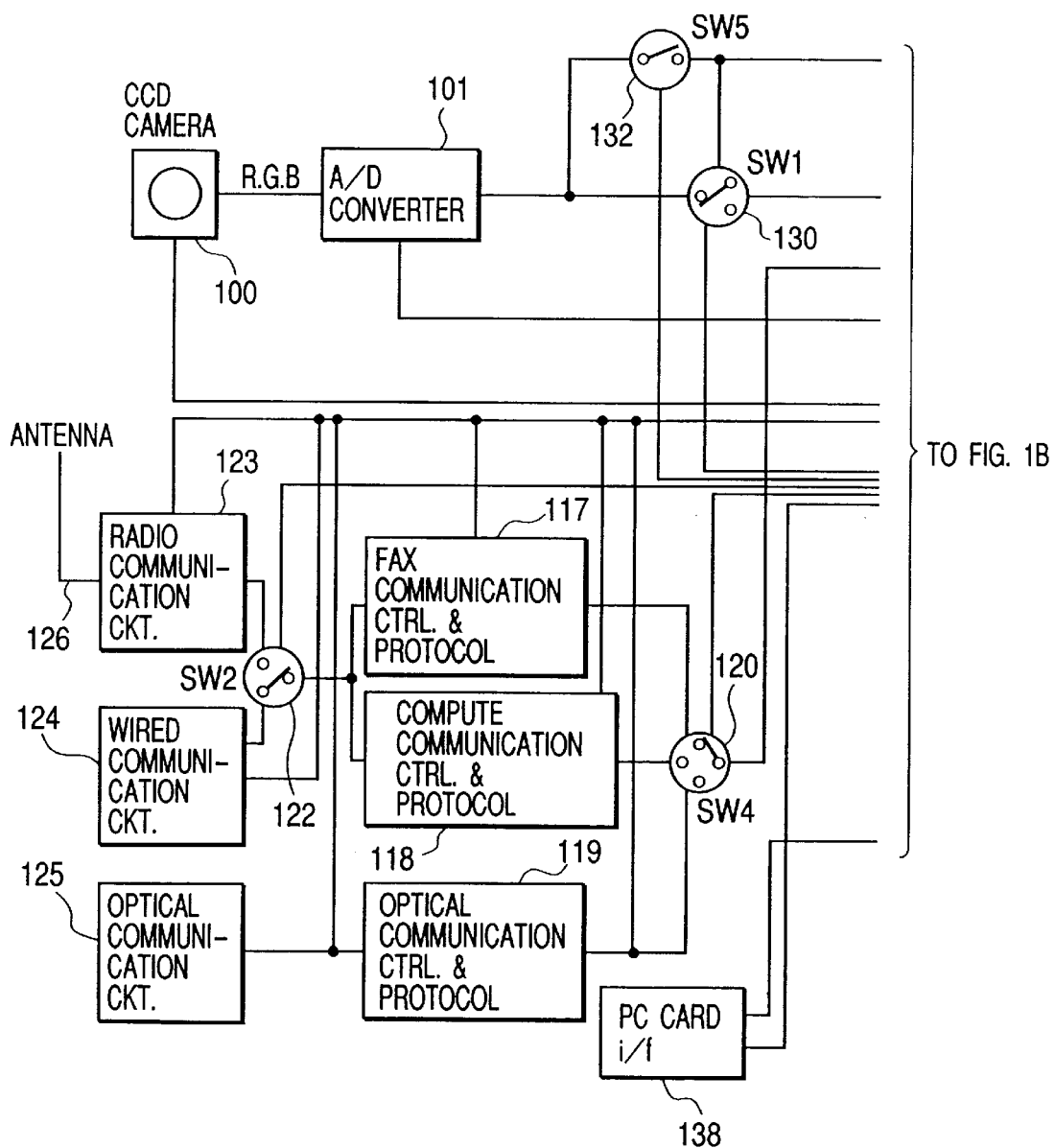

COMMUNICATION PROTOCOL
BETWEEN TERMINAL—TERMINAL
(MOVING IMAGE)

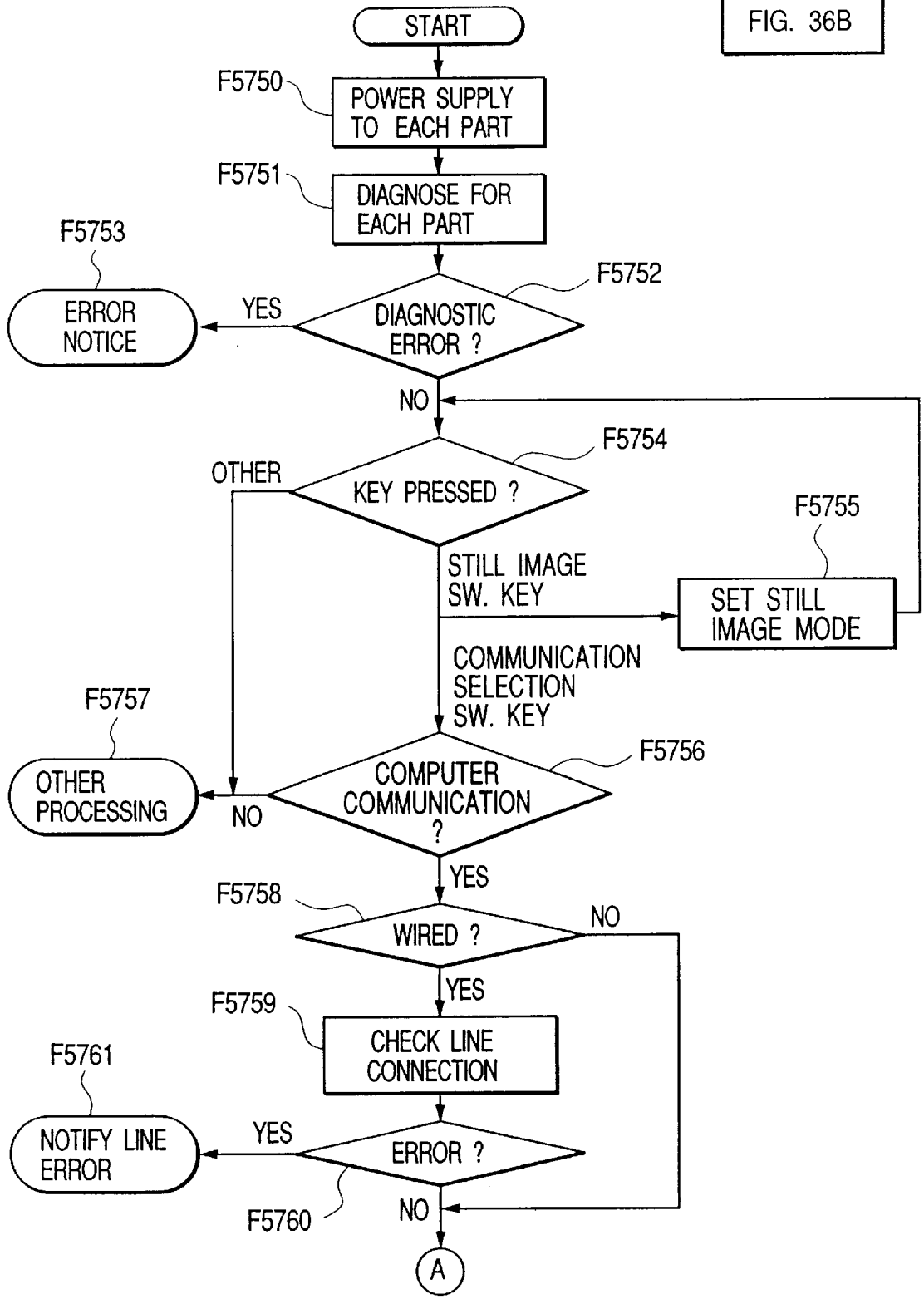

COMMUNICATION PROTOCOL BETWEEN PC—TERMINAL (POLLING COMMUNICATION OF STILL IMAGE)

METHOD AND APPARATUS FOR PROCESSING IMAGE AND STORING MEDIUM

BACKGROUND OF THE INVENTION

1. Field of the Invention

The present invention relates to information processing in a portable terminal into which a digital image can be inputted, and storing of a movable image or a still (stationary) image, and further a technique for effecting sending and receiving of an image through a communication circuit.

2. Related Background Art

Apparatuses into which a digital image can be inputted are already known.

However, when a moving image is recorded, a memory having large capacity is required, which makes compactness of the apparatus difficult.

On the other hand, in an apparatus having small memory capacity, for example, in a portable terminal, only a moving image for short time (for example, 30 seconds) can be recorded.

SUMMARY OF THE INVENTION

An object of the present invention is to permit recording of a desired moving image regardless whether memory capacity is great or small.

Another object of the present invention is to positively store an inputted image in a memory.

The other object of the present invention is to properly transmit an image between a plurality of information processing apparatuses interconnected through communication circuits.

DESCRIPTION OF THE PREFERRED EMBODIMENTS

The present invention will now be explained with reference to the accompanying drawings.

The present invention relates to an information processing technique in a system for communicating information between for example a host device (desk-top computer or the like) and a terminal, the terminal comprising a communication means for effecting communication, a moving image input means capable of inputting a moving image, a designating or notifying for designating recording of the moving image, and a control means adapted to be connected to the host device through the communication means when the recording of the moving image is designated and adapted to control transferring of the moving image inputted from the moving image input means, and the host device comprising an moving image storing means for storing the moving image transferred via the communication means.

Now, a concrete example will be explained.

FIRST EXAMPLE

A first embodiment of the present invention will be described with reference to FIGS. 1A, 1B and FIGS. 2 to 10. It should be noted that FIGS. 1A and 1B and FIGS. 2 to 4 can be commonly used in all of embodiments of the present invention.

(Function 1)

In this example, a moving image is photo-taken by a photo-taking means such as a CCD camera of a terminal, and the moving image is stored in a storing medium such as a recipient computer. After the communication between the terminal and the computer is prepared and the storing of the computer is prepared, when the storing is started a message "Under storing" (under recording) is displayed on the terminal. Further, while the storing is being processed by the computer for storing data of the moving image, if memory capacity of a memory device is used up, that fact is noticed from the computer to the terminal, and the terminal informs an operator of that fact, and, thereafter, a communication circuit is automatically interrupted without operation of the operator.

(System Construction)

Next, a construction of the apparatus according to the present invention will be described with reference to FIGS. 1A, 1B and FIGS. 2 to 5.

Figure 1B:
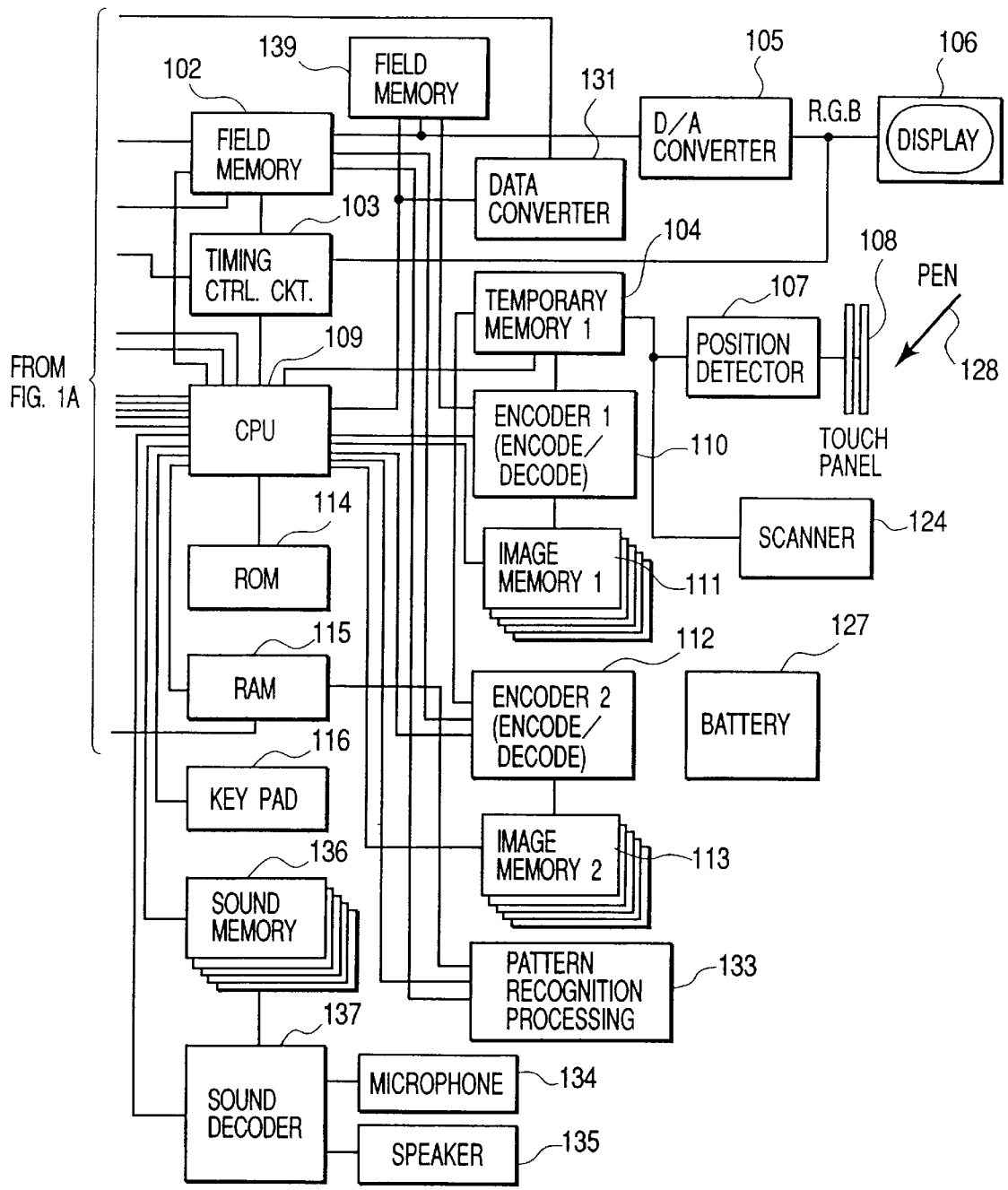
FIG. 1 which is composed of FIGS. 1A and 1B are block diagrams showing a construction of a terminal to which the present invention is applied.

FIGS. 1A and 1B show electrical circuitry of the terminal.

An image input means 100 acting as a photo-taking (imaging) means such as a CCD camera output a photo-taken image as components R (red), G (green), B (blue). An A/D converter 101 serves to A/D-convert data of the components R, G, B outputted from the CCD camera 100 and to send a result to a field memory 102.

A switch 1 (130) serves to switch display between the data inputted from the CCD camera 100 and data stored in a temporary memory 104, in accordance with instruction from the CPU 109. The switching of the switch 1 (130) is properly effected by a CPU 109 in correspondence to one of conditions of various modes designated by a touch panel 108. A switch 2 (122), a switch 4 (120) and a switch 5 (132) which will be described later are similarly operated.

The switch 5 (132) serves to switch the display of the data inputted from the CCD camera 100 and the data stored in the temporary memory 104 with composite thereof or without composite thereof, in accordance with instruction from the CPU 109.

By switching the switch 130, 132 on the basis of the instruction from the CPU 109, it is controlled so that the input data from the CCD camera 100 or the data stored in the temporary memory 104 or data obtained by composing the above two data is selected as the data to be displayed on a display 106. The data stored in the temporary memory 104 is data inputted from the touch panel 108 or a scanner 129 which will be described later.

The field memory 102 serves to store one frame data to be displayed on the display 106 and to send the stored one frame data to the display 106 in synchronous with an output timing designated by a timing control circuit 103. When the data to be inputted to the field memory 102 is the data inputted from the CCD camera 100, after the one frame data is photo-taken, the data is displayed on the display 106. When the data to be inputted to the field memory 102 is the data inputted from the touch panel 108 or the scanner 129, the data is displayed at a timing for inputting data to be inputted at any predetermined time interval. That is to say, the display 106 renews the displayed image every predetermined time interval. The time interval may be stored in the memory as a parameter and may effect renewal on the basis of command from the operator.

The timing control circuit 103 serves to control input and output timings of the data of the field memory 102 on the basis of instruction (from the CPU 109) of input to the field memory 102 and instruction (from the CPU 109) of output from the field memory 102.

The A/D converter 105 serves to A/D-convert the data sent from the field memory 102 and to send the result of the display 106 as R, G, B color data.

The display 106 is a color display for displaying the data inputted from the CCD camera 100, touch panel 108 or scanner 129. The display 106 is a liquid crystal display including circuits required for displaying such as a liquid crystal drive circuit.

The touch panel 108 includes a plurality of electrodes and serves to judge whether or not an input pen 128 contacts with the panel on the basis of output of the electrodes and to pick up the contacted position as coordinates data and to judge that a key is depressed when the key is displayed on a display area of the display 106 corresponding to the contacted position. The input to the touch panel 108 is inputted to the CPU 109 via the temporary memory 1 (104). When the key is depressed, a character code or instruction command corresponding to the key is inputted to the CPU 109.

A position detector 107 serves to judge whether or not the data is the data inputted from the touch panel 108 and to detect which position is on the panel and to develop the image data at that position in consideration of a width (fatness) of the predetermined input pen 128 and to send the data to the temporary memory 104.

The temporary memory 104 serves to temporarily store the data inputted from the touch panel 108 and developed as the image data by the position detector 107 or the image data read-in by the scanner 129 in a dot matrix pattern in order to display on the display 106.

The CPU 109 serves to perform entire control of the terminal and to execute various processing operation in accordance with control program stored in a ROM 114 or a RAM 115. Processing operations shown in flow charts (described later) are also executed under the control of the CPU 109.

The input pen 128 has a pencil shape for inputting the data to the touch panel 108.

The scanner 129 is a normal mono-color scanner for reading information recorded on a paper sheet or the like by illuminating light and for outputting the read information (Circuits required for reading are included in the scanner).

A data converter 131 serves to convert the data to accommodate with a format after the conversion in the A/D converter 101 and to add to the data a color designated in an appropriate manner, and the data from the touch panel 108 or the scanner 129 is then displayed on the display 106 with that color.

The RAM 114 serves to store the control program by which the CPU 109 controls the terminal.

The ROM 114 also stores control programs according to the present invention (FIGS. 7, 8, 12A, 12B, 13, 15A, 15B, 16, 17, 20, 22, 24, 25, 27, 28, 30, 31, 33, 34, 36A, 36B, 37, 41 and 42). Incidentally, such control programs may be stored discrete memory medium such as a floppy disc which can detachably be mounted to the apparatus or may be down-loaded from another terminal connected via a communication circuit.

The RAM 115 serves to store variable data required for the CPU 109 to control the terminal or information previously by the operator (for example, the color of the input data (from the touch panel 108) to be displayed).

A key pad 116 serves to cause the apparatus to carry out the function and includes a shutter for inputting the image, a dial key for effecting the sending to the receiver, and a key for designating whether the image to be inputted is a still (stationary) image (referred to as "still picture" hereinafter) or a moving image (referred to as "moving picture" hereinafter).

A code processing portion (encoder) 110 serves to compress the data inputted from the CCD camera 100 and stored in the field memory 102 or to read out data from an image memory 111, expand the data and send the data to the temporary memory 104, in accordance with the instruction from the CPU 109.

The image memory 111 serves to store the data (from the CCD camera 100) compressed in the code processing portion 110.

A code processing portion (encoder) 112 serves to compress the data inputted from the touch panel 108 or the scanner 129 and stored in the field memory 102 or to read out data from an image memory 113, expand the data and send the data to the temporary memory 104, in accordance with the instruction from the CPU 109.

The image memory 113 serves to store the data (from the touch panel 108 or the scanner 129) compressed in the code processing portion 112.

A battery 127 serves to supply electric power to the entire apparatus.

The switch 4 (120) serves to select communication means among facsimile communication, computer communication and optical communication, in accordance with the instruction from the CPU 109.

The switch 2 (122) serves to select the communication means among radio communication and wired communication and switch the communication means.

A facsimile communication control portion 117 serves to effect connection control of known facsimile communication and protocol processing (G3).

A computer communication control portion 118 serves to effect communication control to the recipient computer and protocol processing.

An optical communication control portion 119 serves to effect IFDA protocol processing to the recipient computer.

A radio communication circuit 123 serves to effect protocol processing required until "call" is attained with respect to a circuit required for radio communication through a radio circuit. Here, PHS is used, and MODEM is used when the computer communication is effected, and data communication is effected with false voice. Since a data communication technique with the false voice by using PHS is well-known, explanation thereof will be omitted.

A wired communication circuit 124 serves to effect protocol processing required until "call" is attained with respect to a circuit required for wired communication through a wired circuit. In this example, a well-known ISDN circuit is used as the wired circuit.

An optical communication circuit 125 is a circuit for effecting local communication to recipient computer and serve to perform processing other than the protocol processing. While an IrDA technique was used in the optical communication, since this technique is well-known, explanation thereof will be omitted.

An antenna 126 serves to amplify a radio wave used in the radio communication.

A pattern recognition processing portion 133 serves to detect a character code from a portion designated by the operator among the image data inputted from the CCD camera 100.

A microphone 134 serves to input sound of voice.

A speaker 135 serves to output sound data inputted by the communication means.

A memory 136 serves to store sound data inputted from the communication means or the microphone 134 and coded.

A sound decoder 137 serves to digitalize analogue data inputted from the microphone and to output the digitalized data from a speaker 135 in an analogue form.

A PC card i/f (interface) portion 138 can incorporate various PC i/f cards therein to expand the function.

A field memory 139 serves to develop and display the image data from touch panel 108 or the scanner 129 when the image data are composed.

Figure 2:
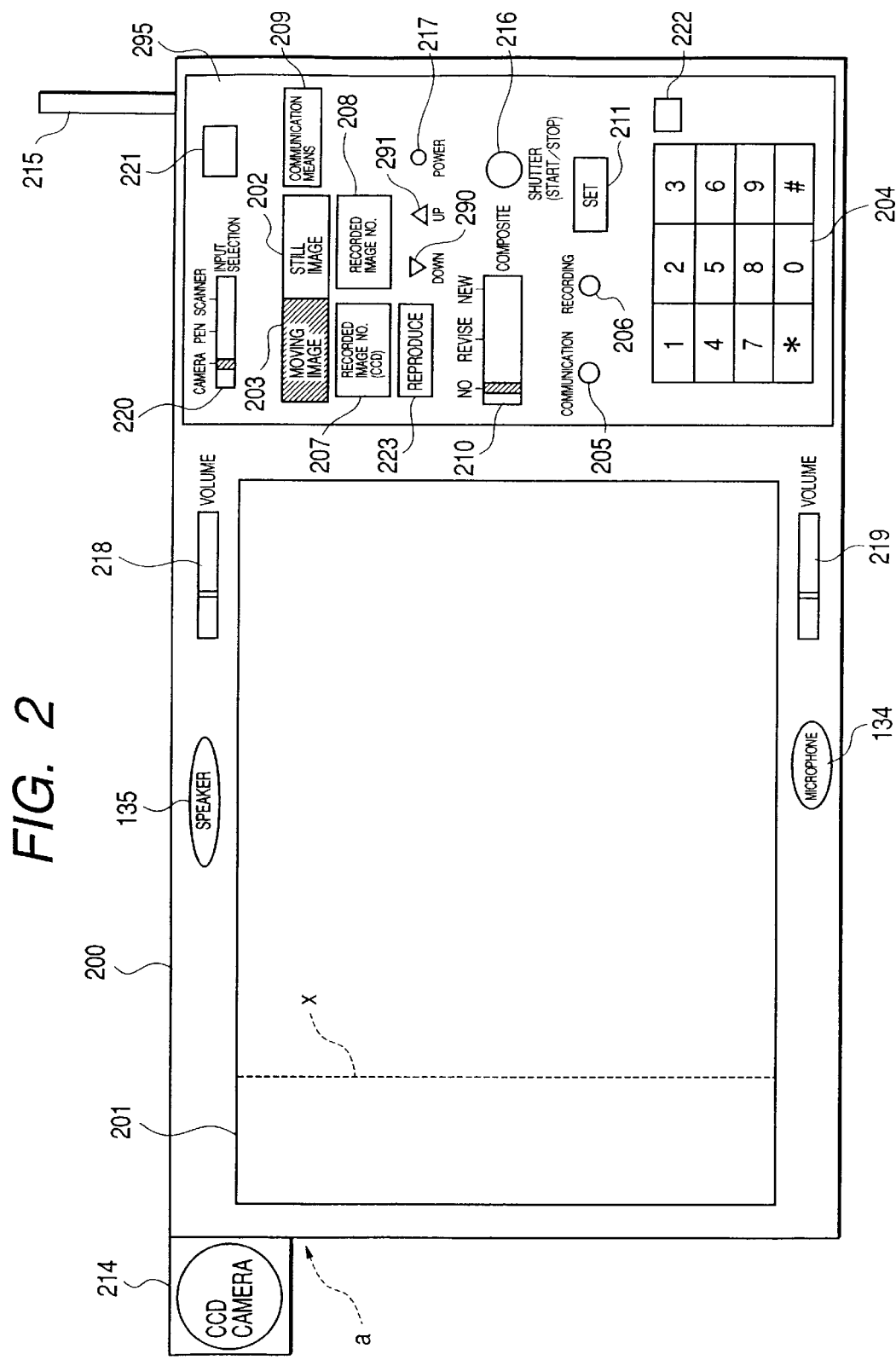
FIG. 2 is a front view showing an appearance of the terminal.

FIG. 2 shows an appearance of the terminal 200.

The display 106 is overlapped with the touch panel 108 to permit the displaying of the image data and the inputting of the coordinates data simultaneously. Volume buttons 218, 219 and various buttons in an operation area 295 may be realized by a soft key pattern displayed on the display 106 and the touch panel or may be realized as hard buttons. A function setting area at the left from the dotted line X shown in FIG. 2 is an operation portion which serves to display functions which can be set when a set key 211 is depressed, to select a function to be carried out among such functions and to perform an operation corresponding to that function.

There are the following six settable functions, and function selection buttons for selecting the desired function and various detail setting buttons in the processing of the function to be started upon selection by depressing the specific key are displayed on the function setting area.

(1) telephone number of computer;
(2) setting of communication means (same as communication means key 209);
(3) data sending;
(4) data receiving;
(5) code conversion; and
(6) conversion result registration.

A display portion or image display area at the right from the dotted line X is a display area acting as a finder of the CCD camera 100 and serves to display an image which is being photo-taken by the CCD camera 100 in real time. Further, the display 106 also acts to display the image data read-in by the scanner 129, thereby displaying the image read-in by the scanner 129 on this area. By operating the apparatus, one of the input data from the CCD camera 100, input data from the scanner 129 and input data obtained by contact of the touch panel 108 can be displayed.

By displaying various buttons on the operation are 295 and by storing display areas of these buttons, the touch panel discriminates the depressed button by comparing with a touch position, and instruction command and a character code corresponding to the depressed button are inputted to the CPU 109. The buttons 218, 219 other than the operation area are similarly operated.

A still picture (image) selection key 202 in an photo-taking mode is depressed when the data inputted from the CCD camera 100 is handled as the still image. When the still image is designated by depressing this key, the image is inputted from the CCD camera and is displayed on the display 106.

A moving picture (image) selection key 203 in the photo-taking mode is depressed when the data inputted from the CCD camera 100 is handled as the moving image.

A dial key 204 acts as a numeral input means and is used when a recipient telephone number is inputted before the communication is started or when a previously set dial number of a computer into which the moving data is recorded is inputted and registered.

An LED 205 is a means for informing the operator of a message "under communication" and is turned ON when the communication is effected to other computer.

An ON/OFF switch 206 with an LED acts as a means for commanding start and stop of the recording and also acts as a means for informing the operator of a message "under recording". When this key is depressed, a recording mode is selected and the LED is turned ON. When depressed again, the recording mode is stopped and the LED is turned OFF. That is to say, whenever the key is depressed, ON/OFF of the recording mode is switched. In case where the still image is selected in the photo-taking mode and the recording mode is also selected, when a shutter 216 is depressed, the still image inputted from the CCD 100 is stored in the memory 102 in the terminal. In case where the moving image is selected in the photo-taking mode, when the shutter 216 is depressed and the recording switch is turned ON, the data inputted from the CCD 100 starts to be recorded in the memory of other computer and the LED of the switch is turned ON.

A key 207 acts as a means for instructing counter displaying. When this key is depressed, the number of image data (still images) inputted from the CCD camera 100 and recorded is displayed on a certain part of the display 106 for a predetermined time period and then is disappeared. Whenever the key 207 is depressed, display/non-display may be switched.

A key 208 acts as a means for instructing counter displaying. When this key is depressed, the total number of the data (image data inputted from the touch panel 108 and the image data read-in from the scanner 129) stored is displayed on a certain part of the display 106 for a predetermined time period and then is disappeared. Whenever the key 208 is depressed, display/non-display may be switched.

A switch 209 acts as a switching means for changing or altering the communication means. When the key is depressed once, the communication means presently set is displayed on a certain part of the display 106, and, when depressed again, the next communication means is displayed. Thus, whenever the key is depressed, the settable communication means are successively displayed in a pre-determined order or sequence. If this key is not depressed for a predetermined time period, the displaying of the communication means is disappeared, and the communication means which has been displayed is selected and set. The sequence for altering the communication means is, for example, radio facsimile communication, radio computer communication, wired facsimile communication, wired computer communication and optical communication in order, and such sequence is previously stored in the memory. Default of the communication means to be set is the radio facsimile communication, and, if the switch 209 is not depressed at all, communication which will be described later is effected with the radio facsimile communication.

A key 223 acts as a means for instructing reproduce-displaying of the recorded still image. When the data inputted from the CCD camera 100 is reproduce-displayed, after this key 223 is depressed, by depressing the moving image key 203, still image key 202 and numeral key 204, the image of page designated by the numeral key 204 is reproduce-displayed. Thereafter, a still image of preceding or succeeding page can be displayed by using a DOWN key 290 or an UP key 291.

When the data inputted from the touch panel 108 or the scanner 129 is to be reproduce-displayed, after the reproduce-display key 223 is depressed, by depressing the numeral key 204 is depressed, an image of designated page is reproduce-displayed. It is judged whether the input data from the CCD camera 100 or the input data from the touch panel 108 or the scanner 129 is to be displayed, on the basis of depression of the moving image key 203 or the still image key 202.

A key 210 acts as a means for designating whether the previously recorded image data and newly inputted image data are composed or such data are composed and recorded as new data. A set mode can be selected among three mode on the basis of display positions of bars. When this key is set to "No", the composite is not effected. When the key is set to "Revise", the previously recorded and designated image data and the newly inputted image are composed, and a result is substituted for the previously recorded data. When the key is set to "New", the previously recorded and designated image data and the newly inputted image are composed, and a result is recorded as new data.

A set key 211 is used when various setting operations are effected. After the set key 211 is depressed, a kind of data to be set is selected and the selected data is set by using the numeral key 204.

The CCD camera 100 is rotatable from a position a shown in FIG. 2 so that, even when the terminal 200 is fixed, the image can be inputted from various angles by rotating the CCD camera 100.

A shutter key 216 acts as a still image record instructing means in the still image recording mode and acts as a means for instructing start/stop of pick-up of the image from the CCD camera 100 in the moving image recording mode. Whenever this key is depressed, start and stop of the recording are repeated. In case of the still image, at the point when the still image key 202 is depressed, the image is inputted from the CCD camera 100 and is displayed on the display 106. The operator depresses the shutter key 216 while viewing the display. When the moving image key 203 is depressed, the input from the CCD camera 100 is started by depressing the shutter key 216.

A switch 217 acts as means for switching ON/OFF of power. Whenever this switch is depressed, ON and OFF are repeated. In the ON condition, the image is inputted from the CCD camera 100 and the inputted image is displayed on the display 106. In the OFF condition, a power source of the apparatus is interrupted.

A volume key 218 acts as a means for setting volume of the speaker 135. When this key is set to minimum (leftmost end), a sound amount is set to zero so that no sound is emitted from the speaker 135.

A volume key 219 acts as a means for setting volume of the microphone 134. When this key is set to minimum (leftmost end), gain of the microphone 134 is set to zero so that the sound is not inputted.

An input switch 220 acts as a means for selecting which the image is inputted from the CCD camera 100, the pen 128 (touch panel 108) or the scanner 129 which are input means of the terminal. In a "camera" position, the input from the CCD camera 100 is selected; in a "pen" position, the input from the touch panel 108 is selected; and, in a "scanner" position, the input from the scanner 129 is selected. A stop key 221 acts as a means for instructing interruption of the processing being executed.

Figure 3:
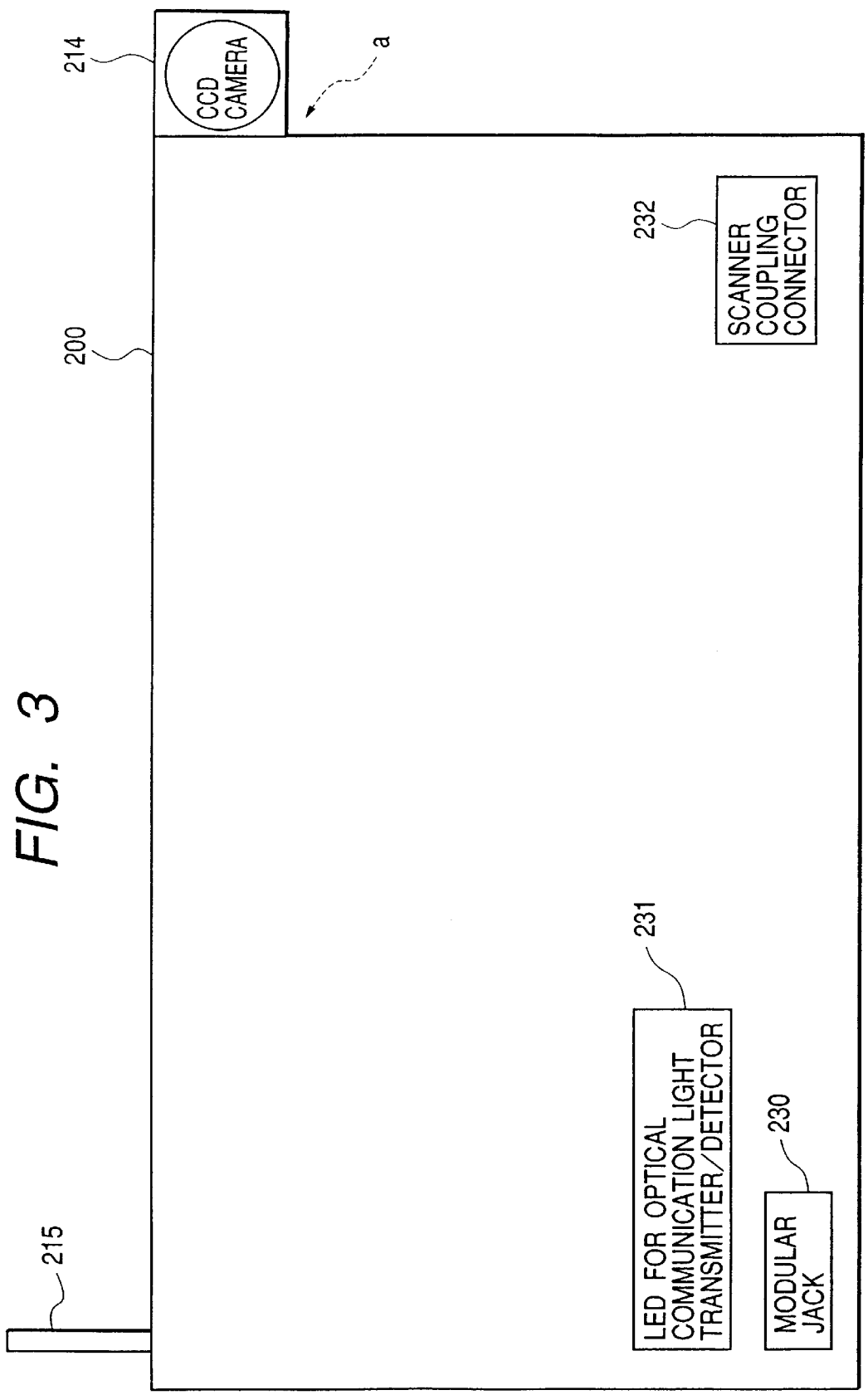
FIG. 3 is a rear or back view showing an appearance of the terminal.

FIG. 3 shows an appearance of a back of the terminal.

A modular jack 230 is a jack for connecting the wired circuit.

A sending/receiving portion 231 is an LED light transmitter/detector used when the optical communication (for example, IrDA) is used.

A connector 232 is a connection means for connecting the scanner to the body of the terminal, so that white and black information of the image read by the scanner 129 is inputted as "0" and "1" bit information.

Figure 4:
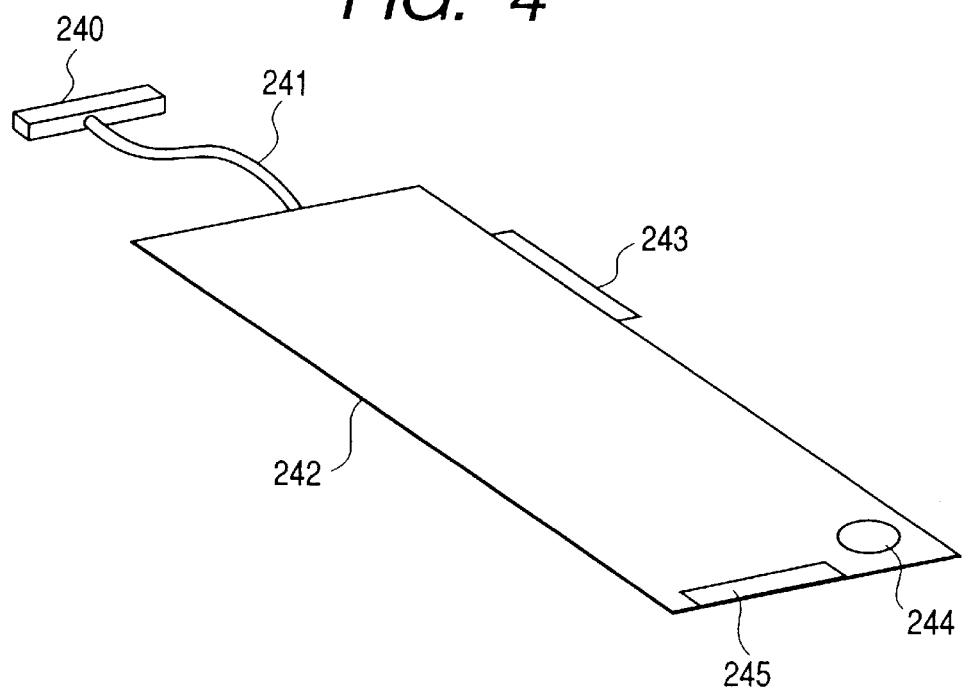
FIG. 4 is a perspective view of a scanner.

FIG. 4 shows a construction of the scanner 129 schematically.

A connector 240 is a connection means for connecting a scanner body 242 to the connector 232 of the body of the terminal 200.

A cable 241 serves to connect the connector 240 to the scanner body 242 to permit sending and receiving of a signal.

A switch 243 acts as a means for designating whether or not the reading operation is started. Whenever this key is depressed, ON and OFF are repeated. Only when this switch 243 is ON, the read image data is sent to the terminal through the cable 241.

A light source 244 is turned ON when an original image is read. This light source is turned ON in response to designation of ON effected by the reading switch 243.

A reading sensor 245 starts the read-in of the data in response to designation of ON effected by the reading switch 243 and converts the data into "0" and "1" data which is in turn sent to the temporary memory 104.

Figure 5:
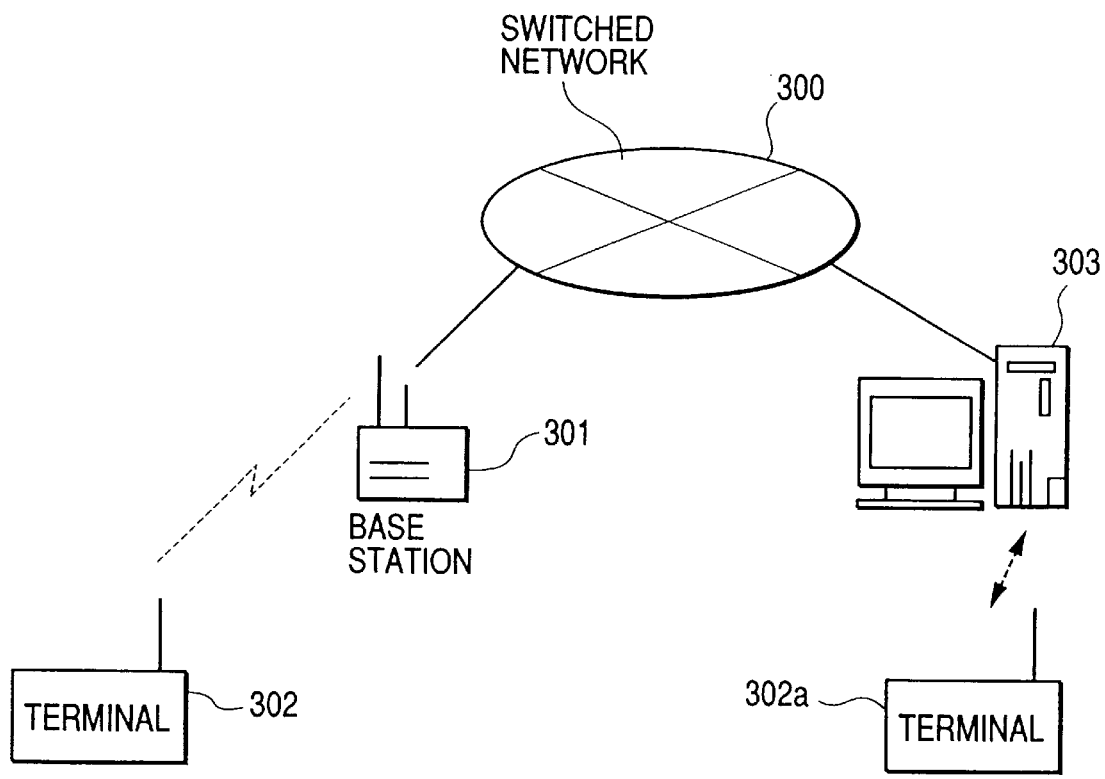
FIG. 5 is a block diagram showing a system arrangement according to the present invention.

FIG. 5 shows a system arrangement according to the present invention and shows an example of use of the terminal.

A switched network 300 may be a public network or a private network.

A base station 301 serves to connect a terminal 302 to the switched network 300 through a radio circuit.

A personal computer (PC) of, for example, a desk-top type is a communication recipient for a terminal 302a and has a large capacity memory. The terminal 302a has the same construction as that of the terminal 302 and can effect optical communication to the desk-top PC 303.

When the terminals 302, 302a are used, communication address (such as telephone number) of the moving image data storing desk-top PC 303 are previously set. The reason for setting in this way is that, if the terminal 302 stores the moving image data, since the storing memory is soon filled with data, when the moving image data is stored, such data is stored in the large capacity memory of the external desk-top PC 303.

(Operation of System)

Next, an example of an operation of this system will be explained with reference to FIGS. 6 to 10.

Figure 6:
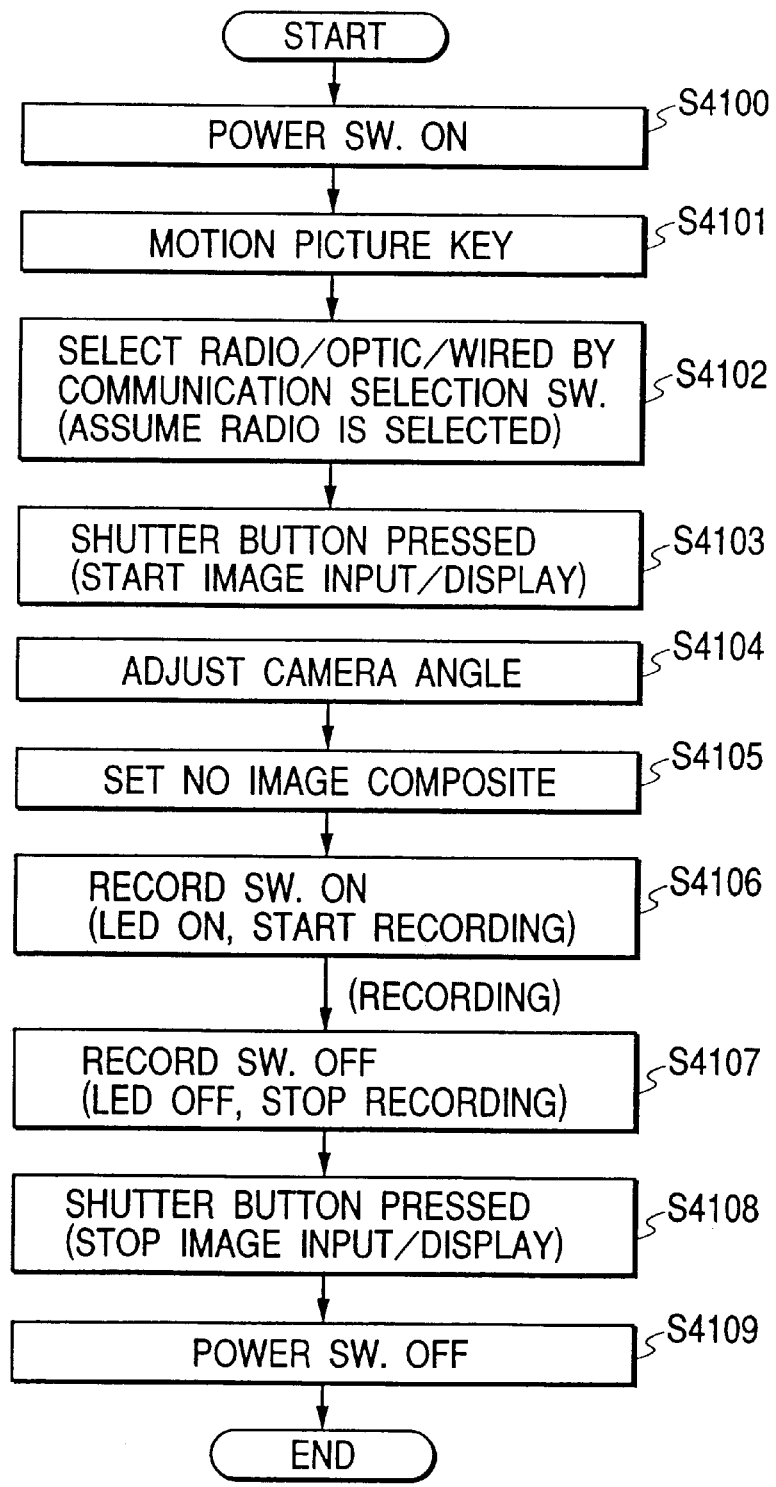
FIG. 6 is a flow chart showing a terminal operation according to a first embodiment of the present invention.
Figure 7:
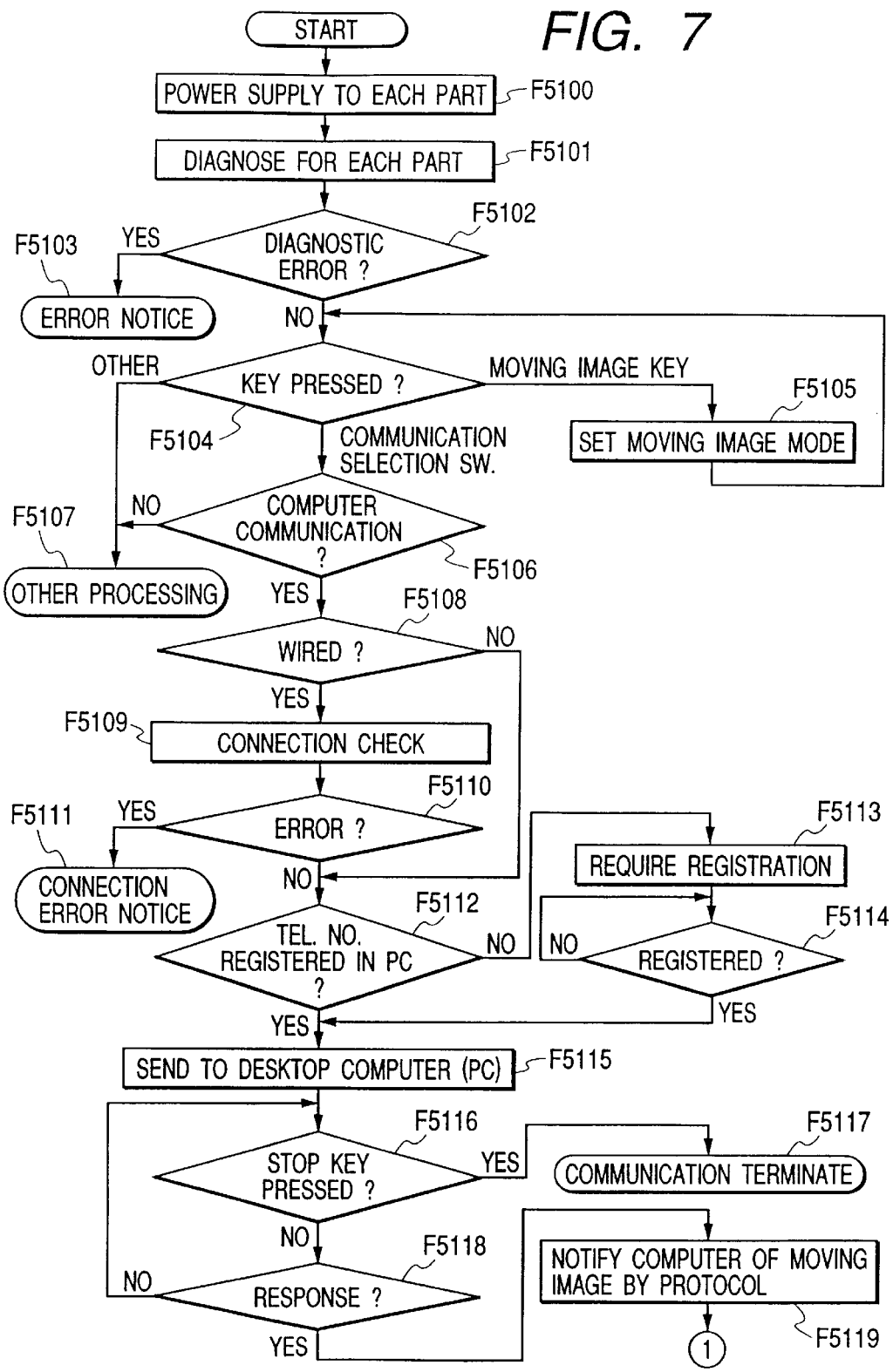
FIG. 7 is a flow chart showing terminal processing according to a first embodiment of the present invention.
Figure 8:
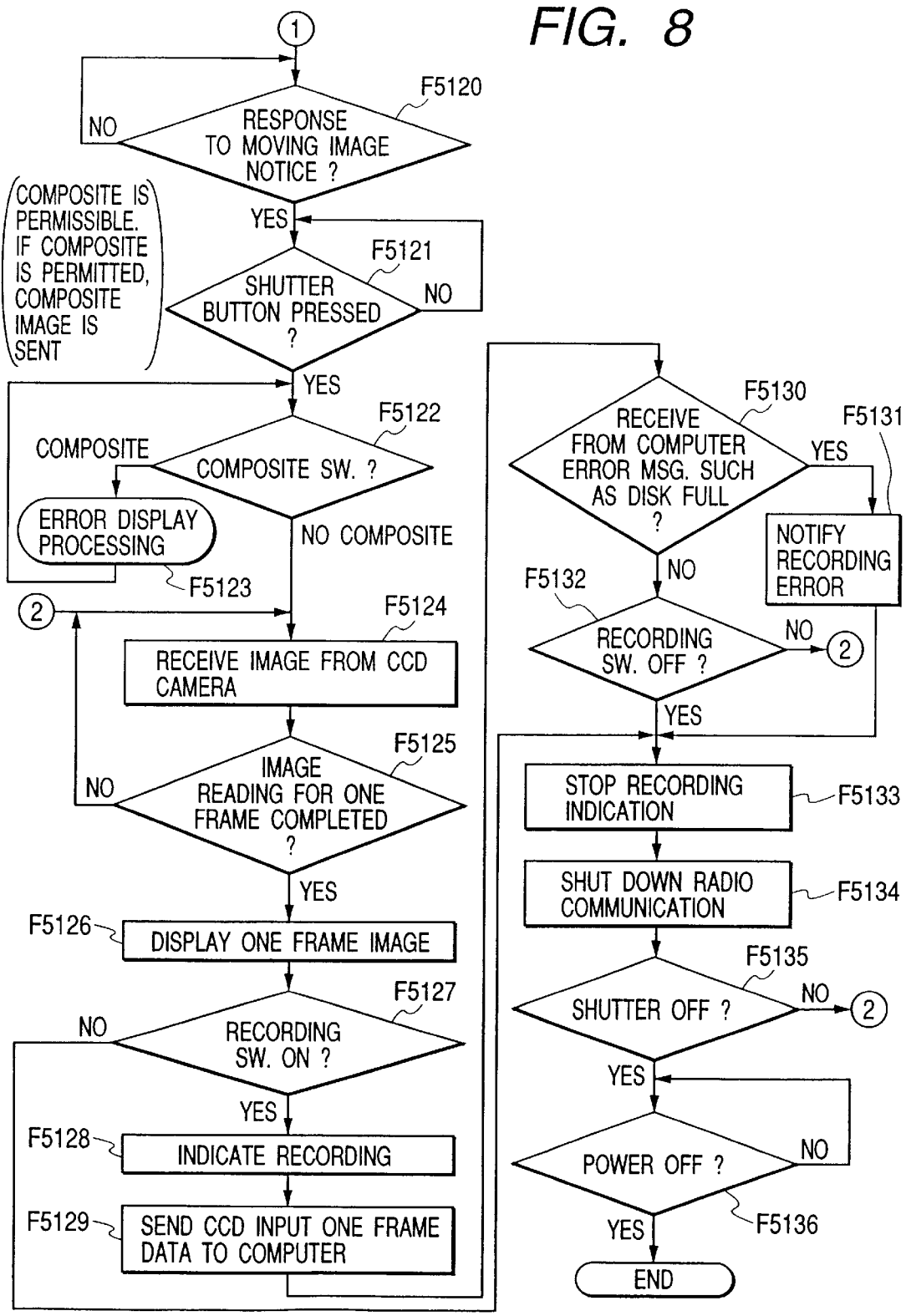
FIG. 8 is a flow chart showing terminal processing following to the terminal processing of FIG. 7.

FIG. 6 shows a flow chart to be manipulated by the operator. FIGS. 7 and 8 are flow charts to be effected by the terminal in response to the operator's manipulation.

First of all, a series of operations and processes in which the image photo-taken by the CCD camera 100 of the terminal 302 or 302a is sent to the desk-top PC 303 with communication and the photo-taken image is recorded in the memory of the desk-top PC 303 will be described.

FIGS. 6 to 8, the power source is turned ON via the power switch 217 (step S4100 in FIG. 6). Electric power is supplied to various processing portions of the terminal from the battery 127 (step S5100 in FIG. 7). When the electric power is supplied, the CPU 109 starts the processing operation in accordance with the program stored in the ROM 114. The CPU 109 firstly checks whether there is malfunction in any of the processing portions (FIGS. 1A and 1B) or not (step F5101). When the diagnosis of various processing portions is finished, the CPU 109 checks whether there is malfunction in any of the blocks or not (step F5102).

If it is judged that there is malfunction, error display is performed (if the display 106 is damaged, sound is generated) or the fact that some function is limited not to use is notified the operator (step F5103). If the diagnosis indicates no malfunction or if the terminal can be partially used with limitation of specification, key input from the key pad 116 is waited (step F5104). Although the receiving from the communication circuit can be permitted also in this condition, in this example, since the receiving function is not directly related, explanation thereof will be omitted.

Then, the moving image key 203 is depressed to designate input of the moving image. In this example, the radio communication is selected (step S4101).

When the moving image key 203 is depressed, the CPU 109 sets the image input mode to the moving image mode (step F5105). Thereafter, the key input waiting condition is restored again (step F5104).

Then, the communication selection switch 209 is depressed to designate the communication method (means) (step S4102). By depressing the communication selection switch 209 within a predetermined time period (within one second in the illustrated embodiment), the communication method is selected.

Whenever the communication selection switch 209 is depressed, the communication means provided in the terminal is switched in the following order or sequence:

(1) radio facsimile communication;
(2) radio computer communication;
(3) wired facsimile communication;
(4) wired computer communication; and
(5) optical communication.

Thus, a desired communication method can be selected. After the communication method is selected, it is judged which communication method is selected.

In the illustrated embodiment, it is assumed that the radio computer communication of the above (2) is selected. And, it is judged whether the computer communication is selected or not (step P5106). If not the computer communication, other processing (facsimile communication or optical communication processing) is executed (step F5107); whereas, if the computer communication is selected, then, it is judged whether the communication is wired communication or radio communication (step F5108).

If the wired communication is selected, it is judged whether the wired circuit is connected or not (step F5109)

and then it is judged whether there is circuit error or not (step F5110). If there is the circuit error (no connection or malfunction of circuit), circuit error is notified the operator (step F5111). When the communication circuit is the radio circuit, the connection check is not performed. After the communication method is checked, when the communication permitting condition is achieved, then, it is ascertained whether the communication address (telephone number) of the recipient desk-top PC (referred to merely as "computer" hereinafter) 303 to which the moving image data is to be sent is set or not (step F5112).

If the communication address of the computer 303 is not set, registration of the communication address is requested to the operator (step F5113) and it is checked whether the registration is completed or not (step F5114). When the registration is completed, the communication address is stored in the RAM 115 and is sent to the recipient registered in the computer 303 so as to establish the circuit connection to the recipient (step F5115). When the communication address has already been registered, the registered address is read out from the RAM 115 and is sent to the recipient. After the sending, it is monitored whether the stop key 221 is depressed or not and whether the computer 303 responds or not (steps F5116, F5117). If the key is depressed, the sending is interrupted (step F5117). After the interruption, the key input waiting condition (step F5104) may be restored.

If the computer 303 responds, since the communication condition that the circuit is connected is attained, in order to negotiate which communication is to be effected between the terminal and the computer 303, the terminal notifies the computer 303 of the fact that the moving image communication is desired (step F5119), and response from the computer 303 regarding the notice is waited (step F5120 in FIG. 8). In this condition, there is a radio communication condition between the terminal and the computer 303, and the computer 303 is waiting for receiving the data from the terminal.

In this condition, when the shutter 216 of the terminal is depressed (step S4103), the CPU 109 of the terminal monitors and discriminates whether the shutter 216 is depressed or not (step F5121).

Here, although the operator may adjust orientation of the camera 214 (step S4104), since only mechanical structures are moved by this adjustment, the CPU 109 does not concern to this adjustment. Then, the composite switch 210 is set to no composite condition (step S4105). Further, the recording switch 206 is turned ON (step S4106). The CPU 109 is waiting while displaying the error until the composite switch 210 is set to no composite condition (step F5122). The reason is that, in this example, communication of the image obtained by composing the image inputted from the CCD camera 100 and other image is inhibited in the moving image communication. If the composing process is added, such communication may be allowed. When no image composite is set, the image from the CCD camera 100 is inputted (step F5124).

The image data inputted from the CCD camera 100 is converted into the digital signal by the A/D converter 101, and the signal is temporarily stored in the field memory 102. The one frame image data is A/D-converted, and it is ascertained whether the result is stored in the field memory 102, and the one frame image data is read-in (step F5125). The read-in image data is A/D-converted and is displayed on the area (at the right from the dotted line) of the display 106 (step F5126). While the image data is being read-out from the field memory to display the image data on the display 106, the timing control circuit 103 holds the timing that the data is not read-in from the CCD camera 100 and the data is not written on the field memory 102, and the result is notified the CPU 109.

When the CPU 109 receives a signal (from the timing control circuit 103) indicating completion of writing of the data on the field memory 102 and reading-out of the data from the field memory 102, the CPU 109 repeatedly controls so that the data is inputted from the CCD camera 100 to the field memory 102 or the data is outputted from the field memory 102 to the display 106. When one frame data is inputted and outputted, the CPU 109 ascertains the condition of the recording switch 206 (step F5127). If the switch 206 is in the recording ON condition, the message "under recording" is displayed on the area of the display 106 at the left from the dotted line x and the LED is turned ON (step F5128).

Then, the displayed one frame data from the field memory 102 is formed as a packet in the communication control portion 118, and the packet is sent to the recipient computer 303 through the radio communication circuit 123 (step F5129). When the sending is finished, it is checked whether error message such as disc (memory) full is not received (step F5130). If not received, again, the condition of the recording switch is checked (step F5132). If the recording switch is ON, next one frame data is inputted (step F5124). This processing is repeated until the recording switch 206 becomes OFF (step S4107).

In the step F5130, if the terminal receives the error message from the computer 303, the error message is displayed on the area of the display 106 at the left from the dotted line x (step F5131), and the message "under recording" is disappeared and the LED is turned OFF (step F5133), and the communication circuit is shut down (step F5134). This processing is similarly effected when the recording switch is OFF in the steps F5127 and F5132. When the shutter key is turned OFF to stop input of the image and displaying of the image (step S4108), the CPU 109 ascertains whether the shutter key is OFF or not (step F5135). If OFF, input of the image and displaying of the image are stopped. Then, the power switch is turned OFF (step S4109). The CPU 109 ascertains whether the power key 217 is OFF or not (step F5136). If OFF, the power switch is turned OFF, and the processing is finished.

Figure 9:
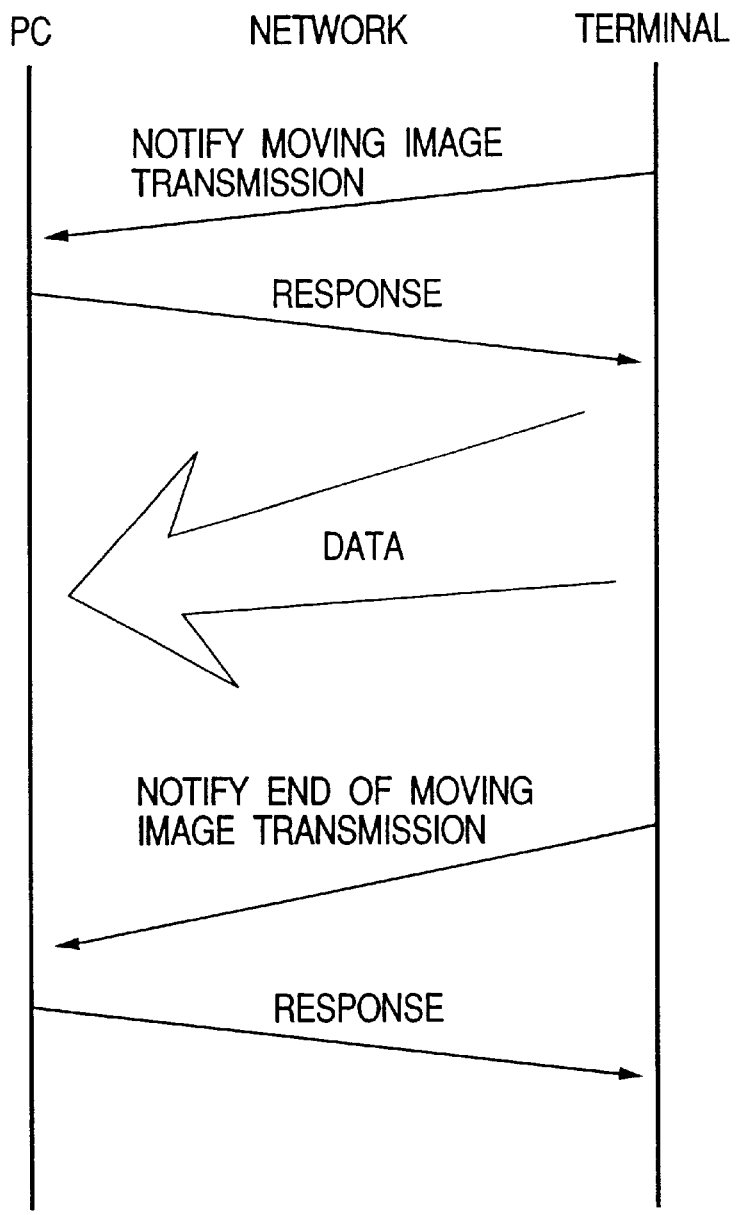
FIG. 9 is an explanatory view showing communication protocol between a computer and the terminal.

FIG. 9 shows a moving image communication procedure after the call is established between the terminal and the computer 303.

When the moving image communication is performed, first of all, the fact that the moving image communication is performed is notified from the terminal to the computer 303. The computer 303 is waiting for receiving this message from the terminal. If receives, it is checked whether the data storing memory is vacant or not. If YES, the CPU returns "response" to the terminal; whereas, if NO, the fact that the data storing memory is not vacant is notified the terminal, and the circuit is shut down. When the terminal receives the response, the terminal sends the moving image data in the form of packet. When the operator stops the recording, the terminal informs the computer 303 of the finish of the moving image communication. When the computer 303 receives this message, the computer returns response to the terminal.

Figure 10:
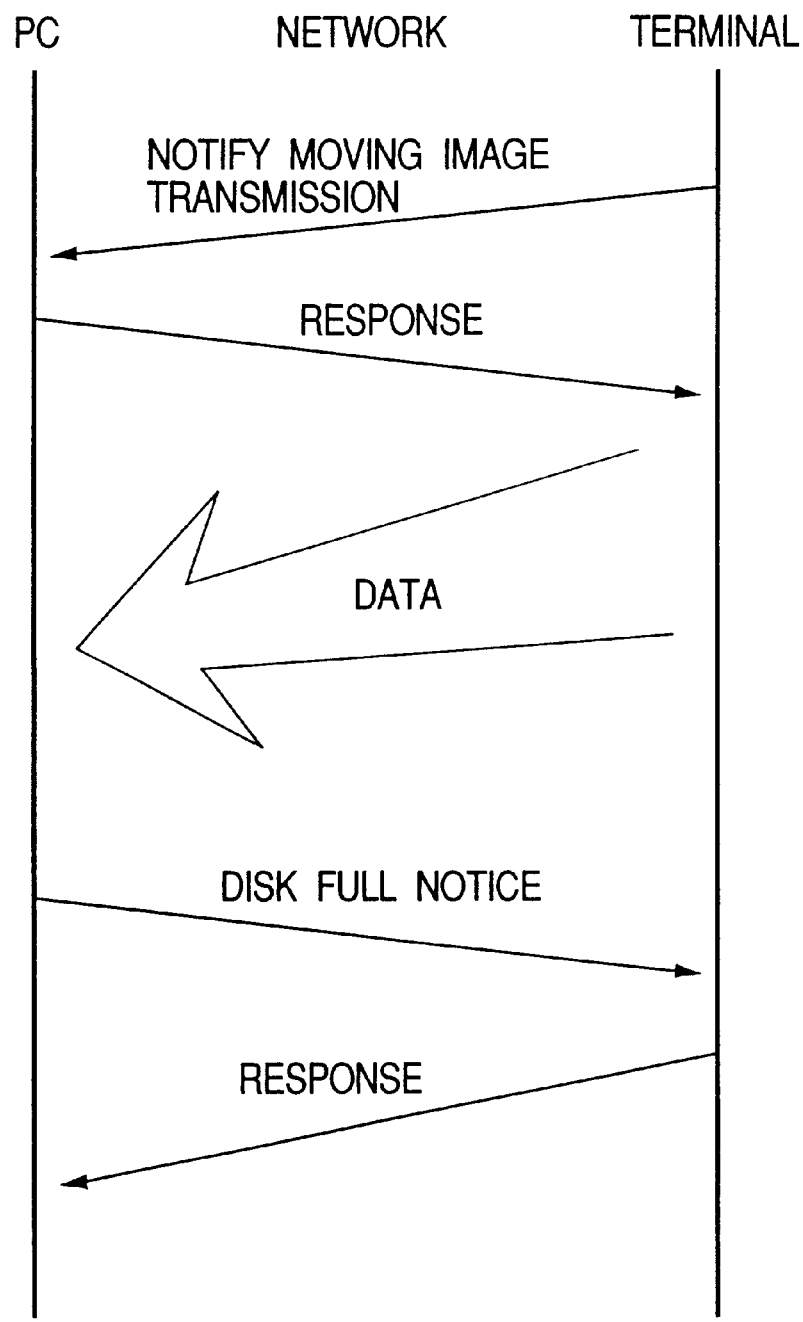
FIG. 10 is an explanatory view showing communication protocol between the computer and the terminal.
Figure 11:
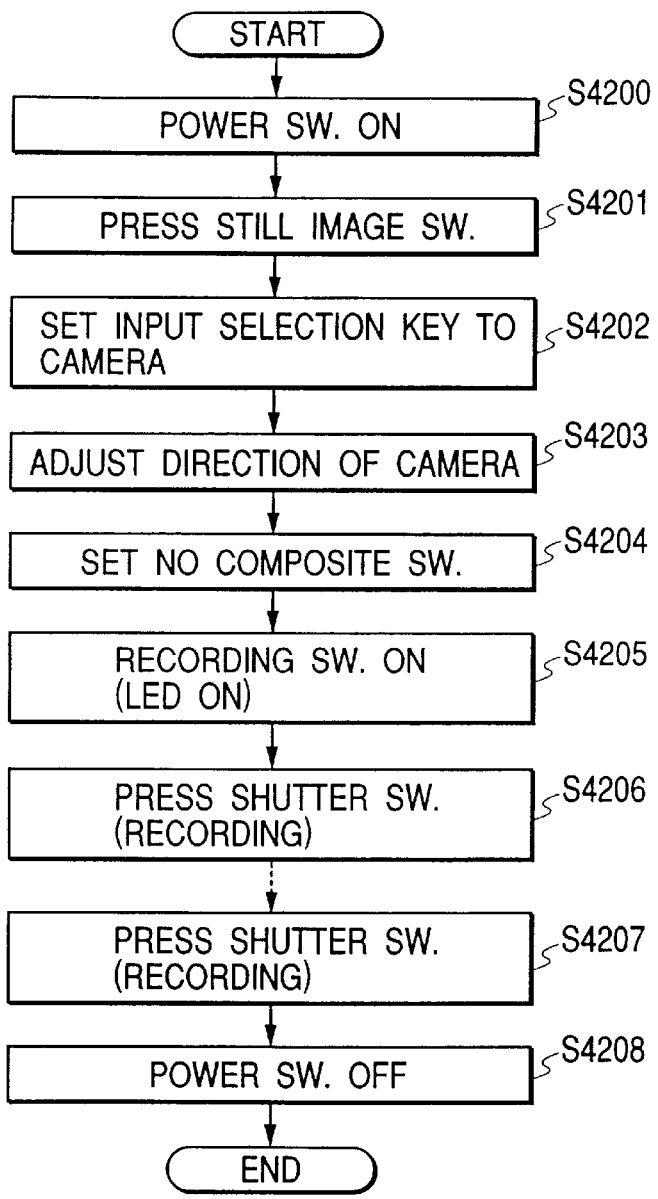
FIG. 11 is a flow chart showing a terminal operation according to a second embodiment of the present invention.
Figure 13:
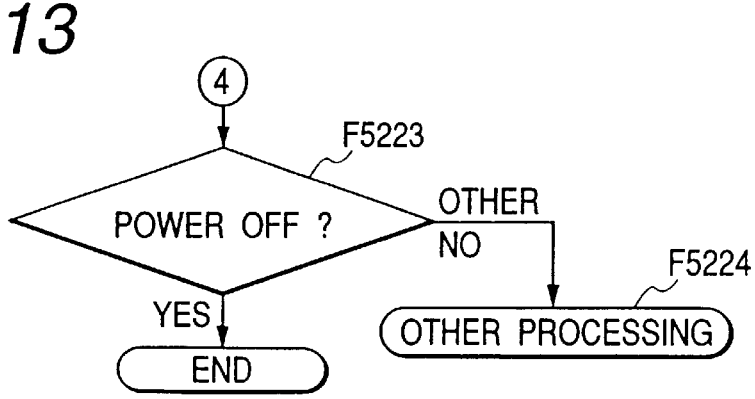
FIG. 13 is a flow chart showing terminal processing following to the terminal processing of FIGS. 12A and 12B.

Similar to FIG. 9, FIG. 10 also shows a moving image communication procedure after the call is established between the terminal and the computer 303, but shows a procedure when the receiving data storing memory of the computer 303 becomes "full" on the way. In this case, even while the data is being received, the message indicating "full" of memory is sent from the computer 303 to the terminal, and the terminal returns response, and the communication is finished.

As apparent from FIGS. 9 and 10, although the computer 303 also requires to provision of communication means and software for executing protocol for effecting communication to the terminal, since only the protocol is different and the other constructions are the same as personal computer communication, explanation thereof will be omitted.

SECOND EXAMPLE

Next, a second embodiment of the present invention will be explained with reference to FIGS. 11, 12A, 12B and 13. Incidentally, the same elements as those in the first embodiment are designated by the same reference numerals and explanation thereof will be omitted.

(Function 2)

In this example, a still image is photo-taken by the CCD camera and is recorded, and data of the still image is stored in the image memory 113 of the terminal.

(Concrete Example)

Since a procedure from a step S4200 (power switch is turned ON) to finish of diagnosis is the same as that in the first embodiment, explanation thereof (steps F5200, F5201, F5202, F5203) will be omitted. When the diagnosis is finished, the key input waiting condition is established (step F5204).

Then, the still image key 202 is depressed to indicate the fact that the image to be inputted is the still image (step S4201). When the still image key 202 is depressed, the CPU 109 sets the image input mode to the still image mode (step F5205).

Then, the input switch key 220 is set to "camera" position (step S4202). When the input switch key 220 is set to "camera" position, the CPU 109 detects that condition and sets the image data input source to the CCD camera 100 so that the image data from the touch panel 108 and the scanner 129 are not read-in (step F5225). Further, the image is inputted from the CCD camera 100 and is displayed on the display 106. The displaying method is the same as the moving image in the first embodiment.

Again, the key input waiting condition is established (step F5206). If necessary, the orientation of the CCD camera 100 may be adjusted while ascertaining the camera input image displayed on the display 106 (step S4203). Since the adjustment of the orientation is merely mechanical, the CPU 109 does not concern to this adjustment. Further, the composite switch 210 is set to no composite condition (step S4204).

Then, when the recording switch 206 is depressed (step S4205), the message "under recording" is displayed and the LED is turned ON (step F5208). In the key input waiting condition (steps F5204, F5206), if any key which does not relate to the input of the still image from the CCD camera 100 is depressed, the processing corresponding to the depressed key is executed (step F5207). When the message "under recording" is displayed and the LED is turned ON, the condition of the composite switch is ascertained (step F5209). In this case, even when the switch is set to the no composite condition, it is checked whether or not any data is reserved in the field memory (step F5210). If reserved, since there is the composite data in spite of the fact that no composite is designated, the error message is displayed (step F5211).

In the step F5209, if the composite switch is in the composite condition ("revise" or "new"), it is checked whether the data to be composed is reserved in the field memory 102 or not (step F5212). If NO, since there is no composite data in spite of the fact that the composite is designated, the error message is displayed (step F5213). In the step F5209, even when the composite switch is either in the composite condition or in the no composite condition, the key depression waiting condition is established (step F5214).

In this input waiting condition, when the shutter key 216 is depressed (step S4206), again, it is checked whether the input switch 220 is in the "camera" position or not (step F5215). If NO, a message for requesting the operator for switching the input switch 220 to the "camera" position is displayed (step F5217). Thereafter, the key input waiting condition (step F5204) is restored. In the key depression waiting condition (step F5214), if any key is not depressed, it is checked whether the power switch is OFF or not (step F5223). If NO, other processing is effected (step F5224).

In the step F5215, if the input switch is in the "camera" position, one frame image is inputted from the CCD camera 100 and the image is displayed on the display 106 (step F5216). In this condition, the one frame image inputted from the CCD camera 100 is stored in the field memory 102, so that the still image has been photo-taken.

Then, again, the composite switch 210 is checked. If the switch is in the "revise" position, the composed image is replaced by the previous non-composed image (step F5219). In the step F5218, if the switch is not in the "revise" position (i.e., in the "new" or "no (composite)" position), it is checked whether the recording switch is ON and the image memory 111 is vacant (step F5220). If not vacant, the fact that the memory is not vacant is notified (step F5222). Thereafter, the program may be returned to the step F5204 to establish the key input waiting condition. If vacant, the inputted still image is recorded as new image data (step F5221). Here, when the shutter key 216 is depressed again (step S4207), the same processing when the shutter key 216 is depressed in the step F5214 is repeated. When the power OFF is designated by depressing the power key 217 in the step F5214 (step S4208), the supplying of the electric power is stopped and the processing is finished.

THIRD EXAMPLE

Next, a third embodiment of the present invention will be explained with reference to FIGS. 14 to 18. Incidentally, the same elements as those in the first and second embodiments are designated by the same reference numerals and explanation thereof will be omitted.

(Function 3)

In this example, a moving image photo-taken by the CCD camera is compressed and is sent to the communication recipient in real time. Further, in the receiver, the received data is expanded and is displayed on the display.

(Concrete Example)

Figure 14:
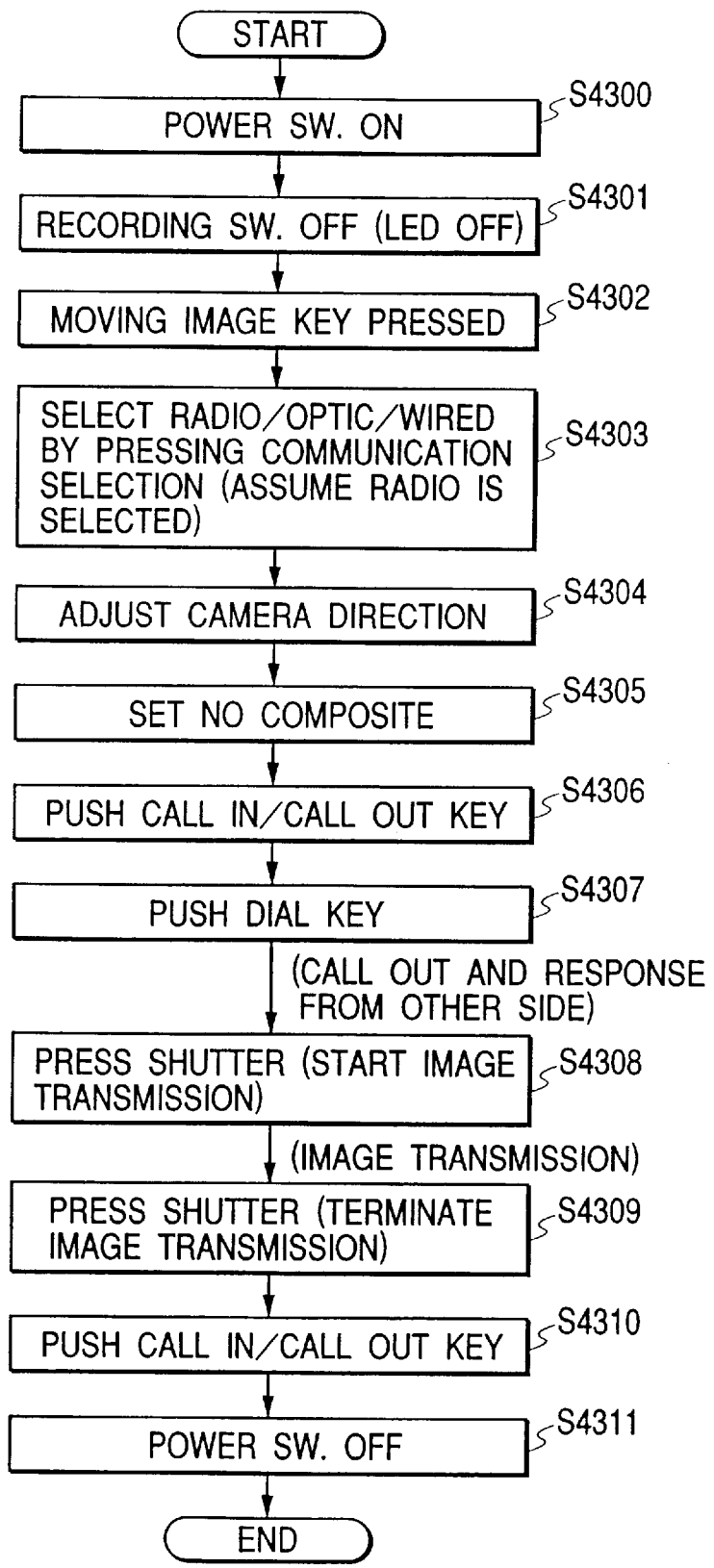
FIG. 14 is a flow chart showing a terminal operation according to a third embodiment of the present invention.
Figure 15A:
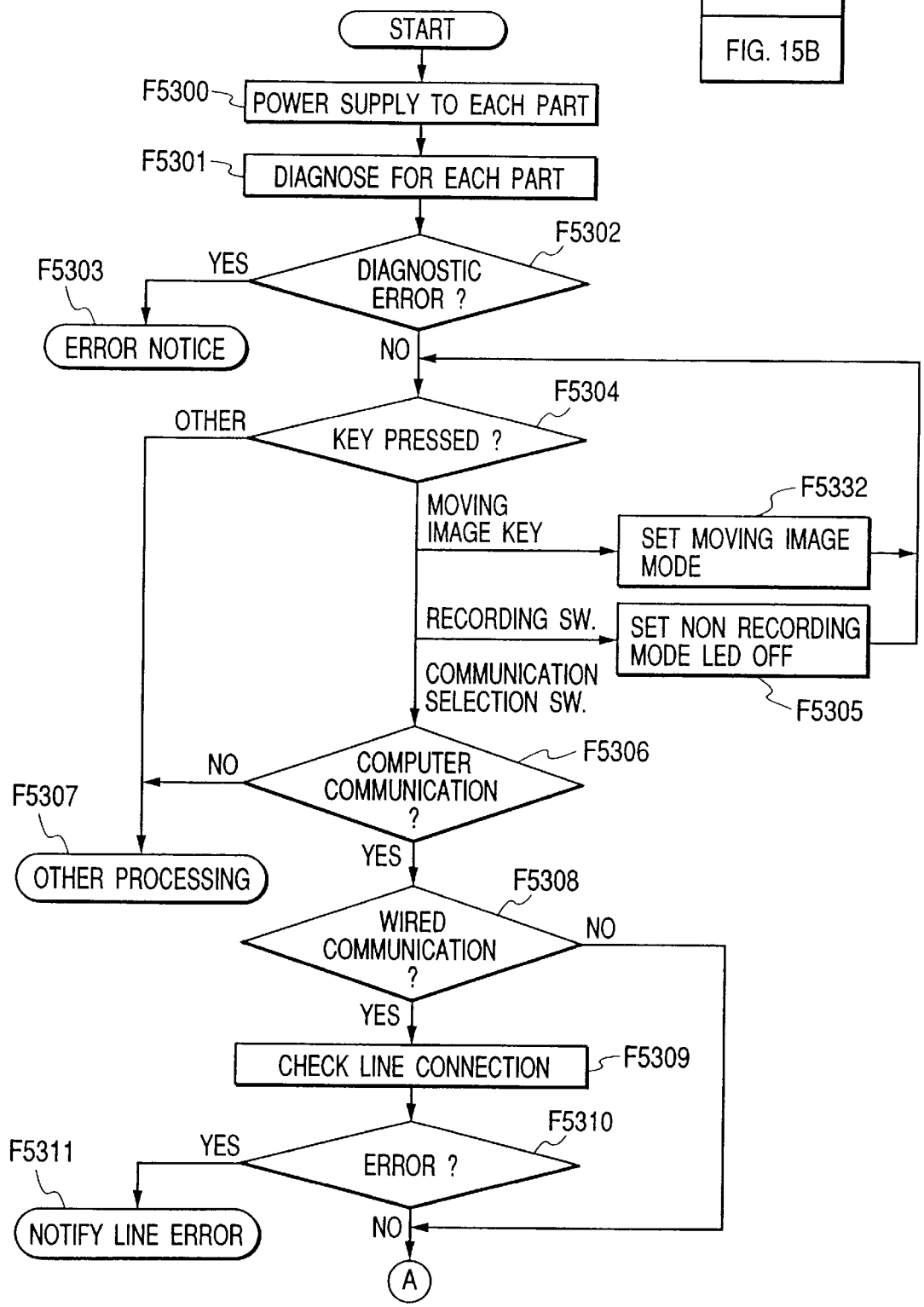
FIG. 15 which is composed of FIGS. 15A and 15B are flow charts showing terminal processing (call-out) according to a third embodiment of the present invention.
Figure 15B:
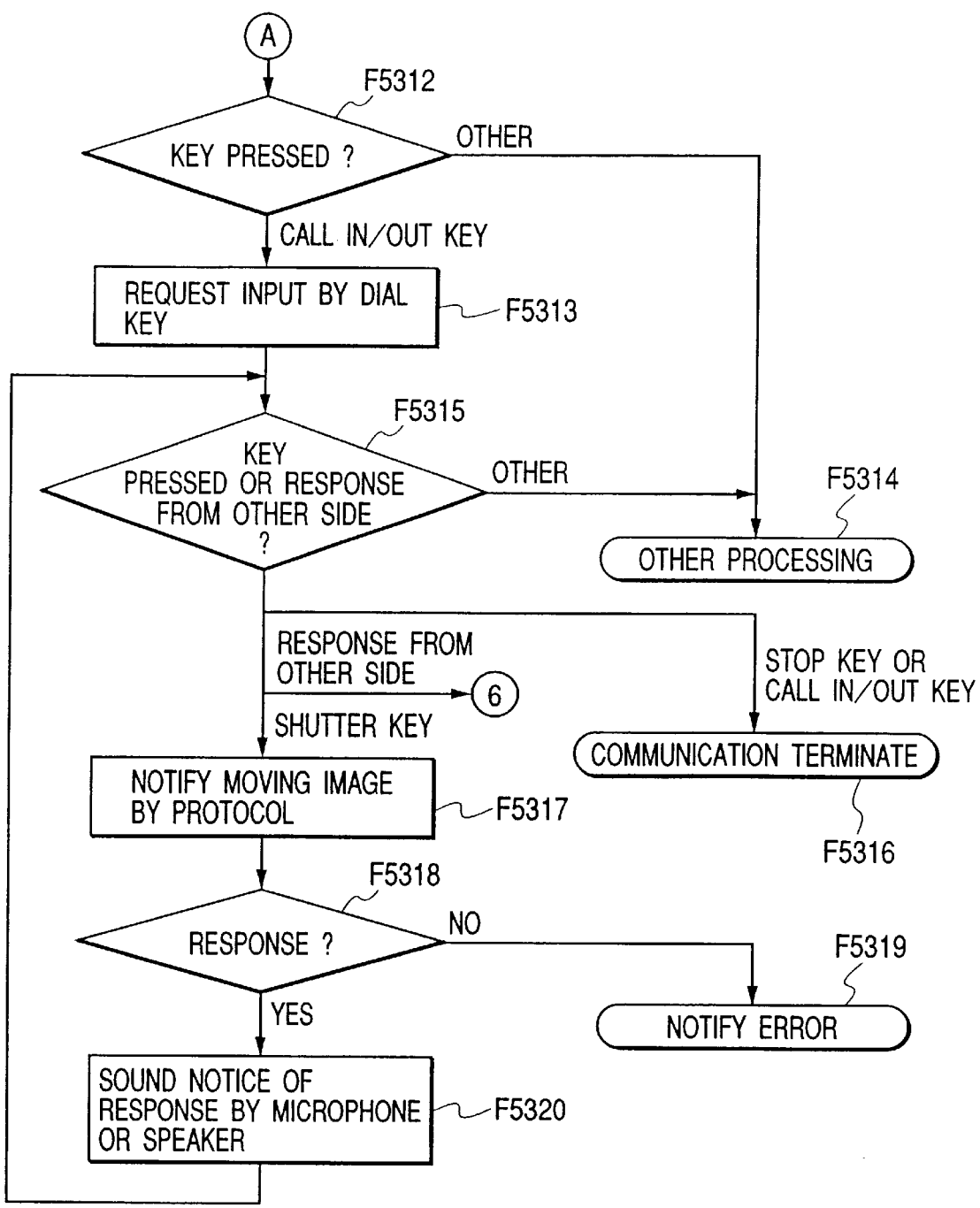
Figure 16:
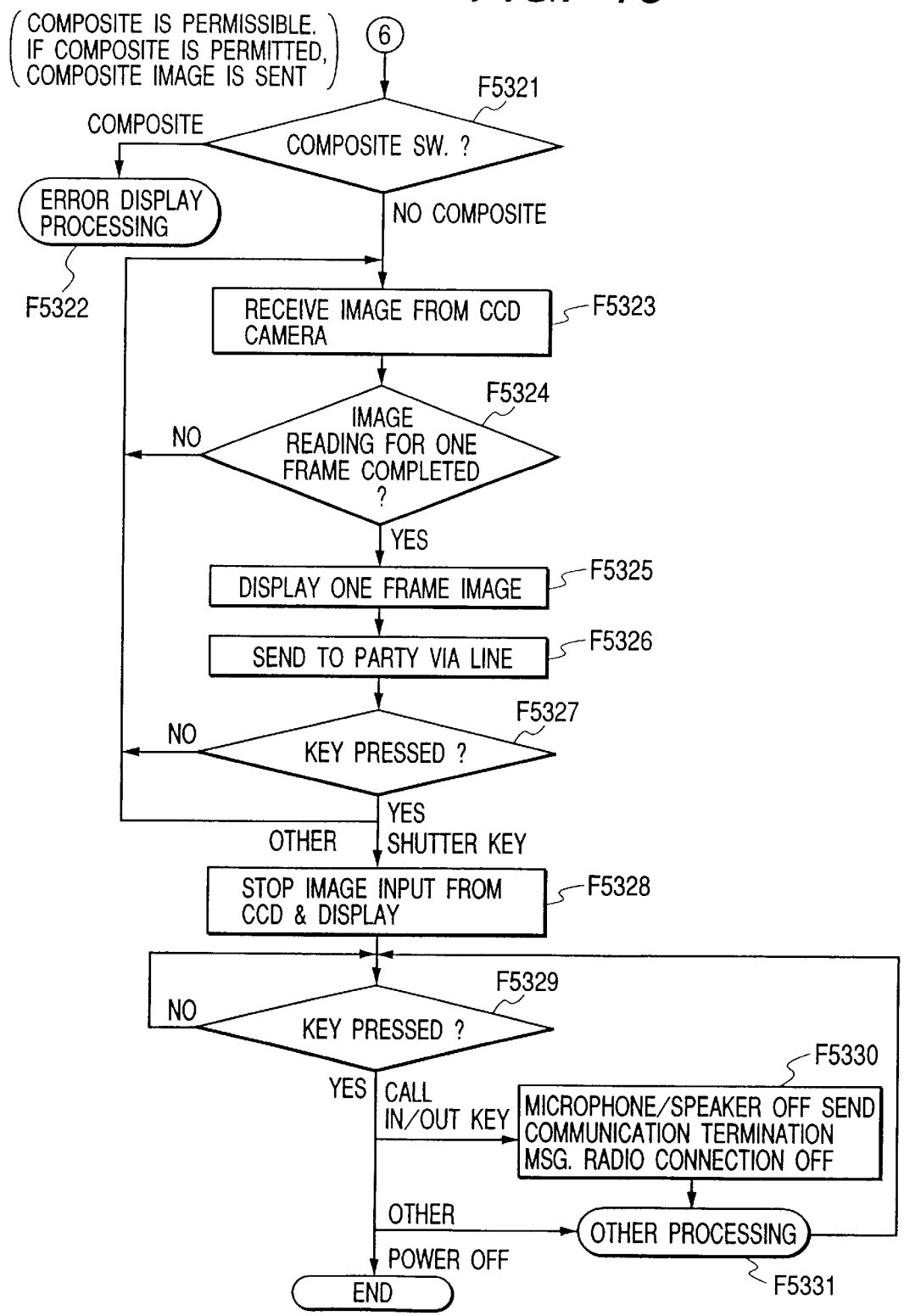
FIG. 16 is a flow chart showing terminal processing following to the terminal processing of FIGS. 15A and 15B.

In the processing (sending) in FIGS. 14 to 16, since a procedure from a step S4300 (power switch is turned ON) to finish of diagnosis is the same as that in the first embodiment, explanation thereof (steps F5300, F5301, F5302, F5303) will be omitted.

When the diagnosis is finished, the key input waiting condition is established (step F5304). When the recording switch 206 is set to a recording OFF condition (non-recording mode) (step S4301), the CPU 109 detects the set condition and sets the terminal to the recording OFF mode (step F5305).

Further, when the moving image key 203 is depressed (step S4302), the image input mode from the CCD camera is set to the moving image mode (step F5332). In the key input waiting condition in the step F5304, when the communication switch 209 is depressed to set the communication means, the communication means is set. Here, as is in the first embodiment, it is assumed that the computer communication with radio circuit to the computer 303 is selected (step S4303).

In the step F5304, when other key is depressed, the processing corresponding to the depressed key is effected (step F5307). When the communication means is set, it is checked whether the communication is the computer communication or not (step F5306). If NO, corresponding processing is effected (step F5307).

If the computer communication is selected, it is checked whether the communication is the wired communication or not (step F5308). If YES, it is checked whether the wired circuit is connected (step F5309) and whether there is circuit error (step F5310). If there is circuit error (not connected or malfunction of circuit), the circuit error is notified the operator (step F5311). In the step F5308, if the communication circuit is the radio circuit the circuit check is not effected. At this point, the orientation of the CCD camera 100 may be checked (step S4304), and the operator sets the composite switch 210 to the no composite condition (step S4305).

The CPU 109 checks the setting condition of the composite switch 210. When the checking of the communication method is finished, then, the communication address (telephone number) of the recipient to which the moving image data is to be sent is waited (step F5321). In order to effect dialing, first of all, a call-out/call-in key 222 is pushed (step S4306). When this key is pushed, the inputting of the dial number is requested to the operator (step F5313), and the operator inputs the dial number (step S4307). When the dial number is inputted, the terminal sends the data to the recipient through the computer communication control portion 118 and the radio communication circuit 123, and then the key input waiting condition is restored (step F5315).

Here, when the call-out/call-in key 222 or the stop key 221 is depressed again, the sending is interrupted (step F5316), and, thereafter, the key input waiting condition is restored (step F5315). When there is response without interruption (a signal of response is notified the CPU 109 through the radio communication circuit 123 and the computer communication control portion 118), the execution of the moving image communication is notified the recipient computer 303 by protocol (step F5317).

It is ascertained whether response to the notice is received or not through the radio communication circuit 123 and the computer communication control portion 118 (step F5318). If there is no response, error is notified the operator (display or sound) (step F5319). If there is response, the microphone 134 and the speaker 135 are turned ON to permit the voice communication, and the fact that the communication to the recipient computer 303 is permitted is notified the operator by sound or display (step F5320).

In this condition, the voice communication can be effected. Voice data inputted from the microphone 134 is coded in a sound coding portion 137 and is compressed. In the computer communication control portion 118, a half of the transfer capacity of the communication circuit is assigned to the voice communication, and the data is changed to a frame shape and then is sent. Since the voice data sent from the recipient computer 303 is formatted in the same frame as the sending frame, the frame is decomposed in the computer communication control portion 118 and is sent to the sound coding portion 137, where the code is decoded (depressed) and expanded, and then is outputted from the speaker 135.

In the key input and response waiting condition in the step F5315, when the shutter key 216 is depressed (step S4308), the condition of the composite key 210 previously set by the operator is ascertained (step F5321). If the composite condition ("revise" or "new") is selected, since the composing with other image is not allowed in the moving image mode, the error message is displayed (step F5322). If no composite is selected, the image is read-in from the CCD camera 100 (step F5323), and the image data inputted from the CCD camera 100 is converted into the digital signal in the A/D converter 101 and is temporarily stored in the field memory 102. The one frame image data is A/D-converted and it is ascertained whether the converted data is stored in the field memory 102. Then, the reading-in of one frame data is waited (step F5324).

When the one frame data is read-in, the data is converted in a D/A converter 105 and is displayed on the display 106 (step F5325). In this case, however, the data is displayed in a small zone of the area at the right from the dotted line x of the display 106, and the image data sent from the recipient computer 303 is displayed on the other area. While the image data is being read out from the field memory 102 in order to display the data on the display 106, the timing control circuit controls the timing so that the data is prevented from being read-in from the CCD camera and being written in the field memory 102, and the CPU 109 is notified.

When the CPU 109 receives a signal (from the timing control circuit 103) indicating completion of writing of the data on the field memory 102 and reading-out of the data from the field memory 102, the CPU 109 repeatedly controls so that the data is inputted from the CCD camera 100 to the field memory 102 or the data is outputted from the field memory 102 to the display 106. When one frame data is inputted and outputted, the data is sent to the recipient computer 303 through the computer communication control portion 118 and the radio communication circuit 123 (step F5326). After entered into the field memory 102, the moving image data is coded and compressed in the code processing portion 110 and is sent to the computer communication control portion 118, and a half of the transfer capacity of the communication circuit is assigned to the moving image data communication, and the data is changed to a frame shape and then is sent. Since the moving image data sent from the recipient computer 303 is formatted in the same frame as the sending frame, the frame is decomposed in the computer communication control portion 118 and is sent to the code processing portion 110, where the code is decoded (depressed) and expanded, and then is temporarily stored in the field memory 102 and is outputted to the display 106.

Then, the CPU 109 ascertains presence/absence of depression of the key and kind of the depressed key (step F5327). If the key is not depressed, the inputting of the image from the CCD camera 100, displaying of the image and sending of the image are repeated. Even when any key not relating to the above processing is depressed, the inputting of the image, displaying of the image and sending of the image are repeated. When the shutter key 216 is depressed (step S4309), the inputting of the image from the CCD camera 100, displaying of the image on the display 106 and sending of the image are stopped (step F5328).

The key input waiting condition is restored again (step F5329). When the call-out/call-in key 222 is depressed (step S4310), the microphone 134 and the speaker 135 are turned ON, and the CPU 109 controls the computer communication control portion 118 and the radio communication circuit 123 and sends a communication termination message with data frame and shuts down the radio circuit (step F5330). In the key input waiting condition in the step F5329, if any key not relating to this example is depressed, the processing corresponding to the depressed key is effected (step F5331). When the power key 217 is depressed, the power source is turned OFF and the processing is finished (step S4311). Incidentally, when received, the operator call-out/call-in key 222 is depressed to effect response, thereby starting the communication.

Figure 17:
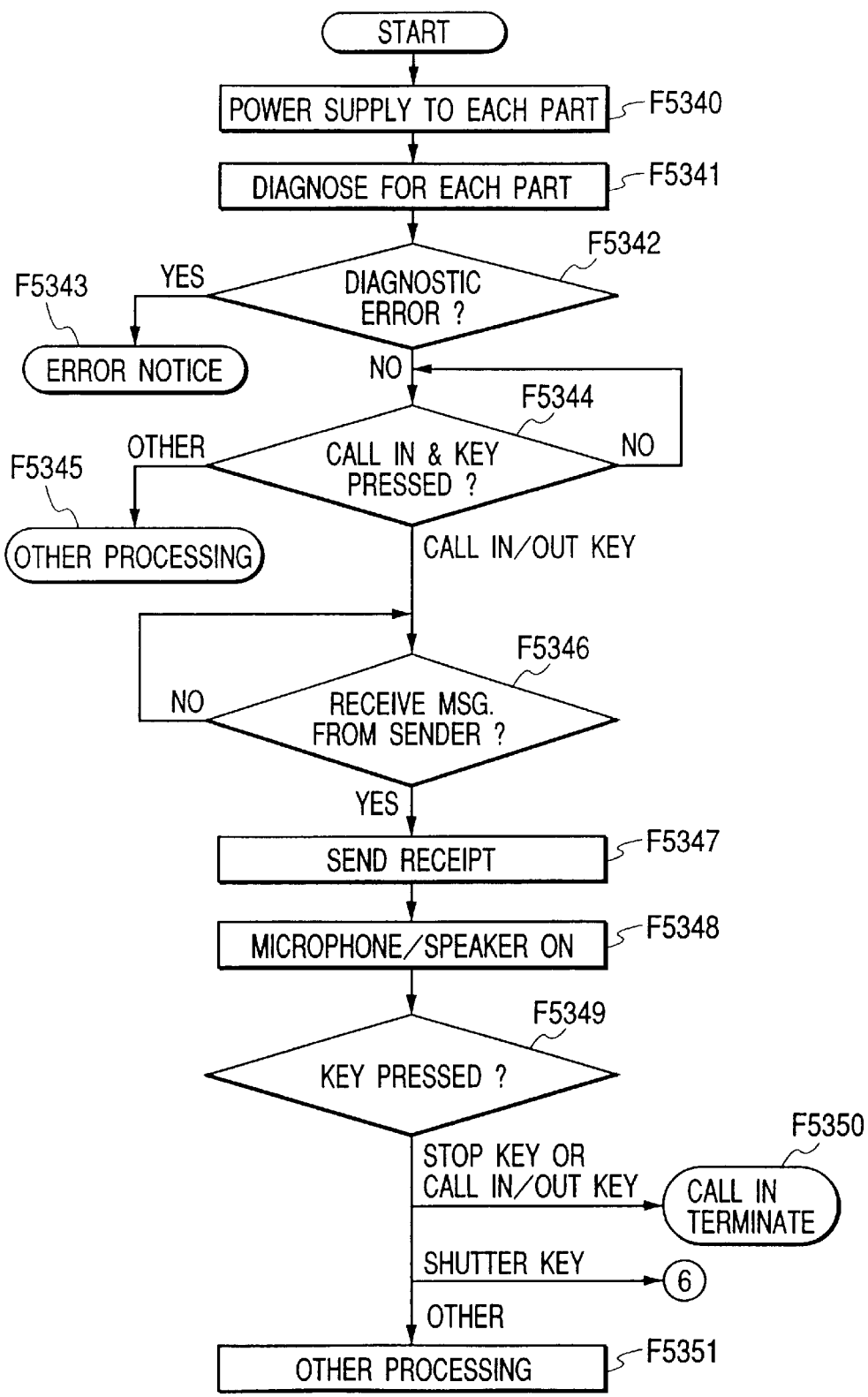
FIG. 17 is a flow chart showing terminal processing (call-out) according to the third embodiment.

In the processing (receiving) in FIG. 17, a procedure from a step in which the power switch is turned ON to finish of diagnosis is the same as the procedure shown in FIGS. 15A, 15B and 16 (step F5340 to F5343).

Thereafter, the key input waiting condition is established (step F5344). When any key other than the call-out/call-in key 222 is depressed, the processing corresponding to the depressed key is effected (step F5345). When the call-out/call-in key 222 is depressed, a message informing of execution of the moving image communication is waiting from the sending terminal (step F5346). When the message is received, response to the message is effected (step F5347), and the microphone 134 and the speaker 135 are turned ON (step F5348).

In this condition, the voice communication can be permitted, and the key input waiting condition is restored again (step F5349). In this key input waiting condition, when the stop key 221 or the call-out/call-in key 222 is depressed, the sending is interrupted (step F5350). When the shutter key 216 is depressed, the same processing as the sending is effected. If any key other than the shutter key 216 is depressed, the processing corresponding to the depressed key is effected (step F5351), and the key input waiting condition is restored again.

Figure 18:
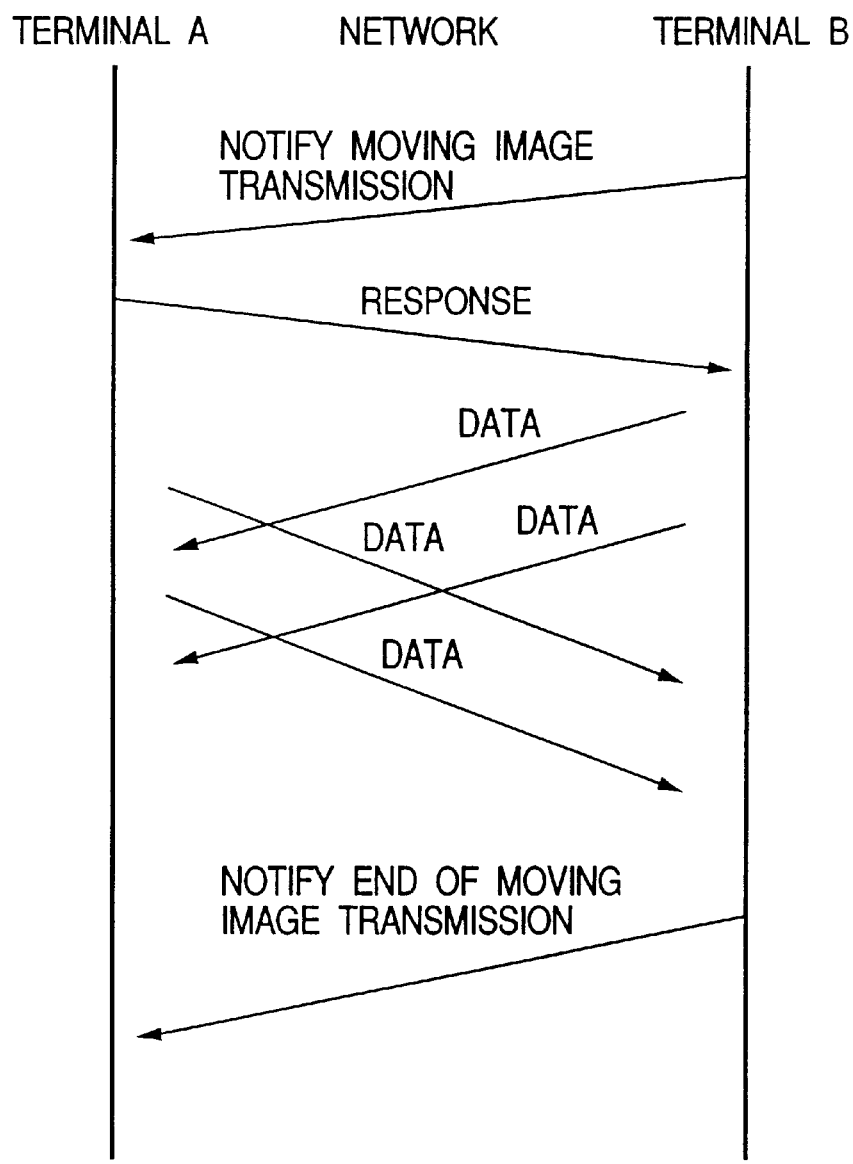
FIG. 18 is an explanatory view showing communication protocol between terminals.

FIG. 18 shows a procedure for effecting the moving image communication between the terminals.

When the "call" is set, the sending terminal B informs the receiving terminal A of a message indicating execution of the moving image communication. The information is sent with frame for sending the moving image. When this message is received, the receiving terminal A effects response. As a result, the data of the voice communication and the moving image communication can be transmitted between the terminals. When the communication is finished, termination of the moving image communication is transmitted from either sending or receiving terminal (or both), and the receiver effects response. In this way, the communication is completed.

FOURTH EXAMPLE

Next, a fourth embodiment of the present invention will be explained with reference to FIGS. 19 to 22. Incidentally, the same elements as those in the first to third embodiments are designated by the same reference numerals and explanation thereof will be omitted.
(Function 4)

In this example, the data is inputted from the touch panel 108 by the input pen 128, or the data is inputted from the scanner 129. The data inputted from such input means is stored in the image memory of the apparatus.
(Concrete Example)

Figure 19:
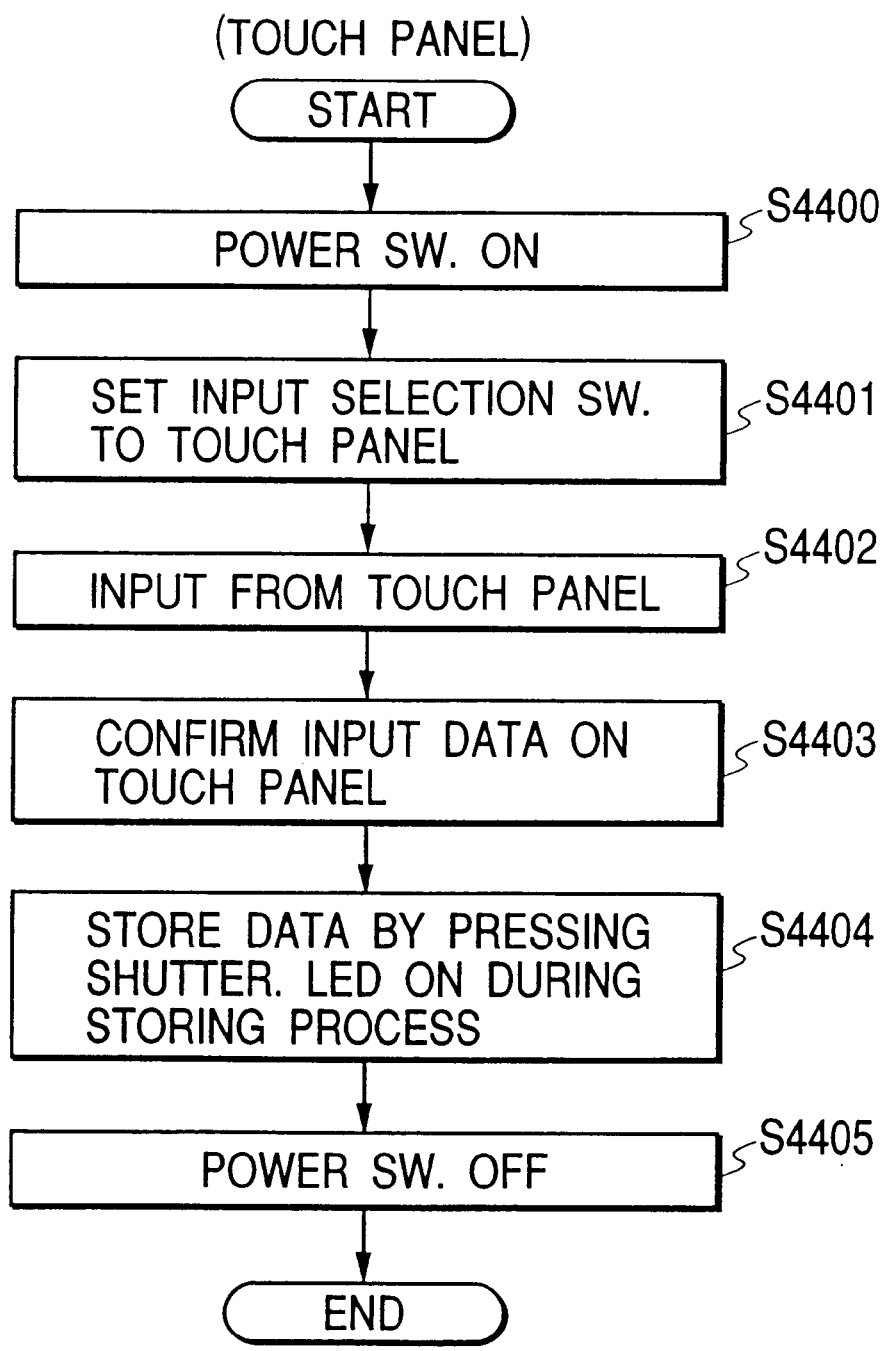
FIG. 19 is a flow chart showing a terminal operation (touch panel) according to a fourth embodiment of the present invention.
Figure 20:
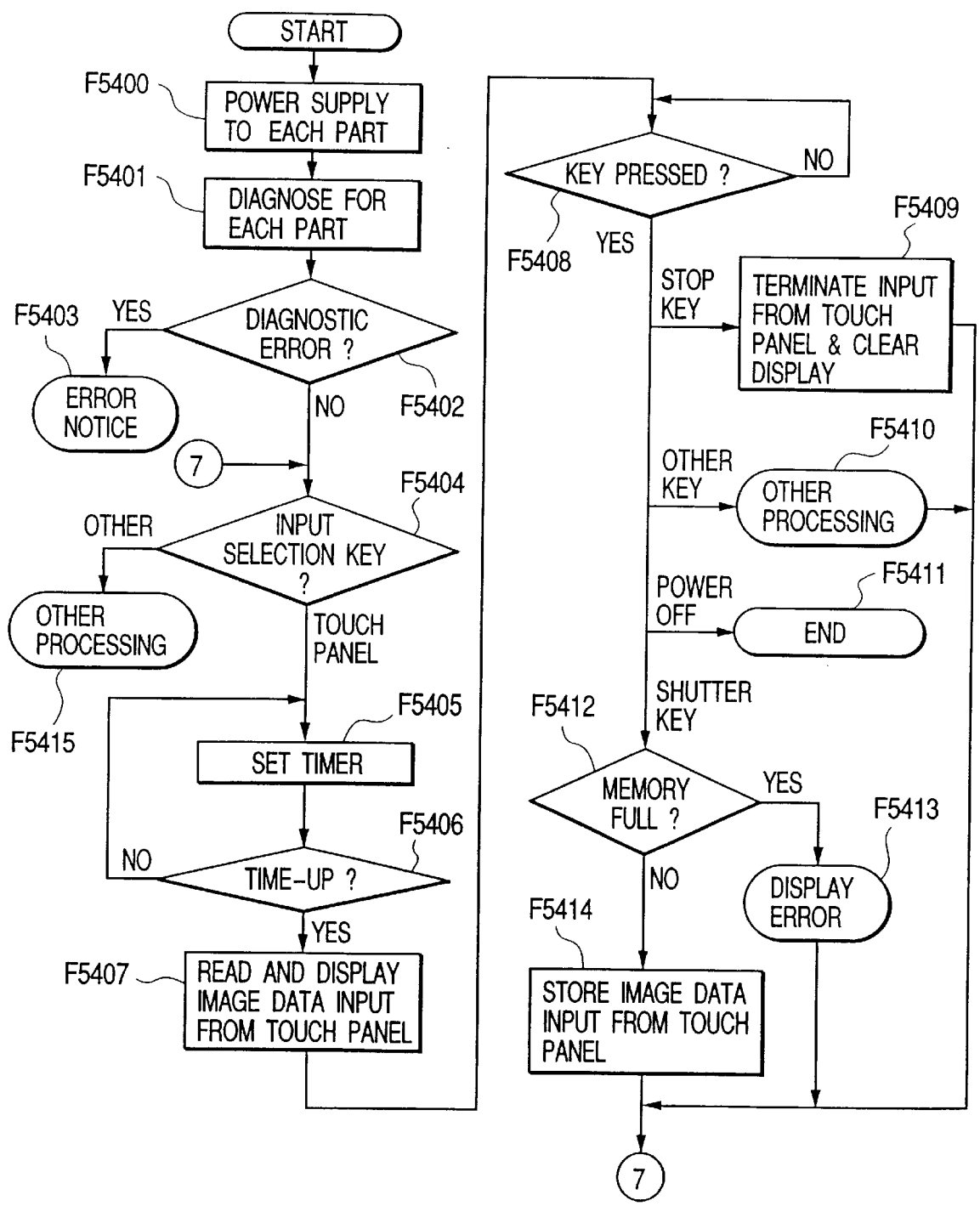
FIG. 20 is a flow chart showing terminal processing (touch panel) according to a fourth embodiment of the present invention.

First of all, the handling of the touch panel will be described with reference to FIGS. 19 and 20. Since a procedure from a step S4400 (power switch is turned ON) to finish of diagnosis is the same as that in the first embodiment, explanation thereof (steps F5400, F5401, F5402, F5403) will be omitted.

When the diagnosis is finished, the key input waiting condition is established (step F5404). Then, the input selection key 220 is set to the "pen" position (touch panel 108) (step S4401). The CPU 109 checks whether the input selection key 220 is in the "pen" position or not. If no "pen" position, the corresponding processing is executed (step F5415). If the input selection key is set to the "pen" position, the input from the scanner 129 or the CCD camera 100 is not allowed (if input is tried the field memory 102 does not reserve the data, or, the power source is controlled not to supply the electric power to such processing part).

When the touch panel 108 is set, a timer (not shown) included in the CPU 109 is set (step F5405). The timer serves to monitor time on the basis of a given time lapse signal from the time count circuit notifying whenever a given time is elapsed. Time-up of the timer is waited (step F5406); mean while, if the operator inputs the data from the touch panel 108 (step S4402), after the time-up of the timer, the inputted data is read-in as the image data and is displayed on the display 106 (step F5407).

The position detector 107 detects a position on the display 106 on which the data inputted from the touch panel 108 is displayed, and the data is stored in the temporary memory 104, and the data is converted in the data converter 131 to form the same data style as that obtained by A/D-converting the image data from the CCD camera 100, and the data style is inputted to the field memory 102 and is displayed on the area of the display 106 at the right from the dotted line x.

When the data inputted for a given time period is displayed, then, the key input condition is restored (step F5408). Here, when the stop key 221 is depressed, the inputting from the touch panel 108 is interrupted, and the data which has been inputted till now is cleared (step F5409), and, the input selection waiting condition is restored again (step F5404).

In the step F5408, when the shutter key 216 is depressed, it is checked whether the memory is vacant or not (step F5412). If not vacant, the error message informing that fact is displayed on the area of the display 106 at the left from the dotted line x (step F5413), and input selection waiting condition is restored (step F5404). If the memory is vacant, the image data inputted from the touch panel 108 is stored in the memory (step F5414). Further, in the step F5408, if the power OFF is designated, the power source is shut down, and the processing is terminated (step F5411). If any key other than the above is depressed, the corresponding processing is effected (step F5410).

Figure 21:
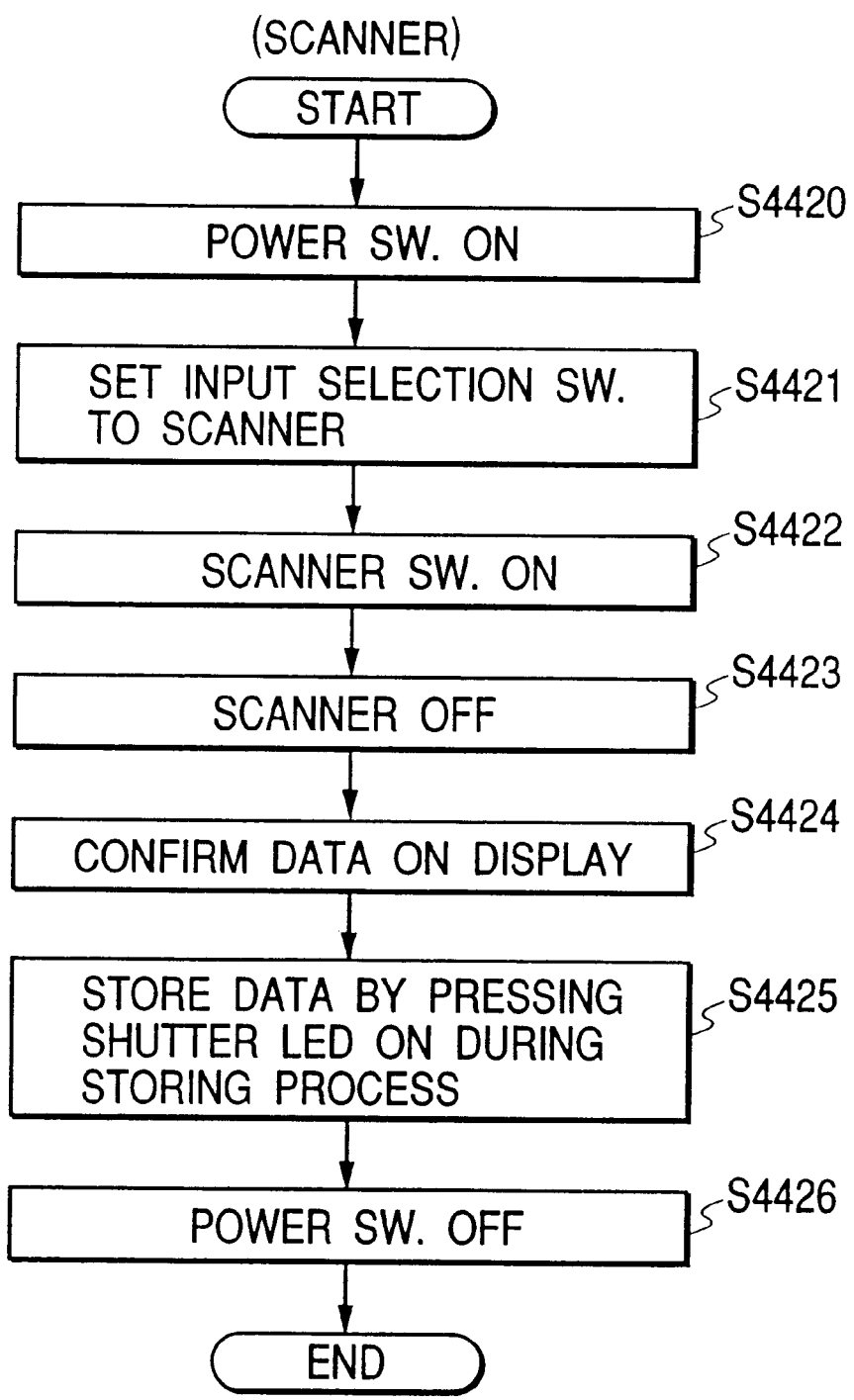
FIG. 21 is a flow chart showing a terminal operation (scanner) according to the fourth embodiment.
Figure 22:
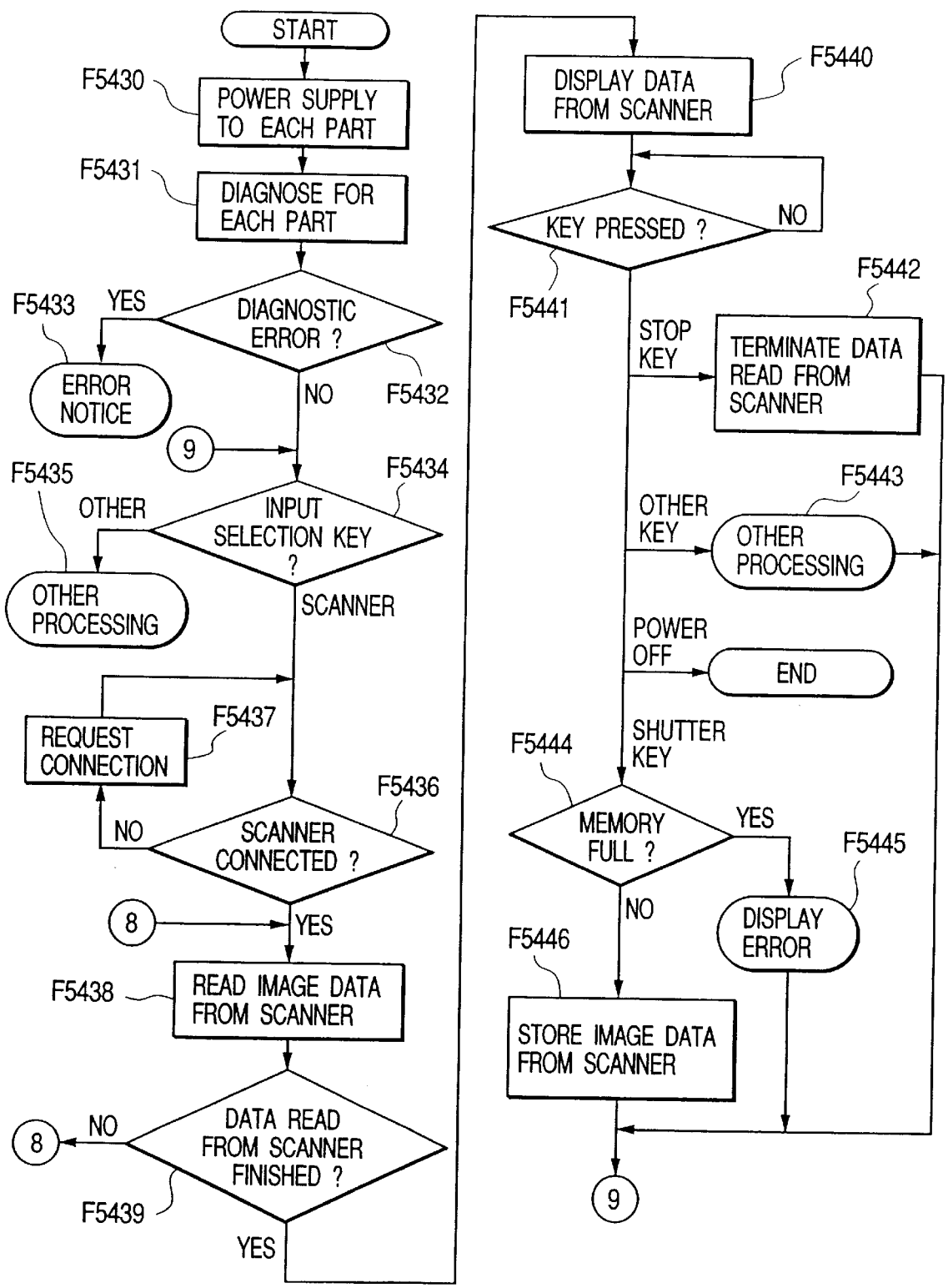
FIG. 22 is a flow chart showing terminal processing (scanner) according to the fourth embodiment.

Next, the handling of the scanner 129 will be described with reference to FIGS. 21 and 22.

When the data is inputted from the scanner 129, since a procedure from a step S4420 (power switch is turned ON) to finish of diagnosis is the same as that in the touch panel 108, explanation thereof (steps F5430 to F5433) will be omitted.

When the diagnosis is finished, the key input waiting condition is established (step F5434). Then, the input selection key 220 is set to the "scanner" position (scanner 129) (step S4421). The CPU 109 checks whether the input selection key 220 is in the "scanner" position or not. If no "scanner" position, the corresponding processing is executed (step F5435). If the input selection key is set to the "scanner" position, it is checked whether the scanner 129 is connected to the terminal (step F5436). If the scanner is not connected to the terminal, the CPU requests the operator for effecting connection (step F5437), and the connection is waited. When the connection is completed, the operator turns ON a reading switch 243 for the scanner 129 (step S4422).

The CPU 109 is waiting for the data sent from the scanner 129. If the data is sent, the data is read-in (step F5438).

When the data is read-in from the scanner 129, the data is stored in the temporary memory 104, and it is checked whether the data inputted from the scanner 129 is finished or not (step F5439). If not finished, the reading-in of the data is continued. If finished the reading switch 243 is turned OFF in a step S4423, and the read data is displayed on the display 106 (step F5440), as is in the touch panel 108. The operator ascertains the read data on the display 106 (step S4424).

At this point, the key input waiting condition is restored (step F5441). If the stop key 221 is depressed, the scanner input is interrupted and the display is cleared and the input selection waiting condition is restored (step F5434). If the power OFF is desired, the power source is shut down and the processing is terminated. If the shutter key 216 is depressed, it is checked whether the memory is vacant or not (step F5444). If the memory is vacant, the image data inputted from the scanner 129 is stored in the memory (step F5446), and the input selection waiting condition is restored. If not vacant, the error message is displayed (step F5445). If any key other than the above is depressed, the corresponding processing is effected (step F5443). Incidentally, steps S4425 to S4426 are the same as the steps S4404 to S4405.

FIFTH EXAMPLE

Next, a fifth embodiment of the present invention will be explained with reference to FIGS. 23 to 28. Incidentally, the same elements as those in the first to fourth embodiments are designated by the same reference numerals, and explanation thereof will be omitted.
(Function 5)

In this example, the data inputted from the CCD camera and the data inputted from the input pen or the scanner composed. There are two methods for achieving such composite. In a first method, the image previously photo-taken by the CCD camera and the image previously inputted from the touch panel or the scanner are composed. In a second method, the image inputted from the touch panel or the scanner is composed with the image presently photo-taken by the CCD camera.
(Concrete Example)

Figure 23:
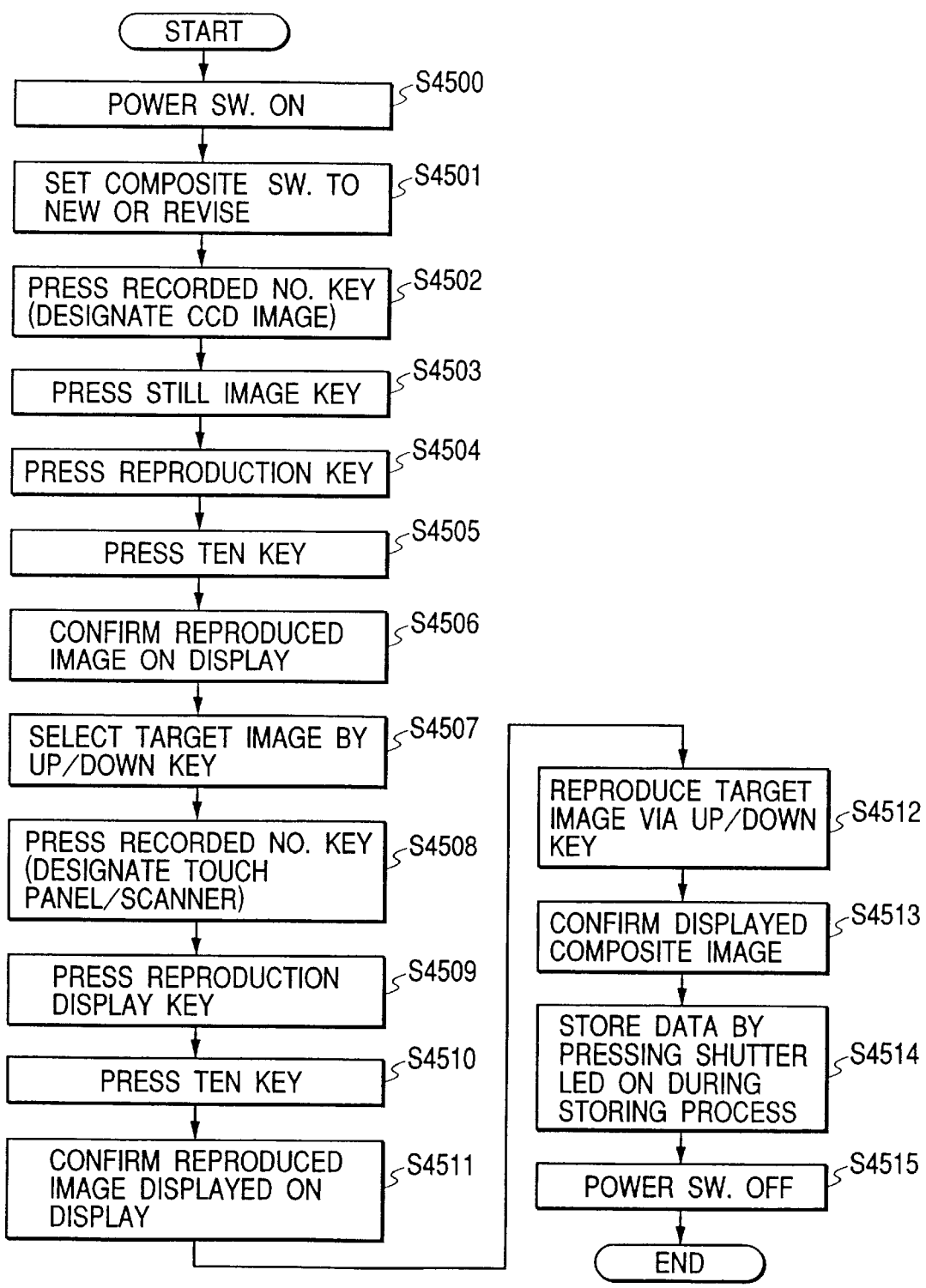
FIG. 23 is a flow chart showing a terminal operation (first example) according to a fifth embodiment of the present invention.
Figure 24:
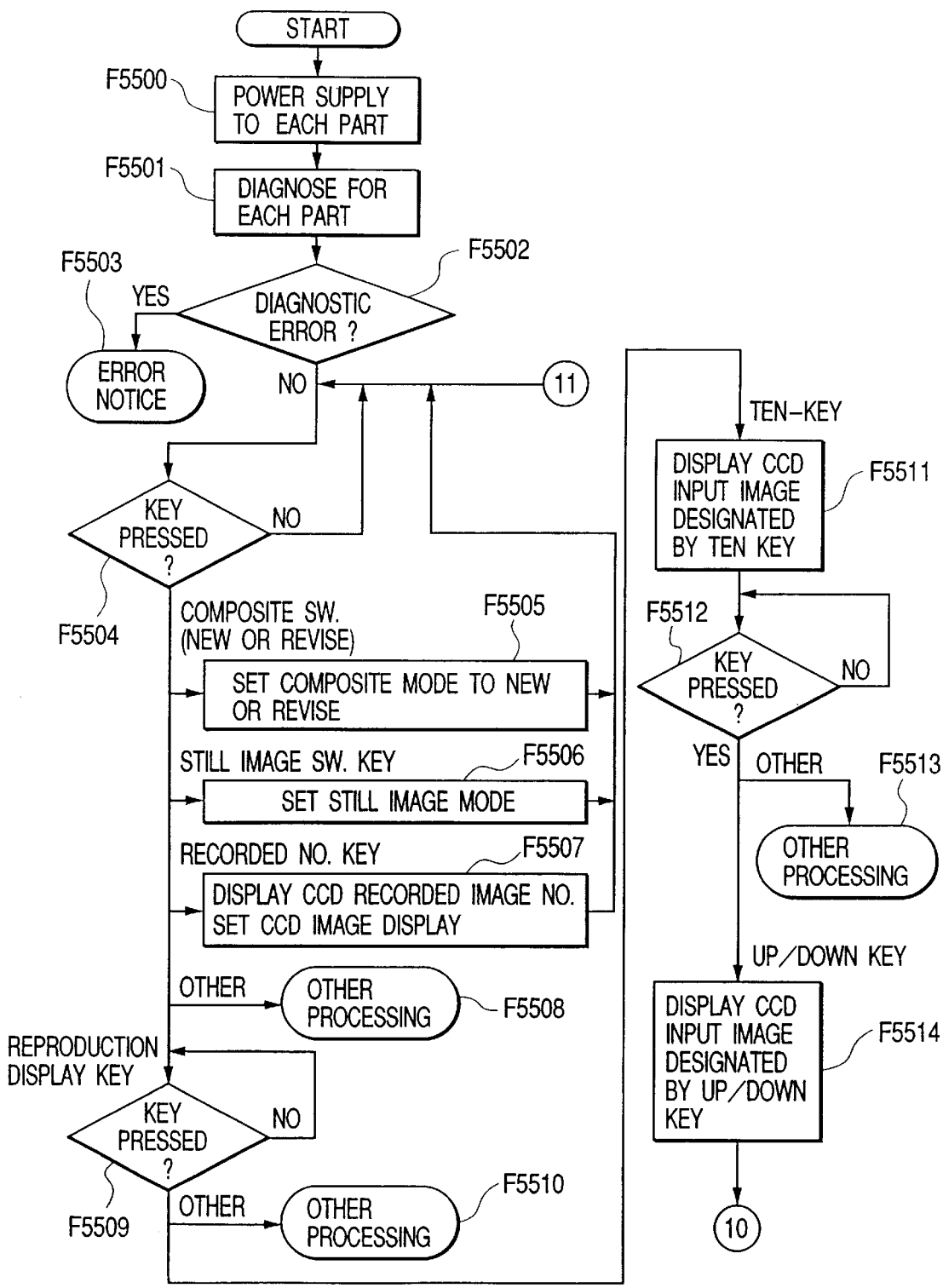
FIG. 24 is a flow chart showing terminal processing according to a fifth embodiment of the present invention.
Figure 25:
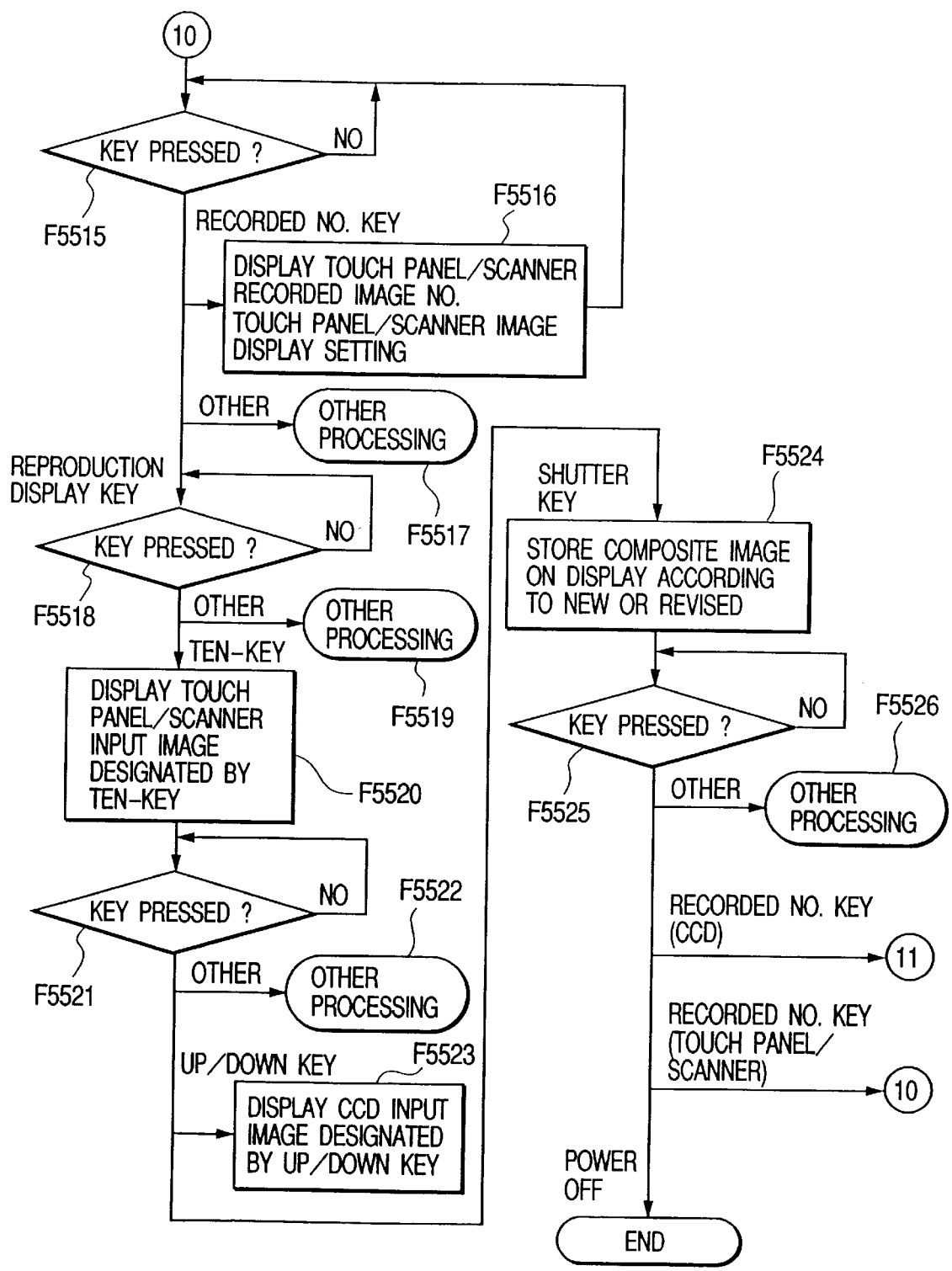
FIG. 25 is a flow chart showing terminal processing following to the terminal processing of FIG. 24.

First of all, a method for displaying the previously photo-taken image and writing another image on the image will be explained with reference to FIGS. 23 to 25.

Since a procedure from a step S4500 (power switch is turned ON) to finish of diagnosis is the same as that in the first embodiment, explanation thereof (steps F5500 to F5503) will be omitted.

When the diagnosis is finished, the key input waiting condition is established (step F5504). Then, the composite switch 210 is set to the "new" or "revise" position (step S4501). The composite mode is stored in the RAM 115 of the CPU 109 (step F5505).

Then, a recorded image number key 207 is depressed (step S4502) to indicate the displaying of the inputted image from the CCD camera 100 and to display a stored number of the image data inputted from the CCD camera 100 on the area of the display 106 at the right from the dotted line x, and the number of data is ascertained. When the recorded image number key 207 is depressed, the CPU 109 reads out the number of CCD input images stored in the RAM 115, and the read-out value is font-developed in the field memory 102 by using font stored in the ROM 114 and then is displayed on the display 106 (step F5507).

Then, the still image key 202 is depressed (step S4503) to designate that the image inputted from the CCD camera 100 is the still image (as expanded specification, although it is considered to reproduce and display the moving image, in such a case, the moving image is received from the recipient computer 303 via communication and then is reproduced and displayed). The designation of the still image input is also stored in the RAM 115 (step F5506). If any key other than the above keys and keys relating to the reproduction and display is depressed, the corresponding processing is effected (step F5508), since such processing is not directly relates to this example.

When a reproduction/display key 223 is depressed (step S4504), then, the input of the CCD input image to be reproduced and displayed is waited (step F5509). Here, if any key other than the numeral key is depressed, the corresponding processing is effected (step F5510). When the numeral key is depressed (step S4505), the compressed CCD input image corresponding to the inputted numeral is read-out from the image memory 113, and the read-out image is expanded in the code processing portion 112 and is developed in the field memory 102 and then is displayed on the area of the display 106 at the right from the dotted line x (step F5511). The operator can confirm the image (step S4506).

Incidentally, the number of the image data to be reproduced and displayed may be checked at the time when it is inputted, and, if the data is erroneous data (for example, the data number exceeds the storable data number), the CPU requests the operator for effecting the input again. When the designated image data is reproduced and displayed, the key input waiting condition is restored again (step F5512). Here, if any non-valid key is depressed, the corresponding processing is effected (step F5513).

If the UP/DOWN key (a part of the reproduction/display key 223) is depressed (step S4507), the image data having the number greater or smaller than the data now being displayed by 1 (one) is displayed (step F5514) in the same manner as the aforementioned example. In this way, the displaying of the target CCD input image is completed.

Then, the image inputted from the touch panel 108 or the scanner 129 is displayed. Now, the operator pushes the recorded image number key 208 to indicate the fact that the image inputted from the touch panel or the scanner is to be displayed (step S4508). The CPU 109 is in the key input waiting condition (step F5515) to monitor the depression of the recorded image number key 208. When the recorded image number key 208 is depressed, the CPU 109 reads out the number of the stored image inputted from the touch panel 108 or the scanner 129 from the RAM 115, and the read-out image number is displayed on the area of the display 106 at the left from the dotted line x in the same manner as the number of the CCD input image. Further, the internal displaying/processing mode is set to the touch panel/scanner image displaying mode (step F5516).

Here, if any key not relating to the display processing is depressed, the corresponding processing is effected (step F5517). After the operator confirms the number of the stored image, the reproduction/display key 223 is depressed (step S4509). As a result, the CPU 109 becomes the reproduction display waiting (key input) condition (step F5518). If the erroneous data is inputted, the error message is displayed or processing corresponding to the depressed key is effected (step F5519).

When the correct data is inputted (step S4510), the CPU 109 reads-out the designated image data from the image memory 111, and the read-out data is developed in the field memory 139 while being expanded in the code processing portion 110 and then is displayed (step F5520). The operator confirms the composed image data (step S4511). The CPU 109 returns to the key input waiting condition again (step F5521). Then, when the UP/DOWN key (a part of the reproduction/display key 223) is depressed (step S4512), the image data having the number greater or smaller than the data now being displayed by 1 (one) is displayed (step F5523) in the same manner as the aforementioned example. In this way, the displaying of the target touch panel or scanner input image is effected, and the composed image is confirmed (step S4513).

The CPU 109 returns to the key input waiting condition in the step F5521. Here, if the shutter key 216 is depressed (step S4514), the LED indicating the message "under recording" is turned ON, and the data of the field memory 139 is transferred to the field memory 102, where the data are composed, and the data of the field memory 102 is compressed in the code processing portion 112 and then is stored in the image memory 113, in response to the setting of the composite switch to the "new" or "revise" position (step F5524).

The CPU 109 returns to the key input waiting condition again (step F5525). If the CCD image display or the touch panel/scanner image display is designated again, the same processing as the above is repeated; whereas, if any key other than the above is depressed, the corresponding processing is effected (step F5526). If the power switch is turned OFF (step S4515), the power source is shut down and the processing is terminated.

Figure 26:
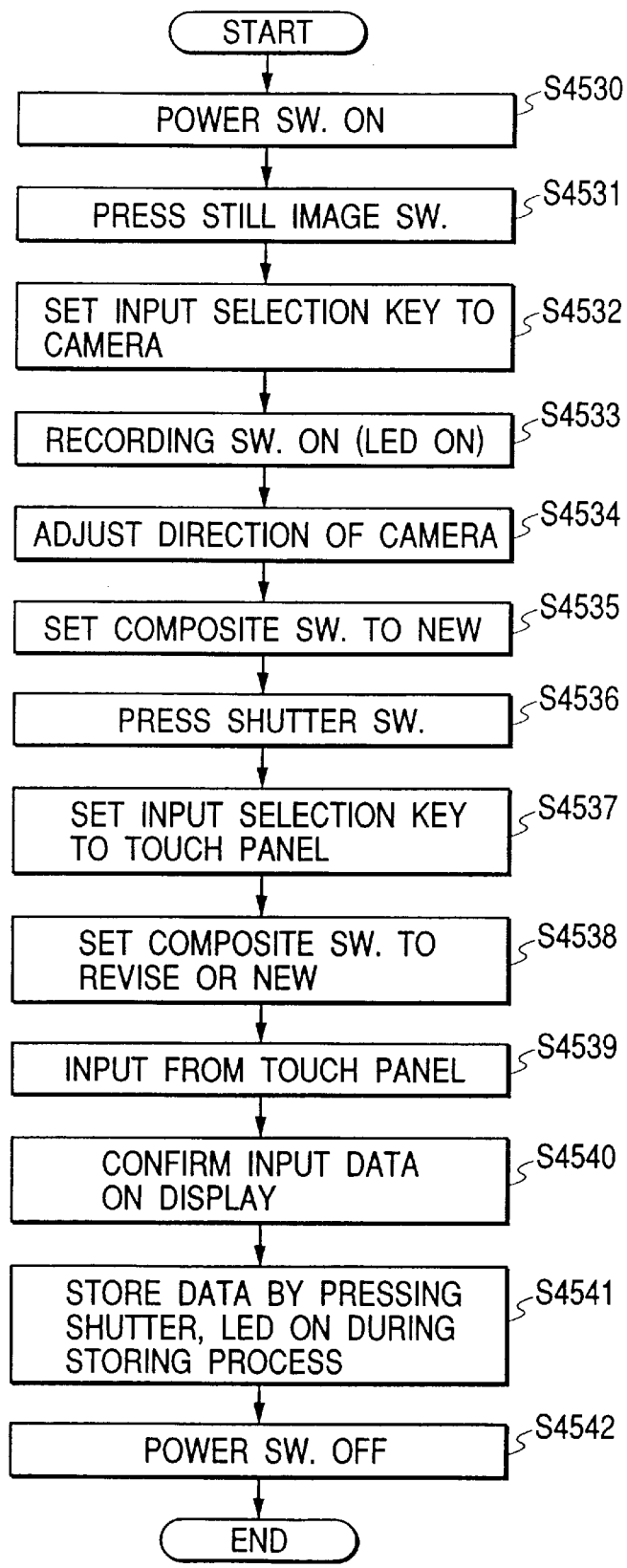
FIG. 26 is a flow chart showing a terminal operation (second example) according to the fifth embodiment.
Figure 27:
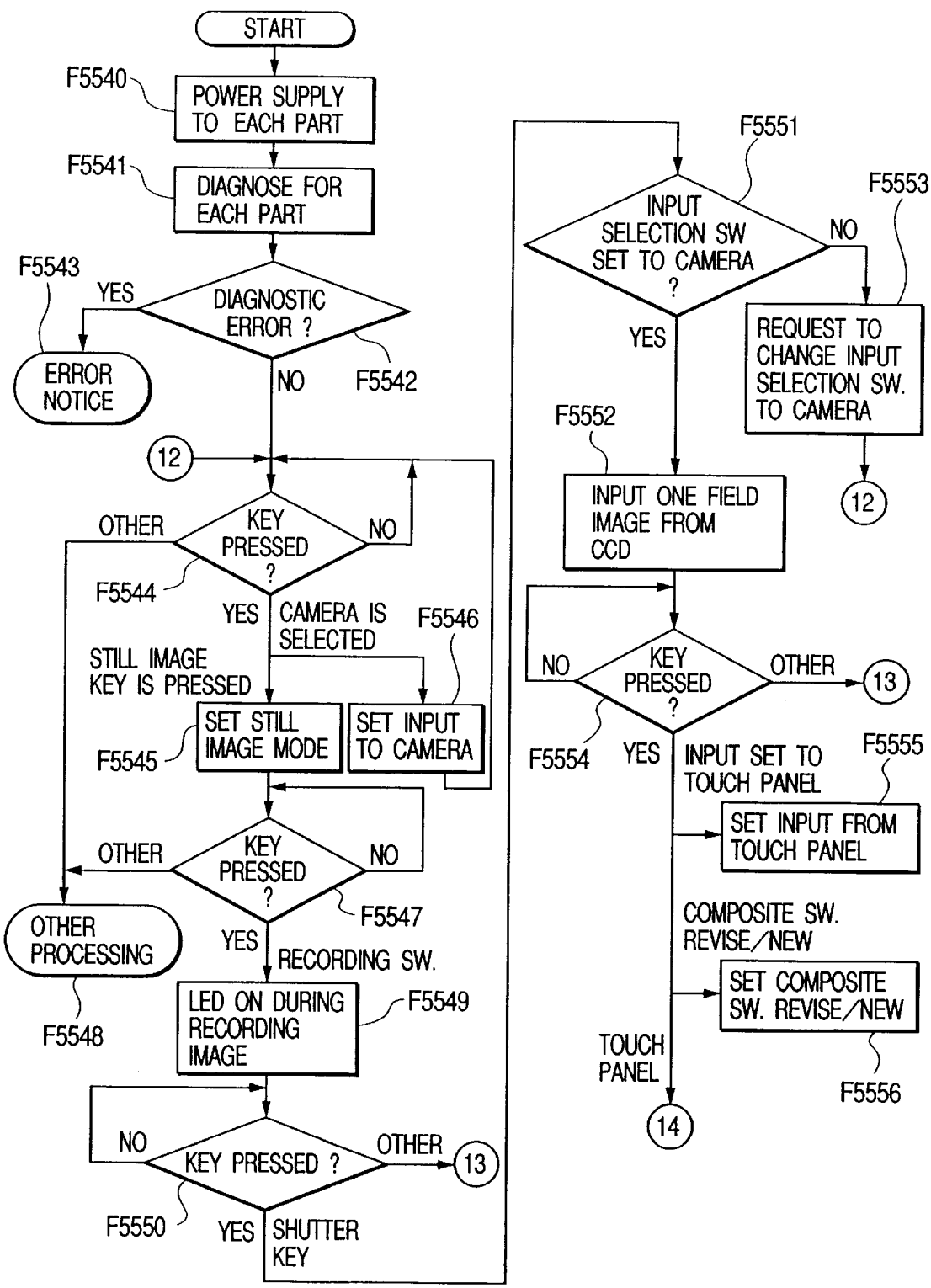
FIG. 27 is a flow chart showing terminal processing according to the fifth embodiment.
Figure 28:
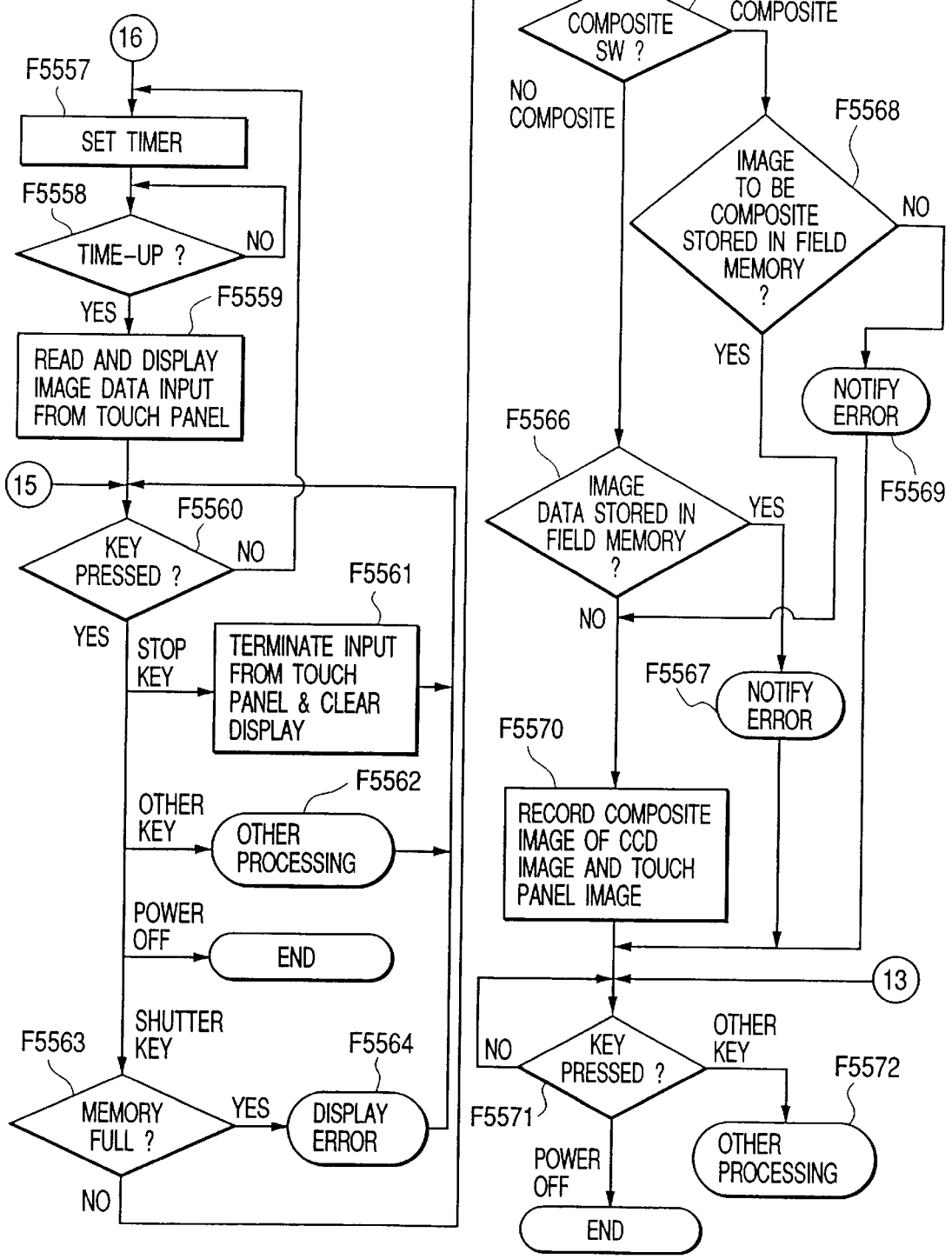
FIG. 28 is a flow chart showing terminal processing following to the terminal processing of FIG. 27.

Next, a method in which the image inputted from the touch panel or the scanner 129 is composed with the image photo-taken by the CCD camera 100 will be explained with reference to FIGS. 26 to 28.

Since a procedure from a step S4530 (power switch is turned ON) to finish of diagnosis is the same as that in the first embodiment, explanation thereof (steps F5540 to F5543) will be omitted.

When the diagnosis is finished, the key input waiting condition is established (step F5544). The operator pushes the still image key 202 to input the still image from the CCD camera 100 (step S4531). The CPU 109 sets the image input mode from the CCD camera 100 to the still image mode, and the mode is stored in the RAM 115 (step F5545). When the mode is stored in the RAM 115, the CPU 109 returns to the key input waiting condition again (step F5544) and monitors the fact that the operator sets the input selection key 220 to the "camera" position (step S4532).

When the fact that the input selection key 220 is set to the "camera" position is detected, the CPU 109 sets the image recipient to the CCD camera 100, and that information is stored in the RAM 115. As a control method (step F5546) in which the image data from the touch panel 108 or the scanner 129 cannot be inputted, the supplying of electric power to the touch panel 108 or the scanner 129 may be stopped, or, even if the data is actually inputted, such data may be discarded by a software processing.

When the input from the CCD camera 100 is set, the image from the CCD camera 100 starts to be inputted, and the one frame image data is A/D-converted in the A/D converter 101 and then is stored in the field memory 102, and then the data is outputted to the display 106. After the one frame data is inputted from the CCD camera 100 and is outputted to the display 106, next one frame data is inputted and then is outputted. Such processing operations are repeated.

In the key input waiting condition in the step F5544, if any key not relating to this example is depressed, the error message may be notified or processing corresponding to the depressed key may be effected (step F5548). The CPU 109 is waiting for depression of the key 206 indicating the message "under recording" (step F5547). When the operator depresses the recording switch 206 (step S4533), the CPU 109 detects such depression to turn ON the LED 206 to indicate "under recording" (step F5449). Further, a flag in the RAM 115 is changed to a condition indicating the message "under recording".

Now, the operator adjusts the orientation of the CCD camera 100 while looking at the image being displayed on the display 106 (step S4534). Since this adjustment of the camera is merely mechanical, the CPU 109 does not concern to such adjustment. Further, the operator sets the composite switch 210 to the "new" or "revise" position (step S4535; in this case, to the "new" position). The CPU 109 checks the condition of the composite switch in the later processing.

After the recording LED 206 is turned ON, the CPU 109 returns to the key input waiting condition (step F5550). If the shutter key 216 is depressed (step S4536), the CPU 109 checks which key is depressed. If not the shutter key 216, processing corresponding to the depressed key is effected (steps F5571, F5572). If the shutter key 216, it is checked whether the input selection key 220 is in the "camera" position or not (step F5551). If not the "camera" position, a message for requesting for changing the input selection key 220 to the "camera" position is displayed on the area of the display 106 at the right from the dotted line x (step F5553), and the input from the input selection key 220 is waited again (step F5544). If the input selection key 220 is in the "camera" position, one field image data is inputted from the CCD camera 100 and then is displayed on the area of the display 106 at the right from the dotted line x, and the data from the field memory 102 is compressed in the code processing portion 110 and then is stored in the image memory 111. When the recording processing is finished, the recording LED 206 is turned OFF.

Then, in order to compose the image inputted from the touch panel 108 with the image photo-taken by the CCD camera 100, the CPU 109 returns to the key input waiting condition (step F5554), and the operator switches the input selection key 220 to the "pen" position (touch panel 108) (step S4537). When the fact that the input selection key 220 is set to the "pen" position is detected, the CPU 109 sets the image source to the touch panel 108, and the information is stored in the RAM 115 so that the image data cannot be inputted from the CCD camera 100 or the scanner 129 (step F5555).

Then, the operator sets the composite switch 210 to the "new" or "revise" position (step S4538; in this example, to the "new" position without no composition). The CPU 109 stores this condition of the composite switch 210 in the RAM 115 and checks it in the later processing. Then, the operator inputs the data from the touch panel 108 while looking at the displayed CCD input image (step S4539). Regarding the input from the touch panel 108, the data inputted from the touch panel 108 for a given time period is read and the read data is displayed on the display 106 so that the operator can confirm the data being inputted. The operator confirms the inputted data (step S4540).

The timer is set (step F5557) and it is checked whether the timer is timed up or not (step F5558). When the timer is timed up, the data inputted during the timer operation is read-in the field memory 139 and then is outputted to the display 106 (step F5559). This input processing is repeated until any key is depressed (step F5560). In the key input waiting condition in the step F5560, when the stop key 221 is depressed, the inputting from the touch panel 108 is interrupted, and the data which has been inputted till now is cleared (step F5561). When the power switch is turned OFF, the processing is terminated.

When the operator depresses the shutter key 216 (step S4541), it is checked whether the memory is vacant or not (step F5563) and the condition of the composite switch 210 is also checked (step F5565). If there is the data in the field memory 139 with no composite (step F5566), the error message is displayed (step F5567).

With composite, if there is no data in the field memory 139 (step F5568), the error message is displayed (step F5569). If no error, the image obtained by composing the image inputted from the CCD camera 100 with the image inputted from the touch panel 108 is compressed in the code processing portion 112, and the compressed data is stored in the image memory 113 (step F5570).

Thereafter, the key input is monitored (step F5571). If the power switch is turned OFF (step S4542), the processing is terminated; whereas, if any other key is depressed, processing corresponding to the depressed key is effected (step F5572; an operation for obtaining a next composed image may be performed).

SIXTH EXAMPLE

Figure 29:
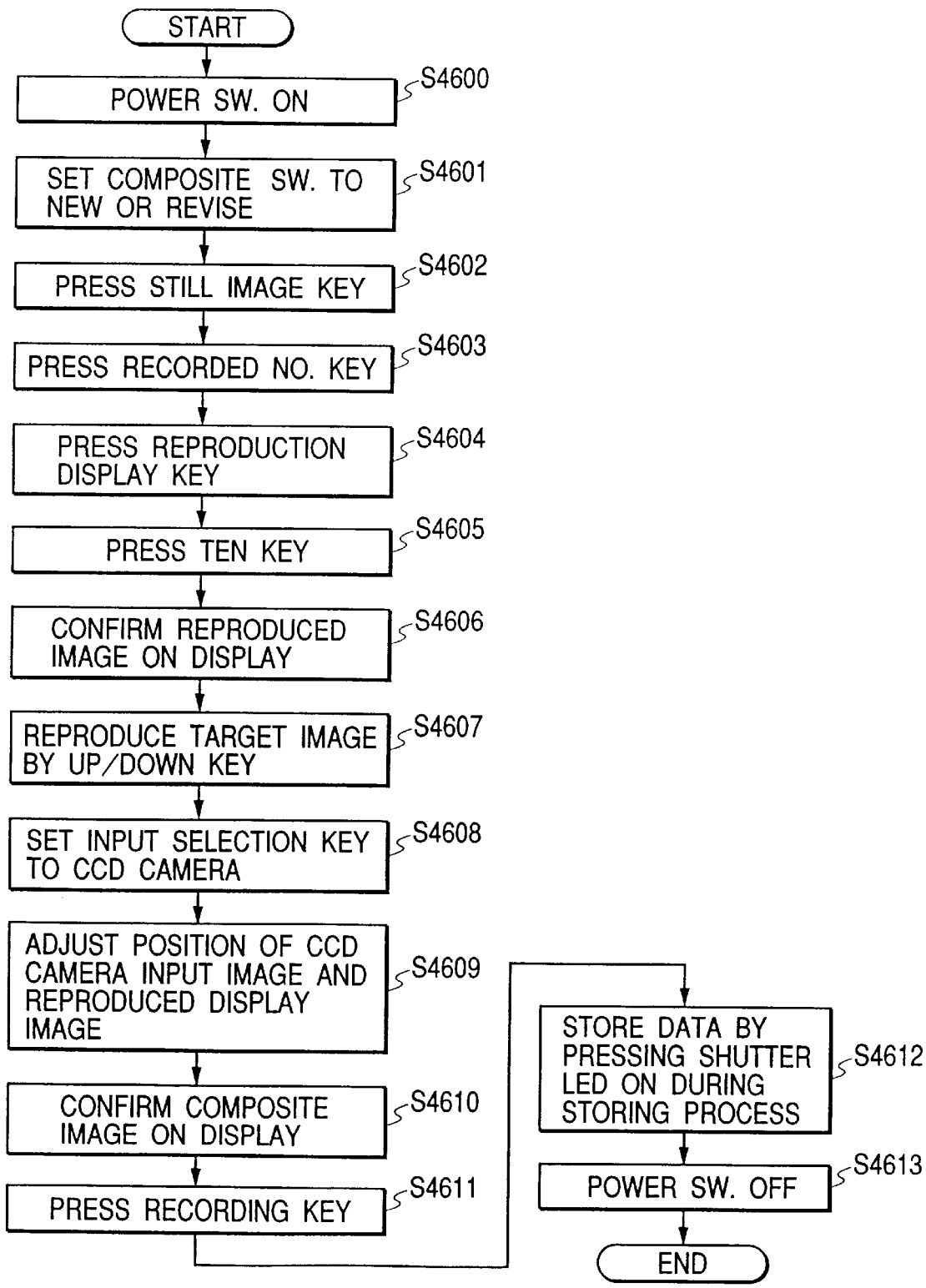
FIG. 29 is a flow chart showing a terminal operation according to a sixth embodiment of the present invention.
Figure 30:
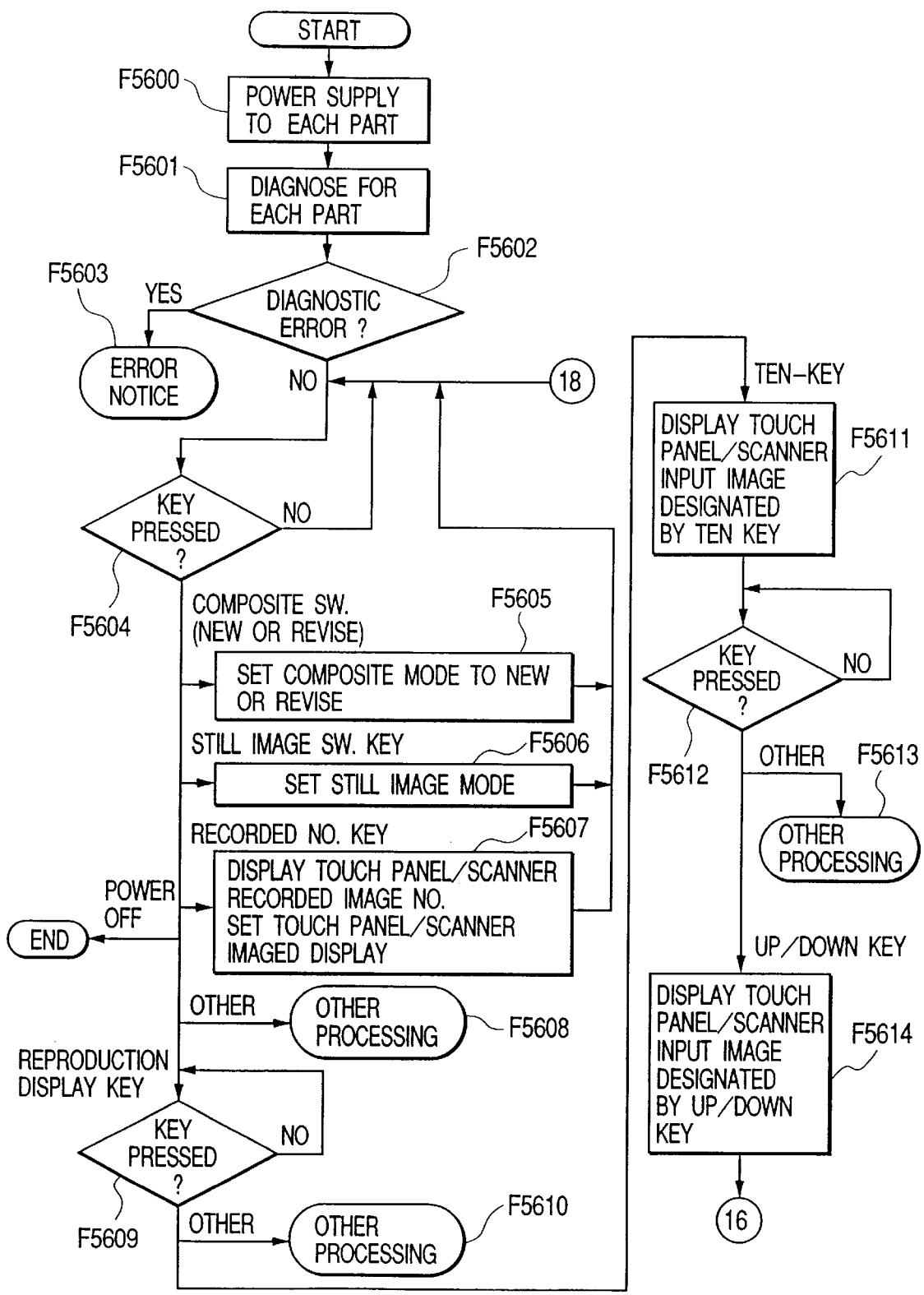
FIG. 30 is a flow chart showing terminal processing according to a sixth embodiment of the present invention.
Figure 31:
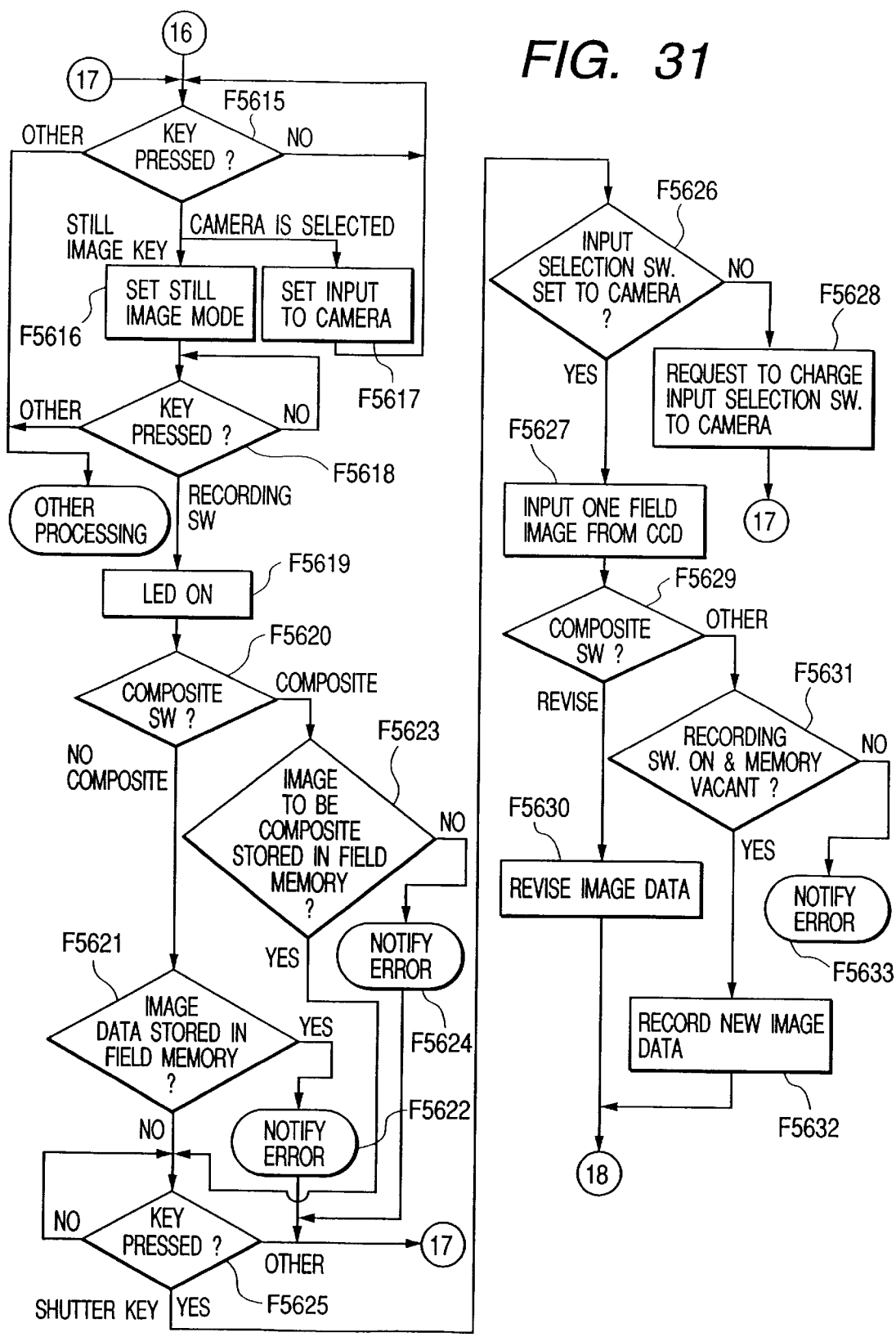
FIG. 31 is a flow chart showing terminal processing following to the terminal processing of FIG. 30.

Next, a sixth embodiment of the present invention will be explained with reference to FIGS. 29 to 31. Incidentally, the same elements as those in the first to fifth embodiments are designated by the same reference numerals, and explanation thereof will be omitted.

(Function 6)

In the above-mentioned fifth embodiment (function 5), while an example that the image from the CCD camera is firstly displayed and the input from the touch panel is effected later was explained, in this example, the data inputted from the touch panel is firstly displayed and then the CCD image is inputted to align it with the displayed position of the image from the touch panel.

In other words, in this example, the data presently inputted from the CCD camera is displayed on the display while reproducing and displaying (on the display) the data previously inputted from the CCD camera, input pen or scanner. In this condition, when the data being now inputted is recorded, the data obtained by composing the previously inputted data with the presently recorded data is newly recorded or renewed in place of the previous data.

(Concrete Example)

Since a procedure from a step S4600 (power switch is turned ON) to finish of diagnosis is the same as that in the first embodiment, explanation thereof (steps F5600 to F5603) will be omitted.

When the diagnosis is finished, the key input waiting condition is established (step F5604). Then, the composite switch 210 is set to the "new" or "revise" position (step S4601). The composite mode is stored in the RAM 115 of the CPU 109 (step F5605).

Then, the still image key 202 is depressed (step S4602) to designate the still image (step S4602). The CPU 109 sets the input mode of the image stored in the RAM 115 to the still image mode (step F5606). The recorded image number key 208 is depressed (step S4603) to indicate the display of the data inputted from the touch panel 108 or the scanner 129, and the number of the stored image data inputted from the touch panel 108 or the scanner 129 is displayed on the display 106, and the number is confirmed (step F5607).

Then, the reproduction/display key 223 is depressed (step S4604), and the CPU becomes the display image waiting condition (step F5609). When the operator depresses the numeral key indicating the number of the display image (step S4605), the CPU 109 reads-in the designated image data from the image memory 111 while expanding the image data in the code processing portion 110, and the read-in data is stored in the field memory 139 and is displayed on the display 106 (step F5611).

The operator confirms the displayed image (step S4606). The CPU returns to the key input waiting condition again (step F5612). When the operator wants to know other data, the DOWN key is depressed (step S4607) to cause the CPU 109 to display data having the image number greater or smaller than the number of the displayed image by 1 (one) (step F5614). In this way, selection of the image (inputted from the touch panel 108 or the scanner 129) to be composed is finished.

Then, the operator sets the input selection key 220 to the "camera" position (step S4608) to designate the input from the CCD camera 100. Since the CPU 109 is in the key input waiting condition (step F5615), when the camera input is designated, the image from the CCD camera 100 is inputted to the field memory 102, and the inputted image is displayed on the display 106 (step S4608). Here, the still image key 202 may be depressed. If depressed, the CPU 109 sets the mode to the still image mode (step F5615). However, since it has already been set, explanation thereof will be omitted.

The operator aligns the displayed touch panel image data with the image data inputted from the CCD camera while looking at the display 106 by adjusting the input position from the CCD camera 100 and confirms the position (steps S4609, S4610). The position alignment may be effected by shifting the touch panel image by an operation via the touch panel 108.

Since the CPU 109 is in the key input waiting condition (step F5618), when the recording switch 206 is depressed (step S4611), the CPU 109 turns ON the recording LED 206 (step F5619) and checks the condition of the composite switch 210 (step F5620). In case of no composite, it is checked whether there is the data in the field memory 139 (step F5621). If YES, the error message is displayed (step F5622). In case where the composite switch 210 in the composite condition, it is checked whether there is the data to be composed in the field memory 139 (step F5623). If there is no data, the error is notified (step F5624). After these checking operations, the key input waiting condition is restored (step F5625).

Here, when the shutter key 216 is depressed (steps S4612, F5625), it is checked whether the input selection key 220 is in the "camera" position or not (step F5626). If no "camera" position, the error message is displayed and the CPU requests the operator for changing the key to the "camera" position (step F5628). If the "camera" position, one frame image data from the CCD camera 100 is inputted to the field memory 102 (step F5627).

The setting condition of the composite switch 210 is checked (step F5629). If the switch is in the "reverse" position, the data of the field memory 139 for the touch panel input image is sent to the field memory for the CCD input image to compose the images, and the composed data is compressed in the code processing portion 110, and the compressed data is stored in the image memory 113 in place of the previous data (step F5603). If the composite switch 210 is in the "new" position, it is checked whether the image memory 113 is vacant or not (step F5631). If no vacant, the error message is displayed (step F5633); whereas, if there is the vacancy, the data is stored in the memory (step F5632).

Then, the CPU 109 returns to the step F5604 to repeat the processing. If the power switch is turned OFF (step S4613), the power source is shut down and the processing is terminated.

SEVENTH EXAMPLE

A seventh embodiment of the present invention will be explained with reference to FIGS. 32 to 39. Incidentally, the same elements as those in the first to sixth embodiments are designated by the same reference numerals, and explanation thereof will be omitted.

(Function 7)

In this example, the recorded data is sent to other computer. Further, data is received from other computer and can be stored in the image memory of the terminal and be displayed.

(Concrete Example)

Figure 32:
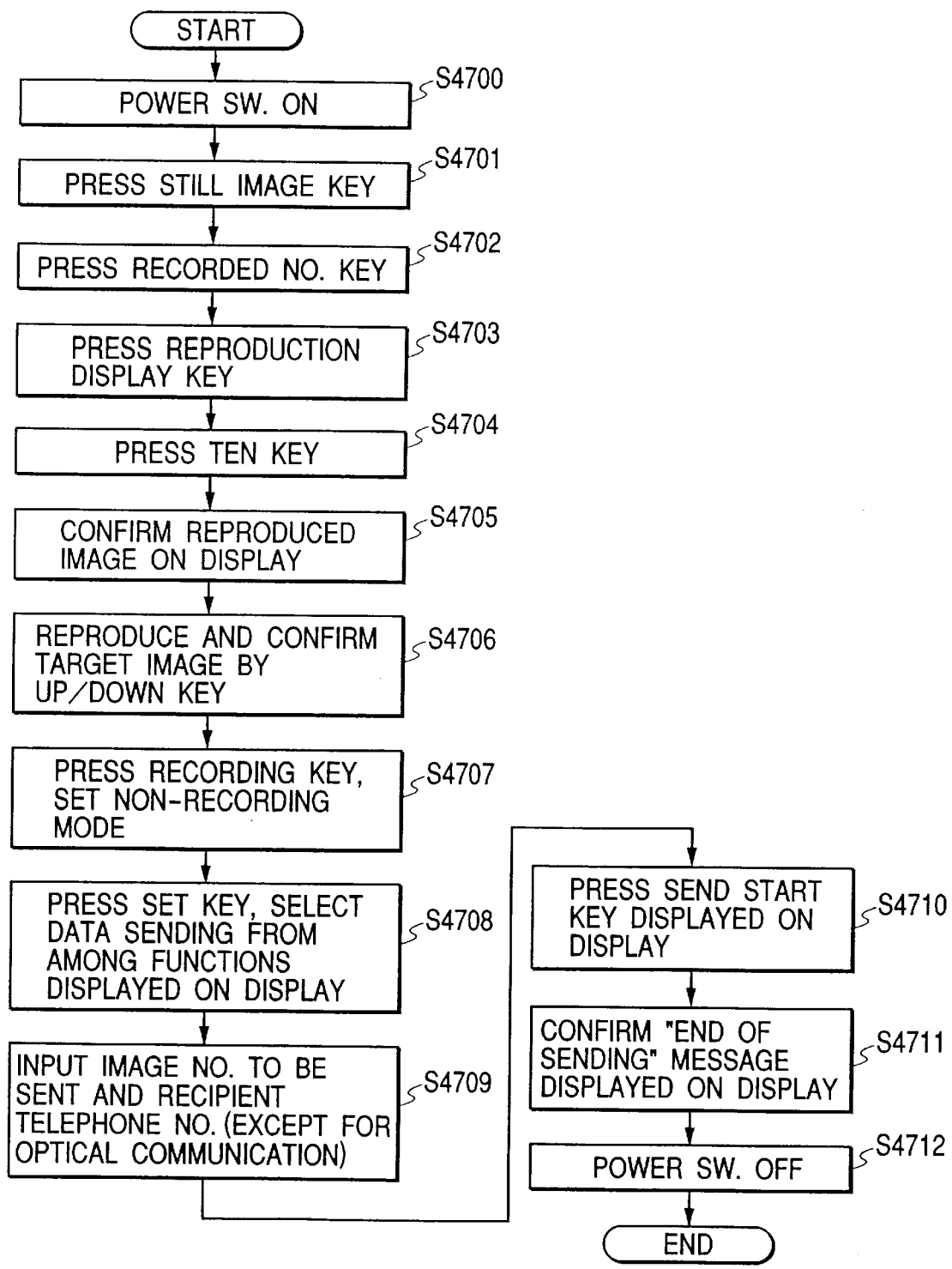
FIG. 32 is a flow chart showing a terminal operation (sending) according to a seventh embodiment of the present invention.
Figure 33:
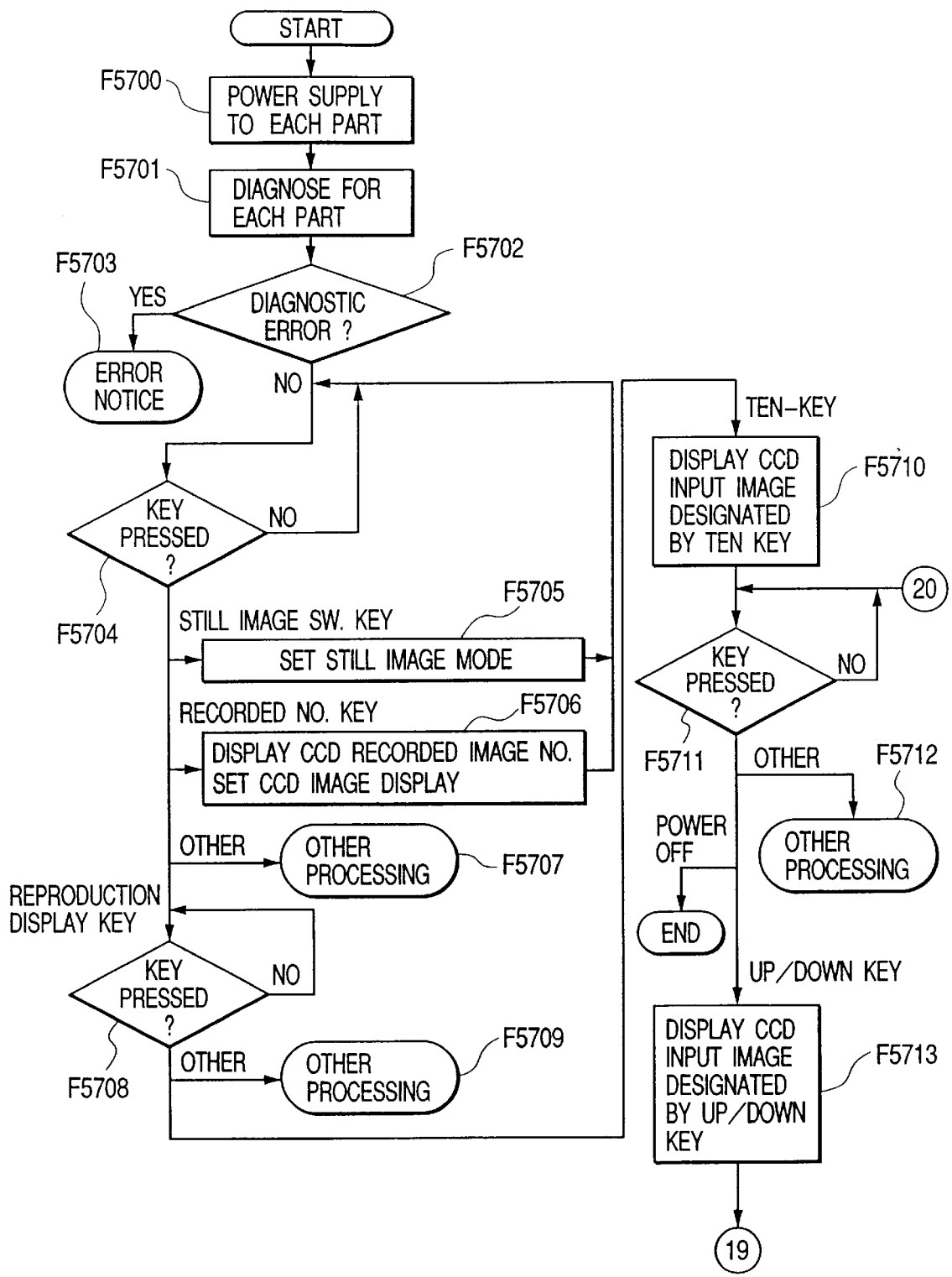
FIG. 33 is a flow chart showing terminal processing (sending) according to a seventh embodiment of the present invention.
Figure 34:
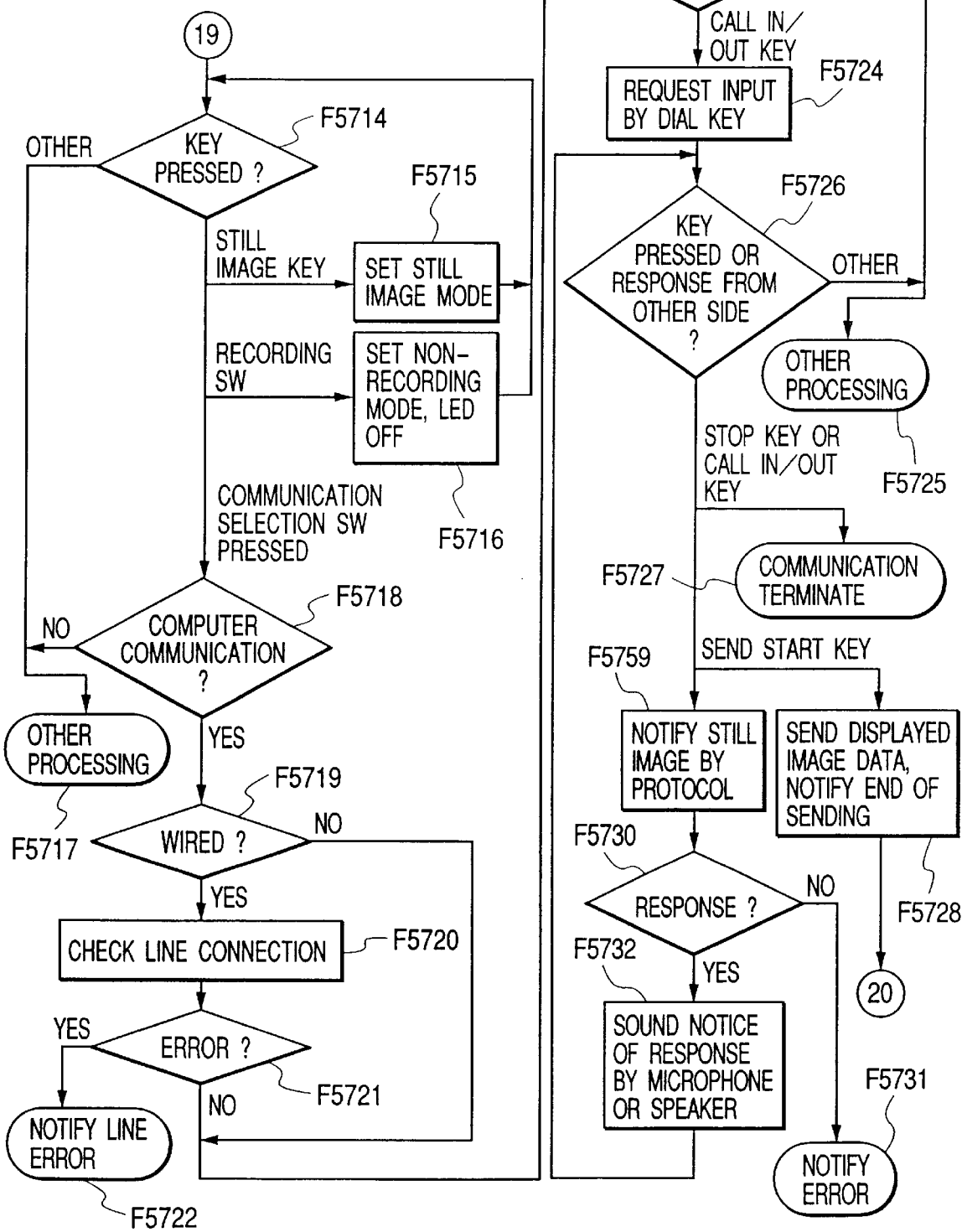
FIG. 34 is a flow chart showing terminal processing following to the terminal processing of FIG. 33.

First of all, processing for sending the data will be described with reference to FIGS. 32 to 34.

Since a procedure from a step S4700 (power switch is turned ON) to finish of diagnosis is the same as that in the first embodiment, explanation thereof (steps F5700 to F5703) will be omitted.

When the diagnosis is finished, the key input waiting condition is established (step F5704). Then, the still image mode is selected by the still image key 202 (step S4701), and the flag in the RAM 115 is set to a mode for handling the still image (step F5705).

The recorded image number key 207 is depressed (step S4702) to designate the image inputted from the CCD camera 100. The CPU 109 displays the number of the image data inputted from the CCD camera 100 on the display 106 (step F5706). When the reproduction/display key 223 is depressed (step S4703), an image data designation waiting condition, i.e., a numeral key (ten-key) 204 input waiting condition is established (step F5709).

When the designation is made (step S4704), the designated CCD image is read-out and is displayed (step F5710). The operator confirms the displayed image data (step S4705). The CPU 109 becomes the key input waiting condition. If the power switch is turned OFF, the power source is shut down and the processing is terminated. If the UP/DOWN key is depressed (step S4706), the image having the number greater or smaller by one (1) is displayed (step F5713). In this way, selection and confirmation of the image data to be sent are finished.

The CPU 109 becomes the key input waiting condition (step F5714). Here, if the still image key input is designated, the still image is set again (step F5715).

The operator depresses the recording key 206 to select the non-recording mode (step S4707). The CPU 109 sets the internal mode to the non-recording mode and turns OFF the LED (step F5716).

Then, the communication means setting key 209 is depressed to set the communication means. Here, it is assumed that the radio computer communication is selected (step S4708). When the communication means is selected, the CPU 109 checks whether the communication is the computer communication or not (step F5718). If the computer communication, it is checked whether the communication is the wired communication or not (step F5719). If the wired communication, the circuit connection is checked (step F5720) to ascertain the connection error (step F5721). If there is the connection error, the error is notified (step F5722).

After these checking operations, the CPU 109 becomes the key input waiting condition (step F5723) for waiting depression of the call-out/call-in key 222. When the call-out/call-in key 222 is depressed, the operator designates the recipient dial number by using the numeral key 204 (step S4709). When the call-out/call-in key 222 is depressed, the CPU 109 requests the operator for inputting the dial key 204 (step F5724). The inputted dial number is transferred to the computer communication control portion 118 and the radio communication circuit 123, and is sent to the circuit in sequence. After the dial number is sent, the CPU 109 becomes a recipient response waiting condition (step F5726) for waiting for depression of key. Here, if the stop key 221 or the call-out/call-in key 222 is depressed, the CPU 109 interrupts the communication (step F5727).

When the recipient response is detected via the radio communication circuit 123 and the computer communication control portion 118, the CPU 109 informs the recipient computer 303 of the still image communication with protocol (step F5729) and is waiting for response from the recipient computer 303 (step F5730). If there is no response within a predetermined time period, the error is notified (step F5731). If there is response, the microphone 134 and the speaker 135 are turned ON, and the response of the recipient computer 303 is notified by sound or display (step F5732; voice communication is also permitted).

Thereafter, by depressing the setting key 209, sending start is selected among the selectable functions (step S4710). In response to the sending start instruction, the CPU 109 reads out the same image data as the image data being developed in the field memory 102 from the image memory 113 in the compressed form, and the compressed data is sent to the computer communication control portion 118, where the data is changed to the packet form. The image data in the packet form is sent through the radio communication circuit 123. When the sending is finished, that fact is notified the operator (step F5728). The operator confirms the fact that the sending is finished from the displayed message and the like (step S4711). In this way, one frame image has been sent. The CPU 109 returns to the key input waiting condition in the step F5711. If the power switch is turned OFF (step S4712), the power source is shut down and the processing is terminated.

Figure 35:
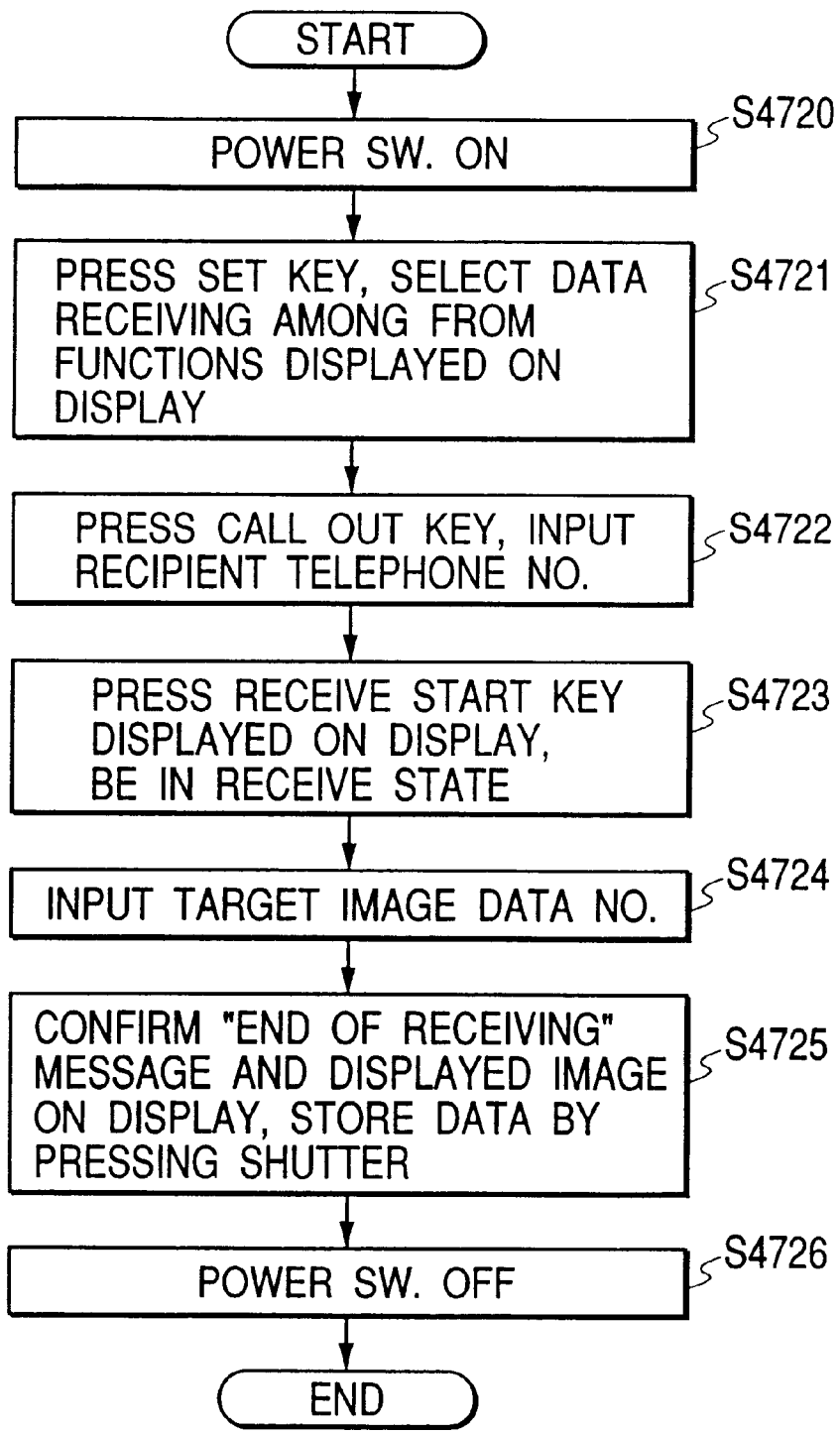
FIG. 35 is a flow chart showing a terminal operation (receiving) according to the seventh embodiment.
Figure 36B:
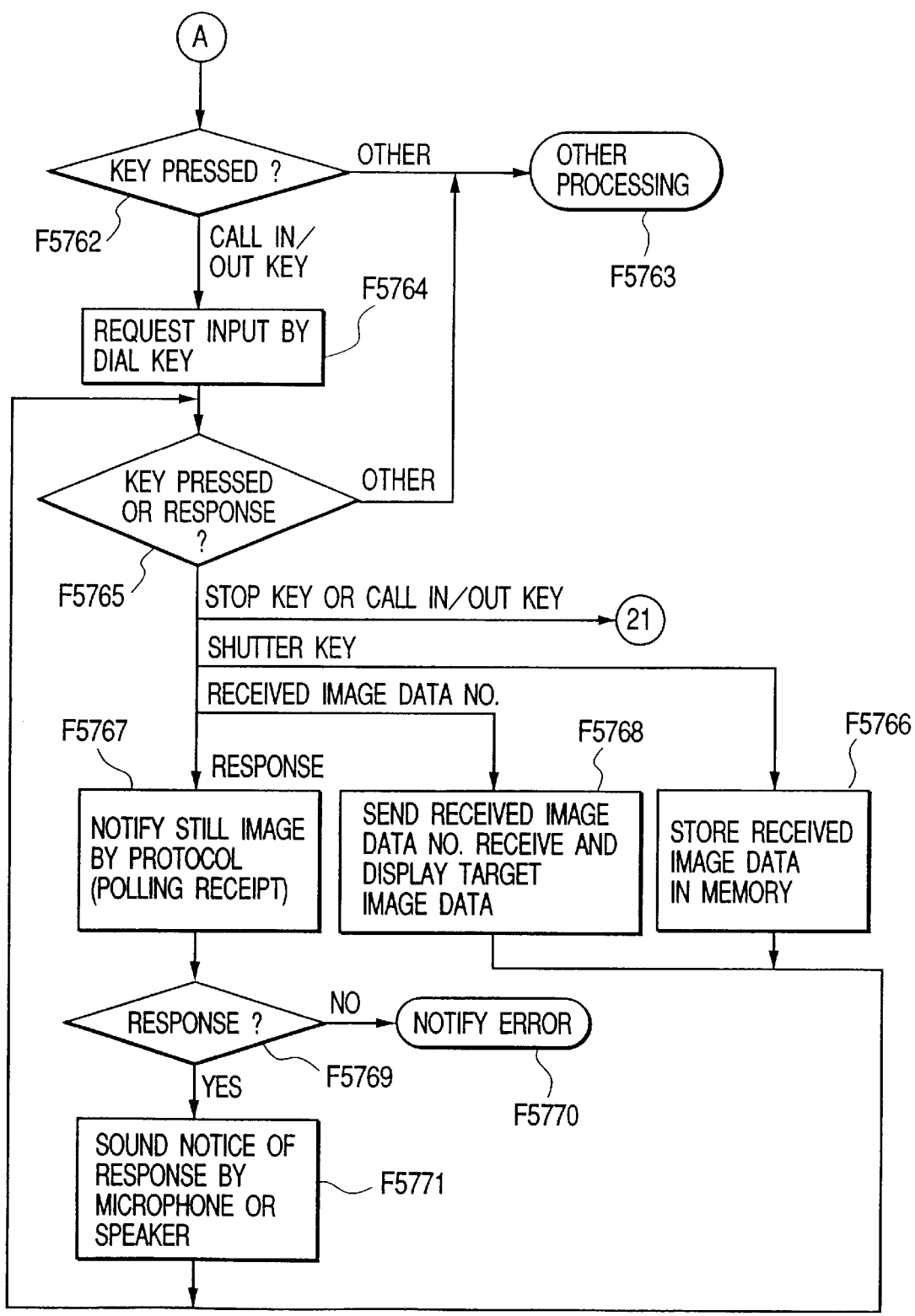
FIG. 36 which is composed of FIGS. 36A and 36B are flow charts showing terminal processing (receiving) according to the seventh embodiment.
Figure 37:
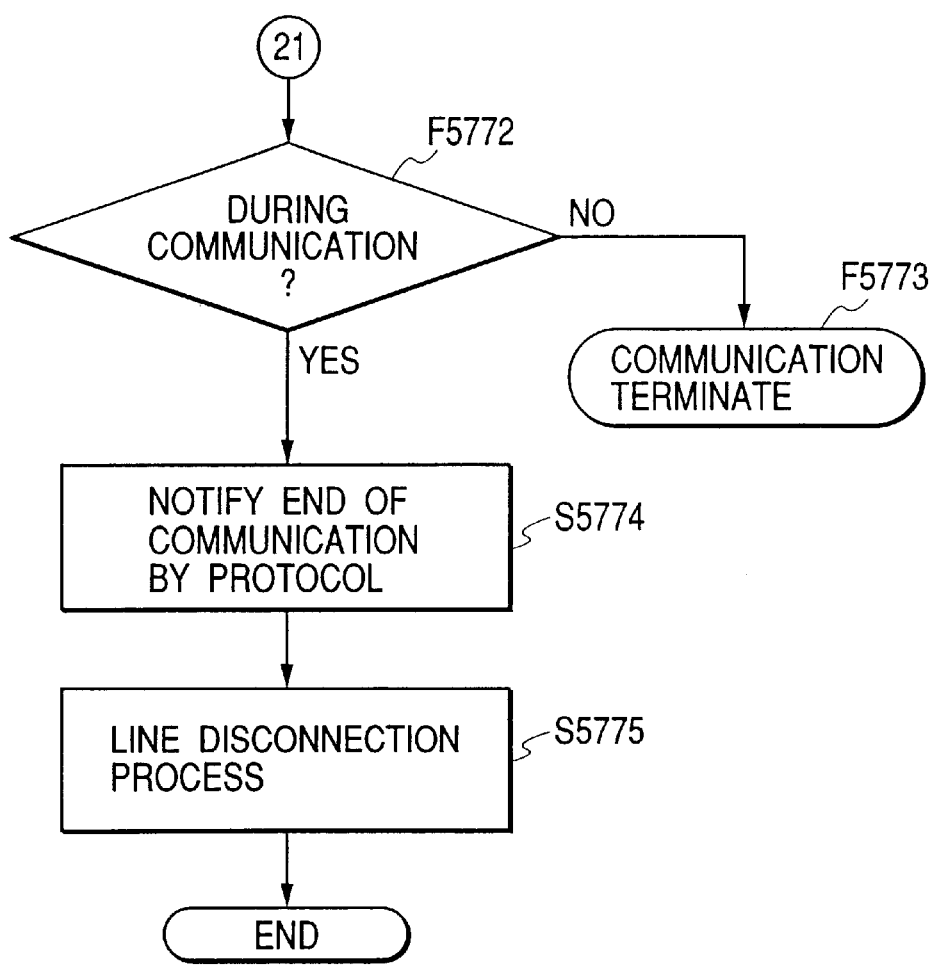
FIG. 37 is a flow chart showing terminal processing following to the terminal processing of FIGS. 36A and 36B.

Next, a processing in which the data is polling-received will be explained with reference to FIGS. 35 to 37.

Since a procedure from a step S4720 (power switch is turned ON) to the termination of the diagnosis is the same as that in the first embodiment, explanation thereof (steps F5750 to F5753) will be omitted. Further, a procedure from the sending to the recipient response is also the same as that in the first embodiment, explanation thereof (steps F5754 to F5765) will be omitted.

The difference is that, in case of the sending, the sending data is developed in the field memory 102 and is displayed, but, in case of polling receipt, the data is not developed and not displayed. Further, in the polling receipt, the data which is desired to be polling-received is designated and received, and the received image data is displayed on the display 106, and is stored when the shutter key 216 is depressed.

When the data is sent and the recipient effects response, the CPU 109 notifies the recipient of the fact that the still image communication by protocol (polling receipt) is desired (step F5767) and is waiting for response (step F5769). When the response occurs, the voice communication is made possible, and the operator inputs the number of the received image data (step S4724).

In response to this, the CPU 109 sends the number of the desired image data to the recipient. The data in question is received and displayed to notify the operator (step F5768). The operator confirms the received image. If the received image is desired to be stored, the shutter key 216 is depressed to store the data (steps S4725, F5766).

Further, by depressing the call-out/call-in key 222, it is checked whether the communication is being now performed ("call" is established) (step F5772). If the communication is being now performed, the termination of the communication is notified the recipient (step F5774), and the circuit is shut down (step F5775).

Figure 38:
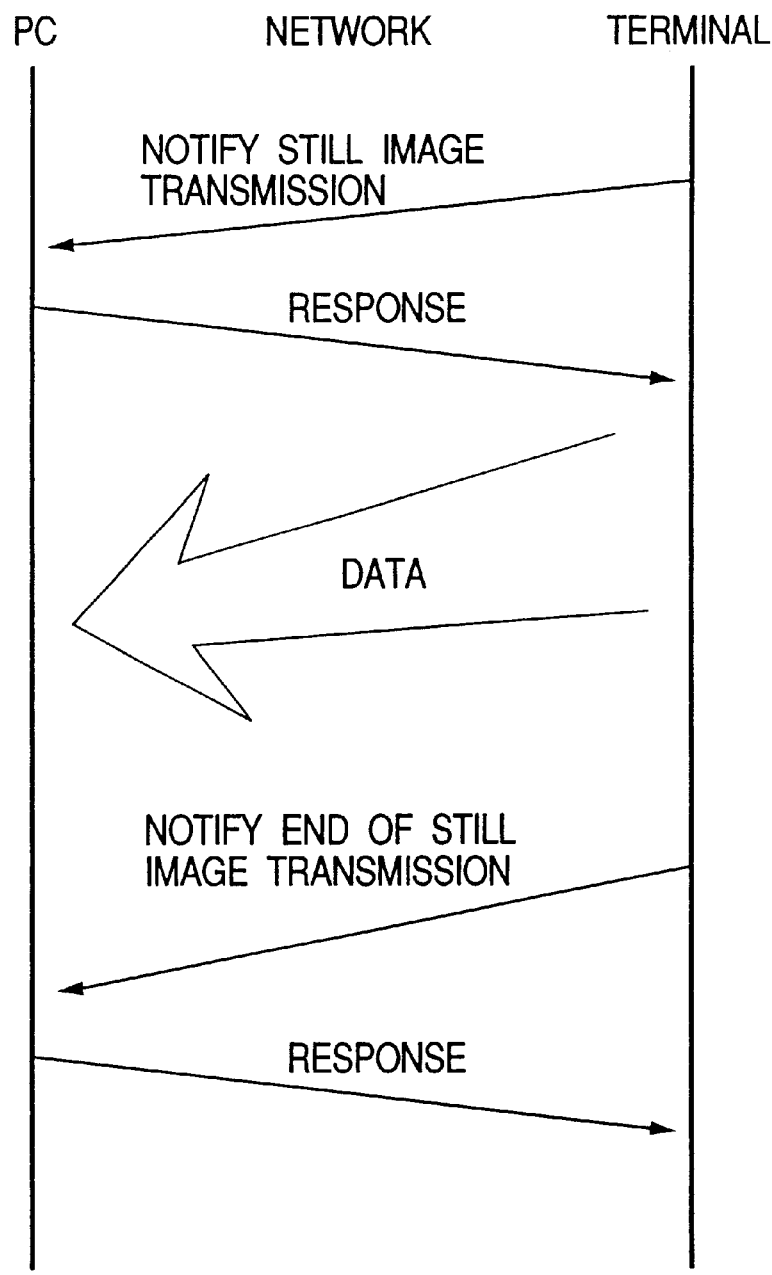
FIG. 38 is an explanatory view showing communication protocol between a computer and the terminal.

FIG. 38 shows a communication procedure of the still image after the "call" is established between the terminal and the computer 303.

When the still image communication is effected, first of all, the terminal informs the computer 303 of the still image communication. The computer 303 is waiting for receiving this message from the terminal. If received, it is checked whether the data storing memory is vacant or not. If there is the vacancy, the response is sent. If there is no vacancy, in place of response, that fact is notified the terminal, and the circuit is shut down. If the response is received, the terminal sends the still image data in the packet form. When a plurality of image data are sent, the above-mentioned procedure is repeated by times corresponding to the number of data. During the sending of one data, if the received image data memory is filled with the data, the same processing as that shown in FIG. 10 is effected.

Figure 39:
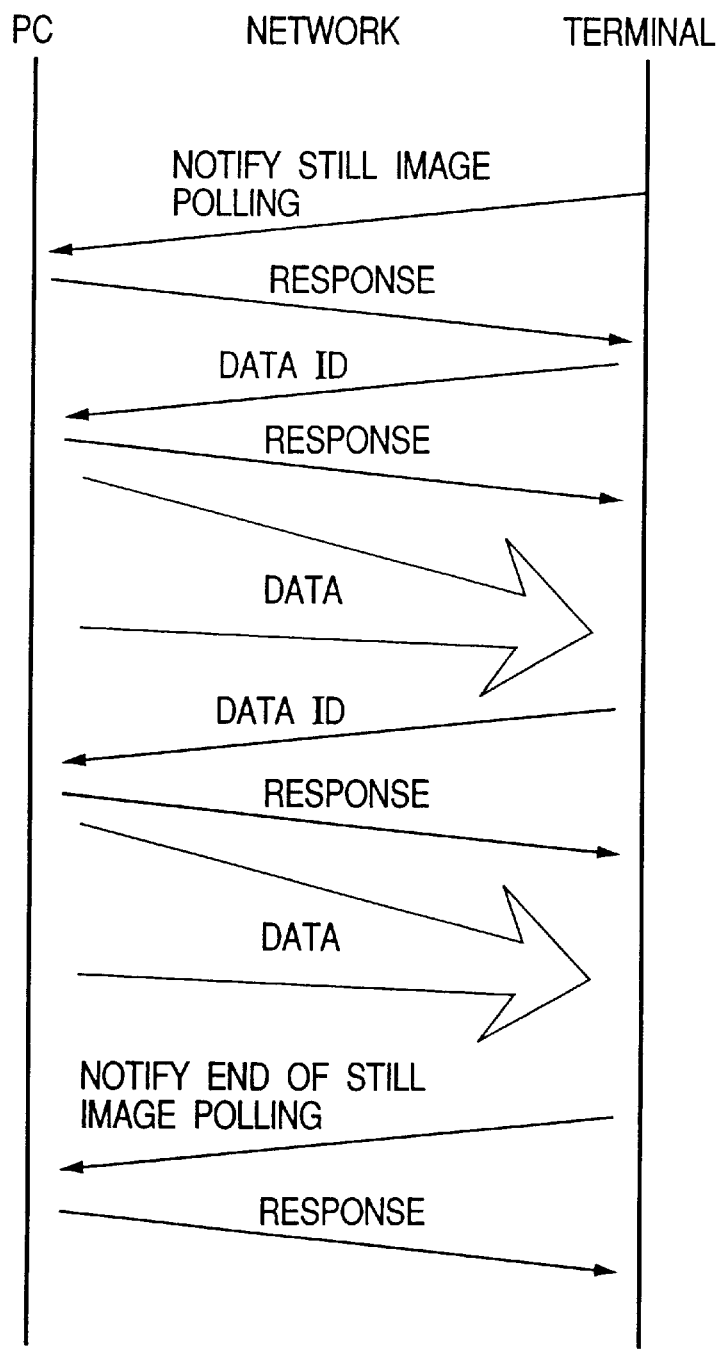
FIG. 39 is an explanatory view showing communication protocol between the computer and the terminal.

FIG. 39 shows polling receiving procedure in the still image communication after the "call" is established between the terminal and the computer 303.

First of all, the terminal informs the computer 303 of polling receipt of the still image. The computer 303 effects response to this notice. When the response is received, the terminal sends data ID which is desired to be received. The formation of the data ID is previously determined. When the data ID is sent, if there is the data, response is returned from the computer 303 so that the actual still image data is sent. If other data is desired, by sending data ID thereof, if there is such data, response is returned from the computer 303 so that such data is sent. So long as there are desired data, the above processing is repeated. If there is no desired data, the terminal informs the computer of the termination of the polling receipt, and response is received from the computer 303. In this way, the polling receipt is terminated.

EIGHTH EXAMPLE

Figure 40:
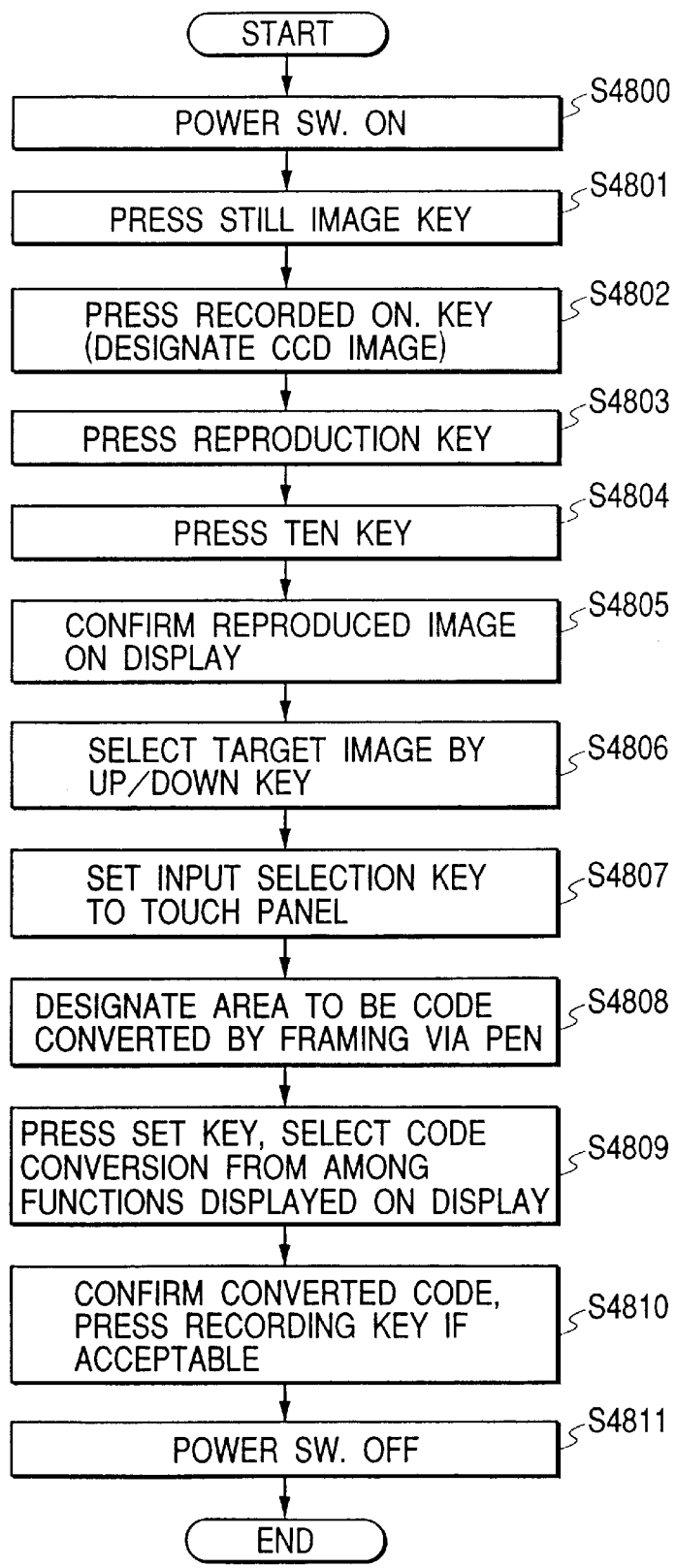
FIG. 40 is a flow chart showing a terminal operation according to a eighth embodiment of the present invention.
Figure 41:
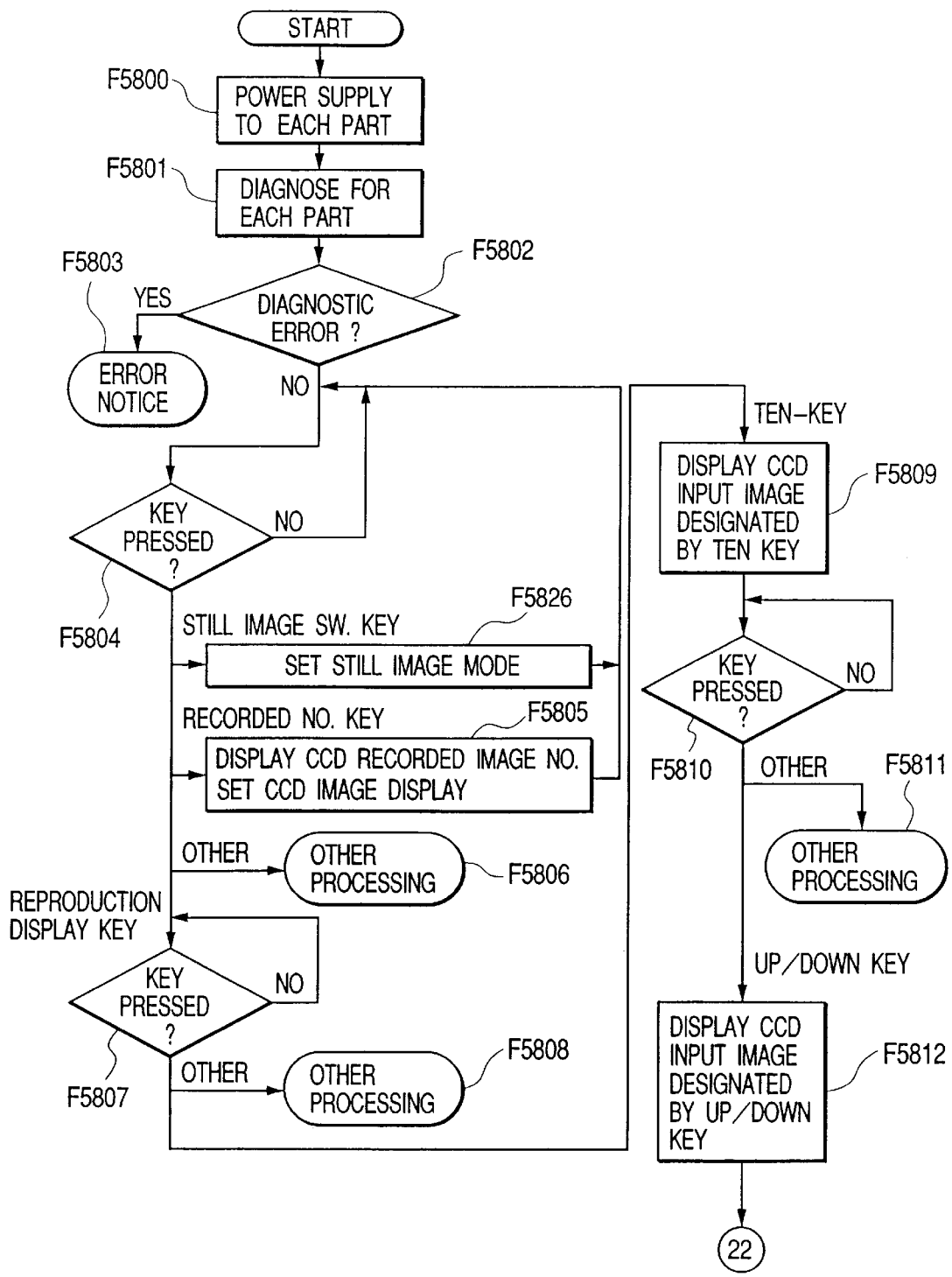
FIG. 41 is a flow chart showing terminal processing according to a eighth embodiment of the present invention.
Figure 42:
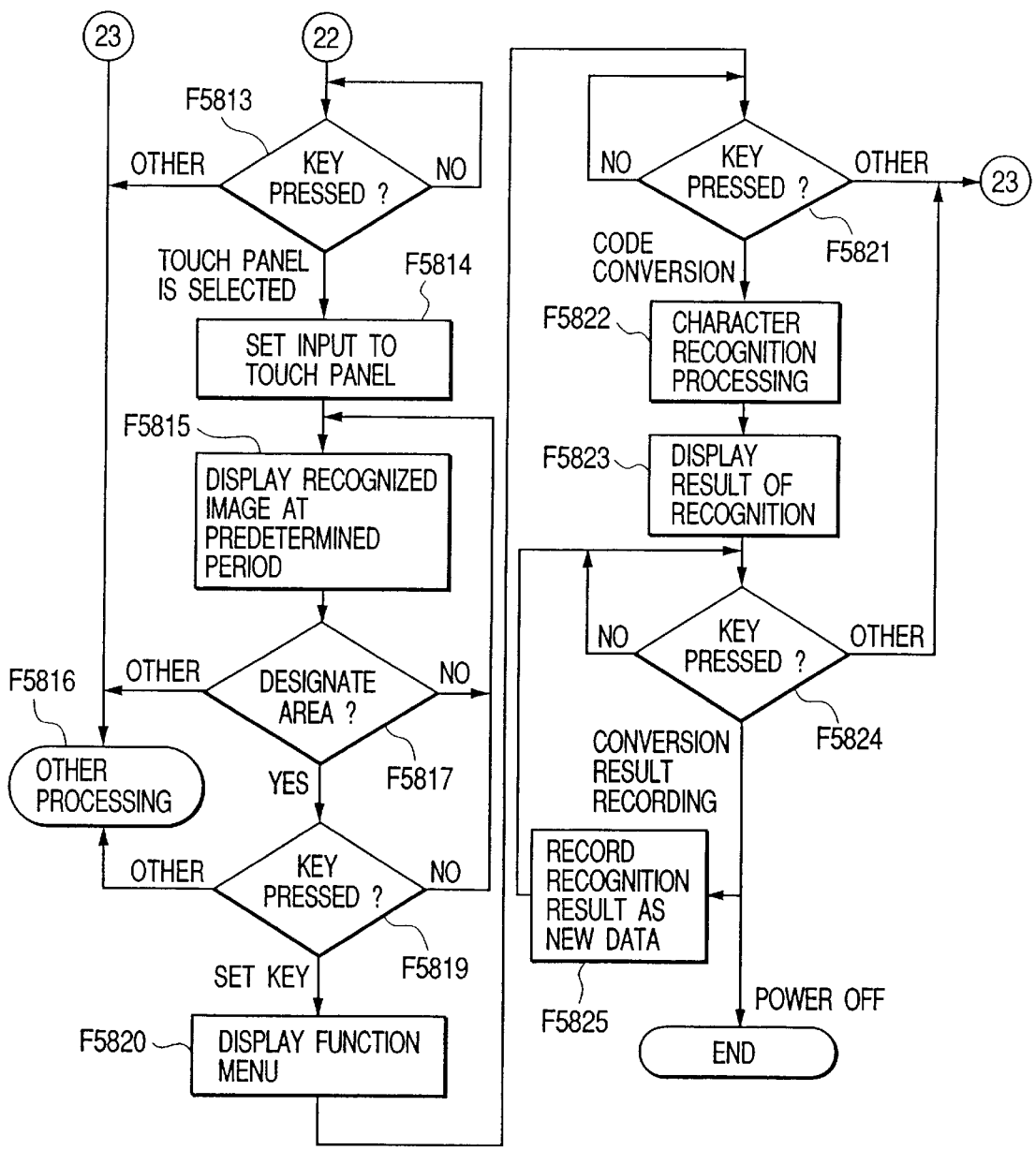
FIG. 42 is a flow chart showing terminal processing following to the terminal processing of FIG. 41.

An eighth embodiment of the present invention will be explained with reference to FIGS. 40 to 42. Incidentally, the same elements as that in the first embodiment are designated by the same reference numerals, and explanation thereof will be omitted.

(Function 8)

In this example, the data inputted from the CCD camera is displayed on the display, and range, column and row of the contents of the displayed image are designated on the touch panel. A pattern of the image data within the designated range is recognized and is converted into a character code, and the recognized character code is displayed on the display. Further, the operator confirms the displayed contents, and, if there is any error, the operator corrects the error. The converted character code is stored.

(Concrete Example)

Since a procedure from a step S4800 (power switch is turned ON) to the termination of the diagnosis is the same as that in the first embodiment, explanation thereof (steps F5800 to F5803) will be omitted.

When the diagnosis is finished, the key input waiting condition is established (step F5804). Further, since a procedure from the selection of the target image inputted from the CCD camera 100 to the displaying on the display 106 is the same as that in the aforementioned example, explanation thereof (steps S4801 to S4806, and F5805 to F5812) will be omitted. In this example, the data previously recorded from the CCD camera 100 is used as the image.

When the target image is displayed, the operator switches the input selection key 220 to the "pen" position (touch panel 108) (step S4807). Since the CPU 109 is in the key input waiting condition (step F5813), if the input selection key is switched to the "pen" position, the CPU confirms this fact and the input source is set to the touch panel 108 so that input from the other source is not allowed (step F5814).

After the input source is switched to the touch panel 108, the displayed image is code-converted, and a range which is desired to obtain code information is designated by encircling such range by a line (step S4808.). The CPU 109 reads the data inputted from the touch panel 108 for a given time period, as is in the aforementioned other examples, and the read data is displayed on the display 106 (step F5815). At the same time, it is judged whether the input image is encircled by the line as a frame (step F5817). If it is judged that the inputted data is encircled by the frame, it is also checked whether the setting key 209 is not depressed or not while inputting and displaying the data from the touch panel 108 in the same manner as the previous manner (steps F5819, F5820).

After the portion which is desired to be code-converted is encircled by the line frame, the setting key 209 is depressed to select "code conversion" (step S4809). In response to this, the CPU 109 displays the functions settable by the setting key 209 on the area of the display 106 at the right from the dotted line x. If the "code conversion" is selected (step F5821), the portion of the image data encircled by the line frame is transferred to the field memory 139, and the data is sent to a pattern recognition processing portion 133, where the pattern recognition is effected (step F5822). After the pattern recognition is finished, the pattern recognition processing portion 133 informs the CPU 109 of the termination of the pattern recognition and writes the code-converted result on the predetermined address of the RAM 115. In response to this, the CPU 109 develops the image data obtained by converting the code on the RAM 115 by using the font stored in the ROM 114 in the field memory 139 and displays a converted result on the display 106 (step F5823).

The operator confirms the converted result, and if the result is correct, the operator registers the function by the setting key 209 (step S4810). The CPU 109 checks whether the registration is effected (step F5824). If the registration is effected, the converted data is registered in the image memory 112 with a flag indicating the converted result (step F5825). Further, in a portion other than a conversion range, the image data is stored as it is, and the data stored as it is and the data stored as the converted code data are paired to form one image in combination. This fact and information indicating the correspondence between the code-converted portion and a portion of the original image are stored together. If the processing is repeated, the key input waiting condition in the step F5807 may be restored, and, the power key 217 may be waited till now and then the processing may be terminated (step S4811).

When the operator looks at the partial code-converted data, the image data number is designated, as is in the case where the data which is not code-converted is looked at. When the code-converted data is reproduced, the CPU 109 reads out the information indicating the correspondence between the code-converted portion and a portion of the original image and develops the code at an area (of the a field memory 139) corresponding to the original position, and the non-code-converted portion is expanded in the code processing portion 110 and then is developed in the field memory 139, thereby reproducing and displaying the original image.

Incidentally, the present invention may be applied to a system comprised of a plurality of equipments or a system comprised of a single equipment. Further, the present invention can be applied to a case where program is supplied to a system or an apparatus. In this case, by reading-out a storing medium storing the program (software) for achieving the present invention in the system or the apparatus, the system or the apparatus can obtain the advantages of the present invention.

What is claimed is:

1. An image input apparatus comprising:

communication means for performing communication via a public network;

moving image input means for inputting a moving image;

record instruction input means for inputting a record instruction for recording the moving image; and control means for controlling said communication means to transmit via the public network, in response to the record instruction, a signal to inform external receiving means of a moving image and, after receiving a response from the external receiving means via the public network, to transmit via the public network the moving image input by said moving image input means to the memory of the external receiving means, wherein said control means controls said communication means to stop transmission of the moving image in accordance with a message received from the external receiving means.

2. An image input apparatus according to claim 1, wherein said control means comprises input means for inputting designating information for designating the memory of the external receiving means, and said control means controls said communication means to transmit the moving image to the memory of the external receiving means in accordance with the designating information.

3. An image input apparatus according to claim 1, wherein the moving image is live video.

4. An image input method for inputting a moving image using an image input apparatus, transmitting the moving image via a public network, and storing the moving image in memory at external receiving means, the method comprising the steps of:

inputting a moving image at the image input apparatus;

inputting at the image input apparatus a record instruction for recording the moving image in the memory at the external receiving means;

transmitting, in response to input of the record instruction, a signal from the image input apparatus to the external receiving means via the public network, to inform the external receiving means of a moving image communication;

receiving a response to the signal at the image input apparatus, via the public network, from the external receiving device;

transmitting the moving image via the public network to the external receiving means so as to record the moving image in the memory of the external receiving means, and stopping transmission of the moving image in accordance with a message from the external receiving means.

5. An image input method according to claim 4, further comprising a step of inputting designating information for designating the memory at the external receiving means, wherein the moving image is transmitted to the memory at the external receiving means in accordance with the designating information.

6. An image input method according to claim 4, wherein the moving image is live video.

7. A storage medium readable by a computer, said storage medium storing program instructions for performing the steps of:

performing communication via a public network between a moving image input apparatus and an external receiving means;

inputting a moving image at the image input apparatus;

inputting a record instruction at the image input apparatus for recording the moving image at a memory in the external receiving means;

controlling the communication via the public network so as to transmit via the public network, in response to the record instruction, a signal from the image input apparatus to the external receiving means, to inform the external receiving means of a moving image communication, thereafter to transmit via the public network a response from the external receiving means to the image input apparatus, and thereafter to transmit the moving image input in said moving image input step via the public network to record the moving image in the memory of the external receiving means, and stopping transmission of the moving image to the external receiving means in accordance with a message transmitted from the external receiving means.

8. A storage medium according to claim 7, wherein said storage medium further stores program instructions for inputting at the image input apparatus designating information for designating the memory at the external receiving means, and for transmitting the moving image to the memory of the external receiving means designated by the designating information.

9. A storage medium according to claim 7, wherein said inputting step includes inputting live video.

\* \* \* \* \*

UNITED STATES PATENT AND TRADEMARK OFFICE
CERTIFICATE OF CORRECTION

PATENT NO. : 6,704,453 B2
DATED : March 9, 2004
INVENTOR(S) : Shinji Tsuchida

Figures 12, 12A:
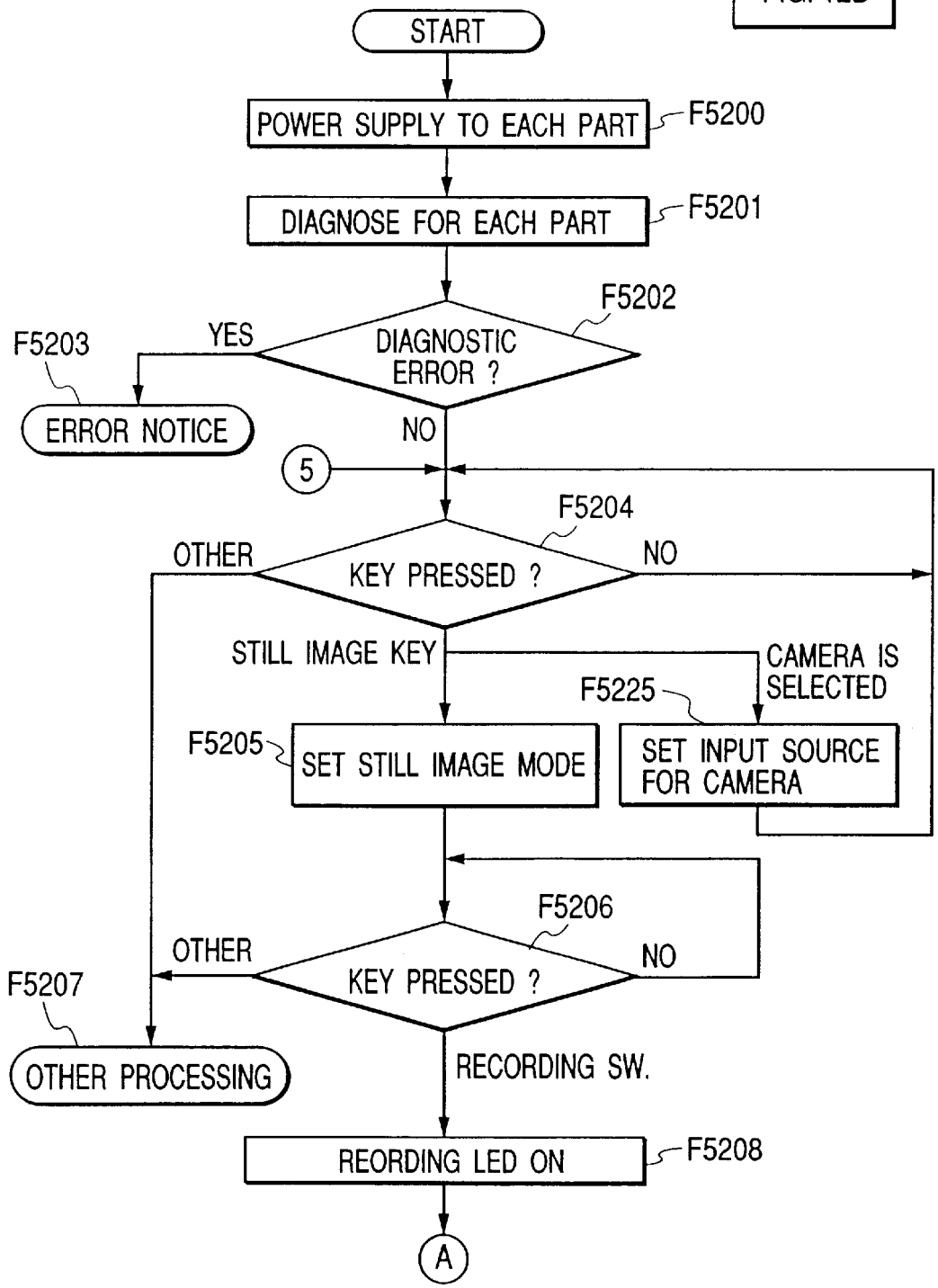
FIG. 12 which is composed of FIGS. 12A and 12B are flow charts showing terminal processing according to a second embodiment of the present invention.
Figure 12B:
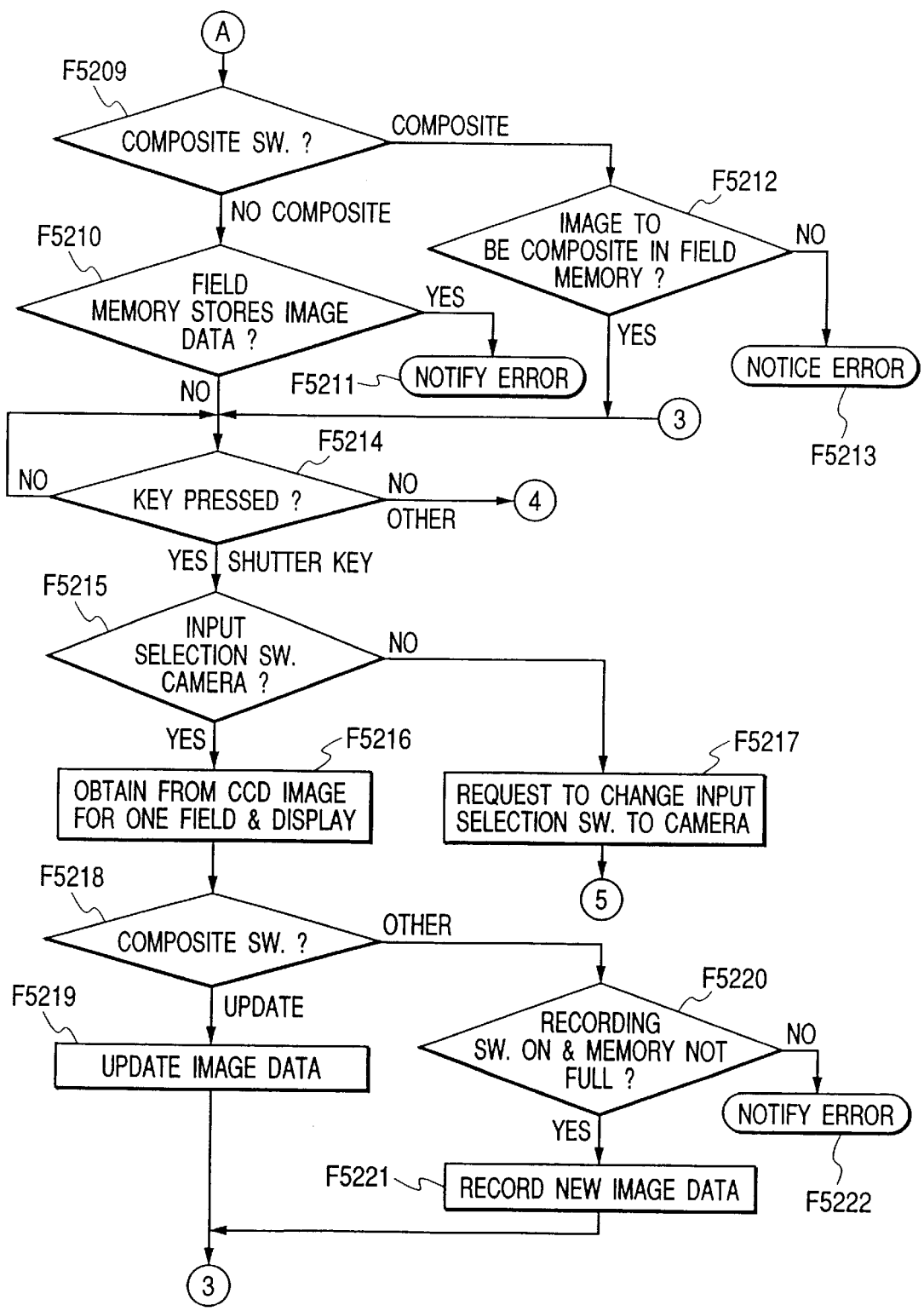

It is certified that error appears in the above-identified patent and that said Letters Patent is hereby corrected as shown below:

Drawings,
Figure 12A, Box F5208, "REORDING" should read -- RECORDING --.

Column 2,
Lines 7, 29, 35, 42 and 50, "to" should be deleted.

Column 3,
Line 2, "to" should be deleted.

Column 4,
Line 10, "synchronous" should read -- synchronism --.

Column 5,
Line 4, "with" should be deleted.
Line 15, "stored" should read -- stored in a --.

Column 6,
Line 13, "serve" should read -- serves --.

Column 7,
Line 5, "displaying" should read -- displaying that --.
Line 12, "an" should read -- a --.
Line 58, "is disappeared." should read -- disappears. --.

Column 8,
Line 2, "is disappeared," should read -- disappears, --.
Line 24, "is depressed," should be deleted.

Column 9,
Line 10, "the" (1st occurrence) should be deleted.
Line 60, "communication" should read -- a communication --.
Line 62, "are" should read -- is --.

Column 10,
Line 28, "waited" should read -- awaited --.

Column 11,
Line 45, "to" (1st occurrence) should be deleted.

Column 15,
Line 28, "waited" should read -- awaited --.
Lines 41, 44 and 53, "is notified" should read -- notifies --.

UNITED STATES PATENT AND TRADEMARK OFFICE
CERTIFICATE OF CORRECTION

PATENT NO. : 6,704,453 B2
DATED : March 9, 2004
INVENTOR(S) : Shinji Tsuchida

It is certified that error appears in the above-identified patent and that said Letters Patent is hereby corrected as shown below:

<u>Column 18,</u>
Line 15, "mean while," should read -- meanwhile, --.

<u>Column 20,</u>
Line 9, "relates" should read -- related --.
Line 12, "waited" should read -- awaited --.
Line 27, "for effecting" should read -- to effect --.

<u>Column 22,</u>
Line 49, "no" should read -- any --.

<u>Column 24,</u>
Line 61, "no" should read -- not --.

<u>Column 25,</u>
Lines 8 and 9, "other" should read -- another --.
Line 67, "for inputting" should read -- to input --.

<u>Column 27,</u>
Line 2, "being now" should read -- now being --.
Line 3, "notified" should read -- notified to --.
Line 16, "are" should read -- is --.

<u>Column 29,</u>
Line 2, "equipments" should read -- equipment --.

Signed and Sealed this

Twenty-seventh Day of July, 2004

JON W. DUDAS
*Acting Director of the United States Patent and Trademark Office*